US008438567B2

(12) United States Patent
Matsushima

(10) Patent No.: US 8,438,567 B2
(45) Date of Patent: May 7, 2013

(54) INFORMATION PROCESSING DEVICE AND IMAGE PROCESSING APPARATUS

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 928 days.

(21) Appl. No.: 12/263,691

(22) Filed: Nov. 3, 2008

(65) Prior Publication Data
US 2009/0119553 A1 May 7, 2009

(30) Foreign Application Priority Data

Nov. 7, 2007 (JP) ................................. 2007-290214
Aug. 29, 2008 (JP) ................................. 2008-222129

(51) Int. Cl.
*G06F 9/46* (2006.01)
*G06F 9/44* (2006.01)
*G06F 9/455* (2006.01)
*G06F 11/00* (2006.01)
*G06K 15/00* (2006.01)

(52) U.S. Cl.
USPC ........... 718/100; 718/102; 719/329; 719/313; 719/328; 717/168; 717/172; 717/177; 717/127; 714/38.1; 714/25; 358/1.15; 358/1.16

(58) Field of Classification Search .............. 718/1–106; 719/312–319, 328–329; 717/168–178, 127–133; 714/38.1–38.14, 25, 39; 358/1.11–1.16
See application file for complete search history.

(56) References Cited

U.S. PATENT DOCUMENTS

| 5,913,060 | A  | * | 6/1999  | Discavage ..................... 719/310 |
| 6,442,475 | B1 | * | 8/2002  | Utsui et al. ..................... 701/400 |
| 6,560,655 | B1 | * | 5/2003  | Grambihler et al. .......... 709/248 |
| 6,684,396 | B1 | * | 1/2004  | Brittain et al. ................. 717/168 |
| 6,912,534 | B2 | * | 6/2005  | DeBettencourt et al. ............. 1/1 |
| 7,019,860 | B2 |   | 3/2006  | Matsushima |
| 7,042,593 | B2 |   | 5/2006  | Matsushima |
| 7,114,104 | B1 | * | 9/2006  | Bennett ....................... 714/38.11 |
| 7,117,493 | B2 |   | 10/2006 | Matsushima |
| 8,184,311 | B2 | * | 5/2012  | Sakai .......................... 358/1.15 |
| 2001/0016824 | A1 |   | 8/2001  | Matsushima |

(Continued)

FOREIGN PATENT DOCUMENTS

JP 2004-164582 A 6/2004
JP 2005-31975 2/2005

(Continued)

OTHER PUBLICATIONS

Japanese Office Action Issued Aug. 21, 2012 in Patent Application No. 2008-222129.

*Primary Examiner* — Abdullah Al Kawsar

(74) *Attorney, Agent, or Firm* — Oblon, Spivak, McClelland, Maier & Neustadt, L.L.P.

(57) ABSTRACT

An information processing device includes an input unit configured to input data, a processing unit configured to process the data, an output unit configured to output the data, and an execution unit configured to execute a first process, a second process, and a third process. A function of an application is provided by operating the input unit, the processing unit, and the output unit in conjunction with each other. The first process executes application management software that manages activation and termination of the application. The second process executes basic application software that provides a basic function of the information processing device. The third process executes extended application software that provides an extended function added to the information processing device.

19 Claims, 38 Drawing Sheets

U.S. PATENT DOCUMENTS

| | | |
|---|---|---|
| 2003/0063313 A1* | 4/2003 | Ito .................... 358/1.15 |
| 2004/0095602 A1* | 5/2004 | Sugishita et al. ........... 358/1.16 |
| 2004/0109187 A1 | 6/2004 | Matsushima |
| 2004/0109188 A1* | 6/2004 | Akiyoshi et al. ............. 358/1.13 |
| 2004/0148328 A1 | 7/2004 | Matsushima |
| 2004/0255263 A1* | 12/2004 | Ando .................... 717/100 |
| 2004/0267808 A1 | 12/2004 | Matsushima |
| 2005/0010932 A1* | 1/2005 | Kohno et al. ............. 719/328 |
| 2005/0097314 A1 | 5/2005 | Matsushima |
| 2006/0064459 A1 | 3/2006 | Matsushima |
| 2006/0085498 A1 | 4/2006 | Matsushima |
| 2006/0092468 A1 | 5/2006 | Matsushima |
| 2006/0103879 A1 | 5/2006 | Matsushima |
| 2006/0200702 A1* | 9/2006 | Canning et al. ............... 714/38 |
| 2006/0230152 A1 | 10/2006 | Matsushima |
| 2007/0043806 A1 | 2/2007 | Matsushima |
| 2007/0258098 A1 | 11/2007 | Matsushima |
| 2009/0276318 A1* | 11/2009 | Broadbent et al. ......... 705/14.64 |
| 2010/0005481 A1* | 1/2010 | Lewis et al. ............... 719/320 |

FOREIGN PATENT DOCUMENTS

| | | |
|---|---|---|
| JP | 3679349 | 5/2005 |
| JP | 2006-163840 | 6/2006 |
| JP | 2006-277115 A | 10/2006 |
| JP | 2007-201957 A | 8/2007 |
| JP | 2007-325251 | 12/2007 |

* cited by examiner

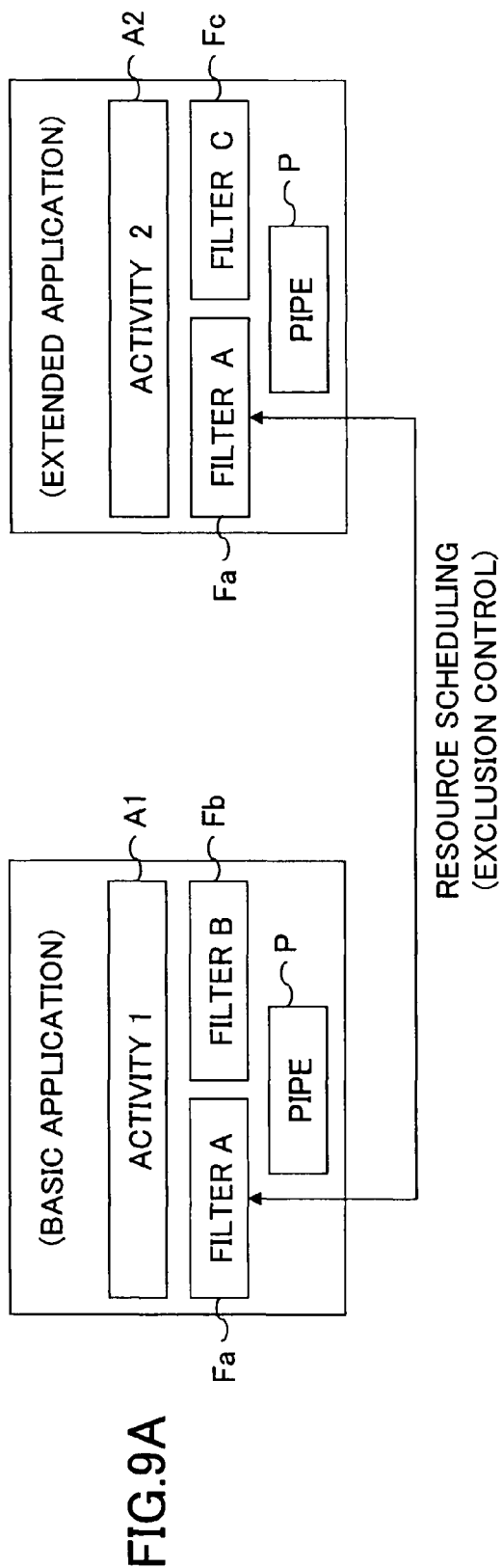
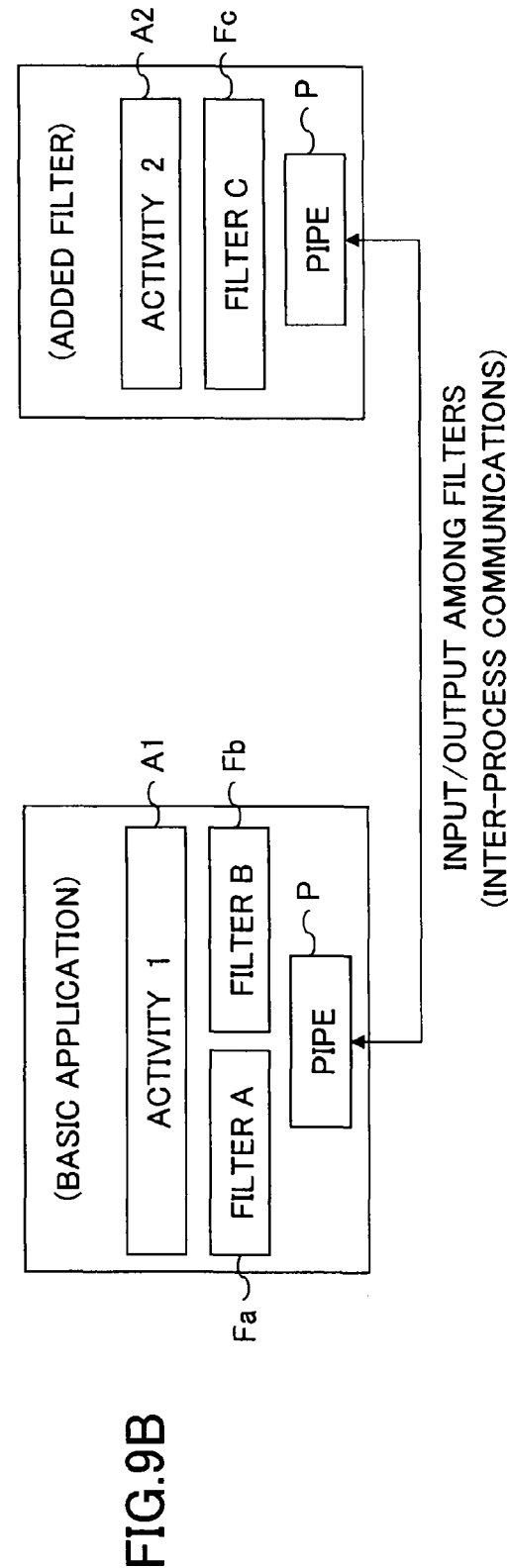
FIG.9A
FIG.9B

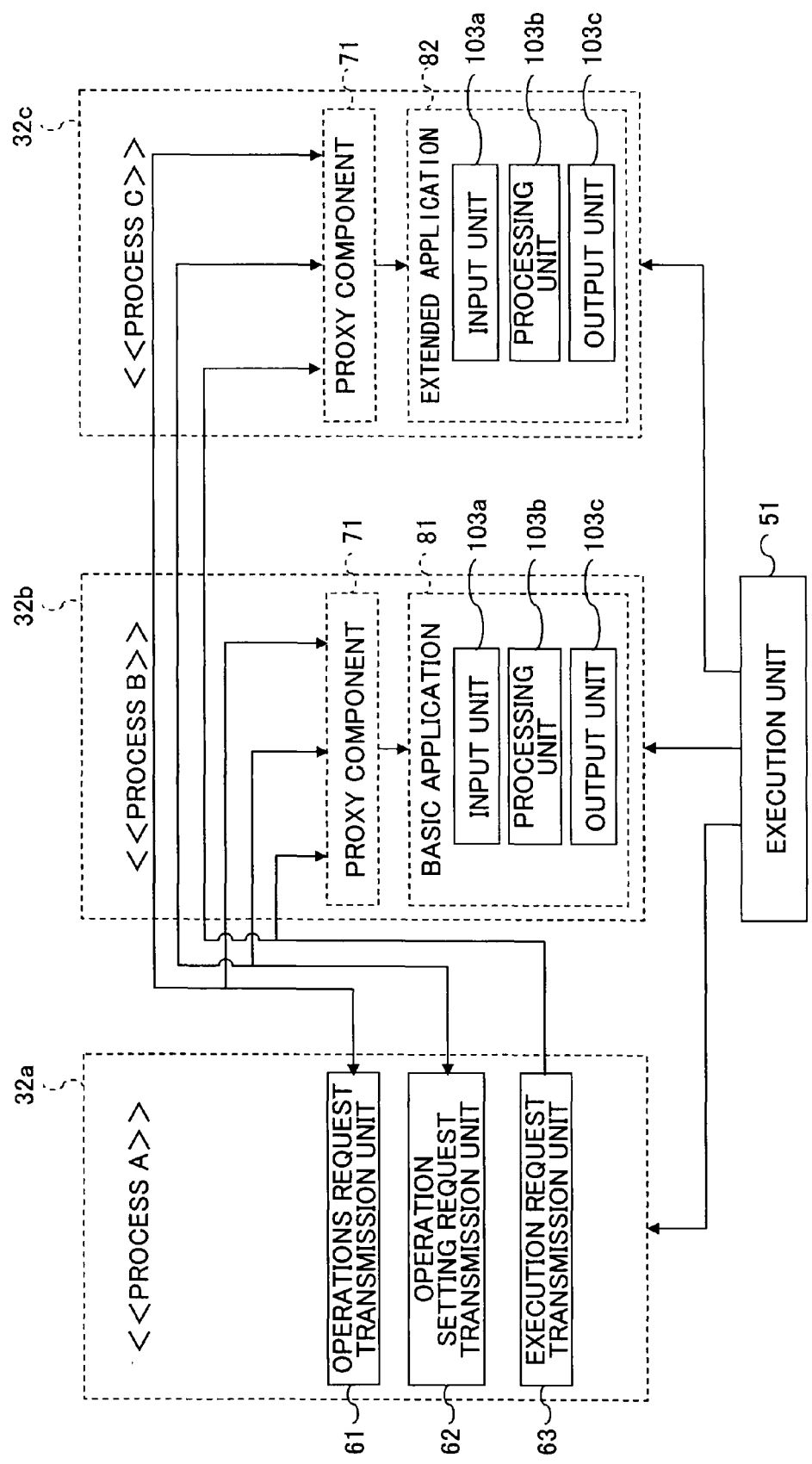

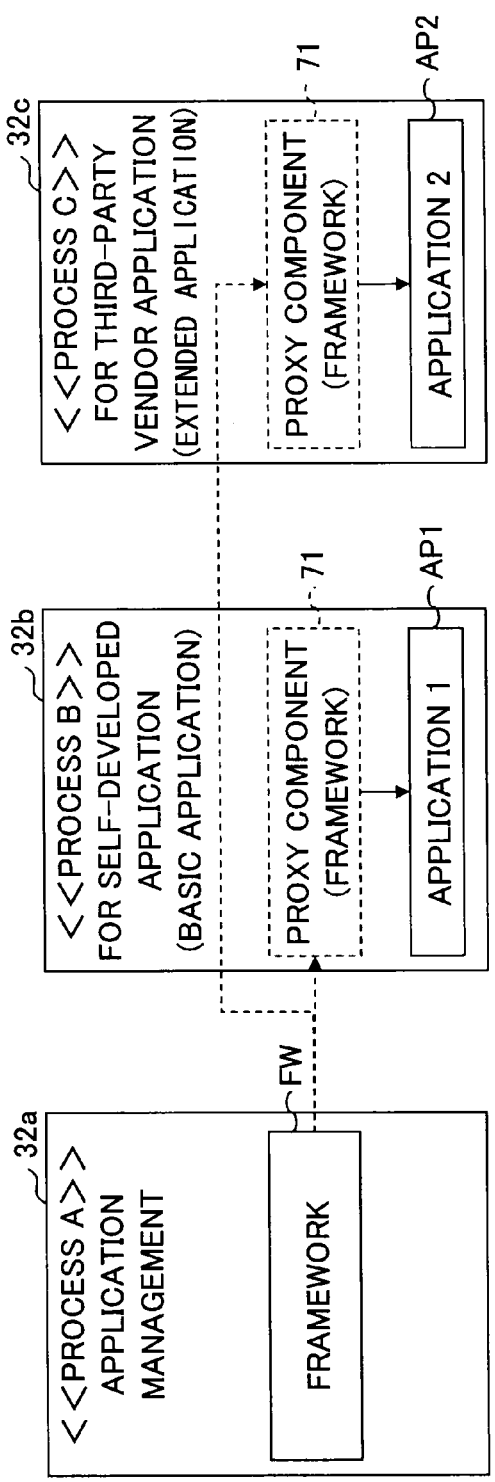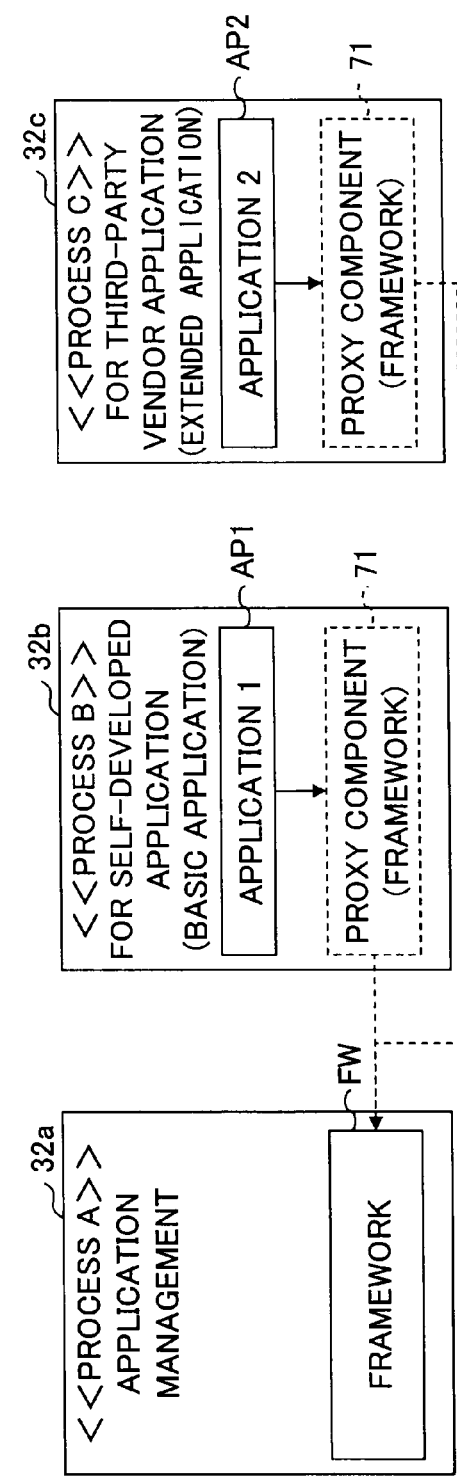
FIG.11A
FIG.11B

FIG.14

| ACTIVITY NAME | PROCESS ID |
|---|---|
| Copy | Process B |
| Vendor | Process C |
| ⋮ | ⋮ |

| UI CONTROL COMPONENT ID | SCREEN ELEMENT ID | PROCESS ID |
|---|---|---|
| Copy Activity | 1 | Process B |
| Scan Activity | 2 | Process B |
| Print Activity | 3 | Process B |
| Vendor Activity | 4 | Process C |
| Vendor Filter | 5 | Process C |
| Print Filter | 6 | Process C |
| ⋮ | ⋮ | ⋮ |

| REQUEST ID | PROCESS ID |
|---|---|
| 1 | Process B |
| 2 | Process C |
| . | . |
| . | . |
| . | . |

| ACTIVITY NAME | PROCESS ID |
|---|---|
| Copy | Process B |
| Vendor | Process C |
| ... | ... |

FIG.34B

| UI CONTROL COMPONENT ID | SCREEN ELEMENT ID | PROCESS ID |
|---|---|---|
| Copy activity | 1 | Process B |
| Scan activity | 2 | Process B |
| Print activity | 3 | Process B |
| Vendor activity | 4 | Process C |
| Vendor file | 5 | Process C |
| Print filter | 6 | Process C |
| ... | ... | ... |

FIG.34C

| REQUEST ID | PROCESS ID |
|---|---|
| 1 | Process B |
| 2 | Process C |
| ... | ... |

FIG.38A

■ APPLICATION LIST

| Status | Name | Ver | Updated on | Process | Action | | |
|---|---|---|---|---|---|---|---|
| ○ | Copy | 1.01 | 08/07/01 | B | Disable | Update | Uninstall |
| ○ | Scan | 1.00 | 08/01/01 | B | Disable | Update | Uninstall |
| — | Print | 1.02 | 08/03/01 | B | Enable | Update | Uninstall |
| × | Multi | 1.00 | 08/01/01 | C | Disable | Update | Uninstall |
| ××× | Vendor | 1.03 | 08/03/01 | C | Disable | Update | Uninstall |
| ... | ... | ... | ... | ... | | | |

[Install]

■ PROCESS

PROCESS B
● ENABLE ○ DISABLE

PROCESS C
○ ENABLE ● DISABLE

[Change]

w

INFORMATION PROCESSING DEVICE AND IMAGE PROCESSING APPARATUS

BACKGROUND OF THE INVENTION

1. Field of the Invention

The present invention relates to an information processing device and an image processing apparatus that provide a function of an application by operating an input unit, a processing unit, and an output unit in conjunction with each other.

2. Description of the Related Art

In these years, image processing apparatuses such as MFPs (Multifunction Peripherals) include printer, copier, scanner and facsimile functions in one physical body and, despite limited memory capacity, have a CPU (Central Processing Unit) similar to that of general purpose computers to provide these functions by software application control.

For example, Japanese Patent Registration No. 3679349 (also published as Japanese Patent Laid-Open Publication No. 2002-084383) discloses an image processing apparatus in which a platform includes a function shared by different applications. These applications can be implemented using an API (Application Programming Interface) for the platform. Since this image processing apparatus is provided with the platform that includes the function shared by the different applications, there is no need to include the shared function in each application. Therefore, it is possible to improve the efficiency in developing the applications.

Thus, this image processing apparatus offers a function desired by a user by adding an application to its system or extending an application in the system.

Currently, the Java (trademark) language of Sun Microsystems, Inc. is used for function development of some of such image processing apparatuses. The Java language is independent from the installation environment (the type of machines into which a function is installed) and therefore is used for development of mobile phones and home appliances as well. Some image processing apparatuses use a process-based UNIX (trademark)-based OS (Operating System), which can split a process into multiple processes, in implementation environments.

However, the following points need to be taken into account for these image processing apparatuses.

The first is the system robustness. Highly-extensible image processing apparatuses may execute applications that are developed in various environments, such as a self-developed application that offers basic functions of the system and an application that is developed by another company (hereinafter referred to as "a third-party vendor") and is installed later to offer an extended function.

These image processing apparatuses need to prevent basic functions of the system from failing due to installation of the extended function.

In process-based OSs, it is common to split a process into processes of appropriate sizes to improve the system robustness. However, in the case where the Java language is used for development, plural applications are executed in a single process (JVM (Java Virtual Machine)), and therefore it is not practical to split the process (JVM) into too many processes (JVMs). The JVM needs to be split into at least a JVM for executing the self-developed application and a JVM for executing the third-party vendor application.

As for the robustness of the Java language based system, consideration needs to be given to execution of Native code and memory use. Execution of malicious Native code may cause a crash of the entire system (i.e., terminate the entire system abnormally). An application using a large amount of memory may occupy the Java heap and cause an OutOfMemoryError.

The second is the easiness of application development. In the case of splitting a system into plural JVMs, it is necessary to minimize the number of components that are to be affected by the multi-process architecture.

For customizable systems, application development using a SDK (Software Development Kit) needs to be easy, and it is necessary to allow applications to be developed without a need to consider that the applications are to run on plural JVMs.

That is, it is necessary to consider a design in which limited components (software parts) corresponding to a framework are affected by multi-process architecture such that applications can be developed without a need to consider the multi-process architecture.

SUMMARY OF THE INVENTION

In view of the foregoing, the present invention is directed toward providing an information processing device and an image processing apparatus which provide a highly robust system that allows easy customization and extension of an application without a need to consider multi-process architecture and that prevents basic functions of the system from being affected due to a failure of an extended function.

In an embodiment of the present invention, there is provided an information processing device that includes an input unit configured to input data; a processing unit configured to process the data; an output unit configured to output the data; and an execution unit configured to execute a first process, a second process, and a third process; wherein a function of an application is provided by operating the input unit, the processing unit, and the output unit in conjunction with each other; the first process executes application management software that manages activation and termination of the application; the second process executes basic application software that provides a basic function of the information processing device; and the third process executes extended application software that provides an extended function added to the information processing device.

In another embodiment of the present invention, there is provided an information processing device that includes an input unit configured to input data; a processing unit configured to process the data; an output unit configured to output the data; and an execution unit configured to execute a first process and a second process; wherein a function of an application is provided by operating the input unit, the processing unit, and the output unit in conjunction with each other; the first process executes application management software that manages activation and termination of the application and basic application software that provides a basic function of the information processing device; and the second process executes extended application software that provides an extended function added to the information processing device.

The information processing device of the above-described embodiment executes the basic application software (self-developed application) that provides basic functions of the system and the extended application software (third-party vendor application) that provides an added extended function in different processes and perform operations associated with the multi-process architecture such as inter-process communications using limited components corresponding to a framework (i.e., hide the influence of the multi-process architecture). Therefore, the information processing device of this embodiment can provide a highly robust system that allows easy customization and extension of an application without a need to consider the multi-process architecture and that prevents basic functions of the system from being affected due to a failure of an extended function.

Thus, the information processing device of this embodiment allows easy development of applications by developers and can stably provide functions.

In still another embodiment of the present invention, there is provided an image processing apparatus that comprises a document scanning unit configured to scan a document to obtain image data; a printing unit configured to print the image data onto paper; and one of the information processing devices of the above-described embodiments.

The image processing apparatus of the above-described embodiment can provide a highly robust system that allows easy customization and extension of an application without a need to consider the multi-process architecture and that prevents basic functions of the system from being affected due to a failure of an extended function.

Thus, the image processing apparatus of this embodiment allows easy development of applications by developers and can stably provide functions.

According to an aspect of the present invention, it is possible to provide an information processing device and an image processing apparatus which include a highly robust system that allows easy customization and extension of an application without a need to consider multi-process architecture and that prevents basic functions of the system from being affected due to a failure of an extended function.

BRIEF DESCRIPTION OF THE DRAWINGS

FIGS. 9A and 9B are diagrams each illustrating an exemplary arrangement of activities and filters in processes according to the first embodiment of the present invention;

FIG. 10 is a diagram illustrating an exemplary functional configuration of the information processing device according to the first embodiment of the present invention;

FIGS. 11A and 11B are diagrams each illustrating an exemplary mechanism of a proxy component according to the first embodiment of the present invention;

FIG. 14 is a diagram illustrating exemplary correspondence relationship data in which activities are associated with processes that execute the activities according to the first embodiment of the present invention;

FIG. 15 is a diagram illustrating exemplary correspondence relationship data in which UIs are associated with processes that generate the UIs according to the first embodiment of the present invention;

FIG. 16 is a diagram illustrating exemplary correspondence relationship data in which requests are associated with processes that generate the requests according to the first embodiment of the present invention;

FIGS. 34A through 34C are diagrams illustrating data pieces that are made mutually consistent in response to an abnormal termination of a process according to the third embodiment of the present invention;

FIGS. 38A and 38B are diagrams each illustrating an exemplary display screen of an application management UI according to the third embodiment of the present invention.

DETAILED DESCRIPTION OF THE PREFERRED EMBODIMENT

Preferred embodiments of the present invention are described below with reference to the accompanying drawings.

First Embodiment
<Hardware Configuration of Image Processing Apparatus>

First, an exemplary hardware configuration of an image processing apparatus 100 according to a first embodiment of the present invention is described below with reference to FIG. 1.

Figure 1:
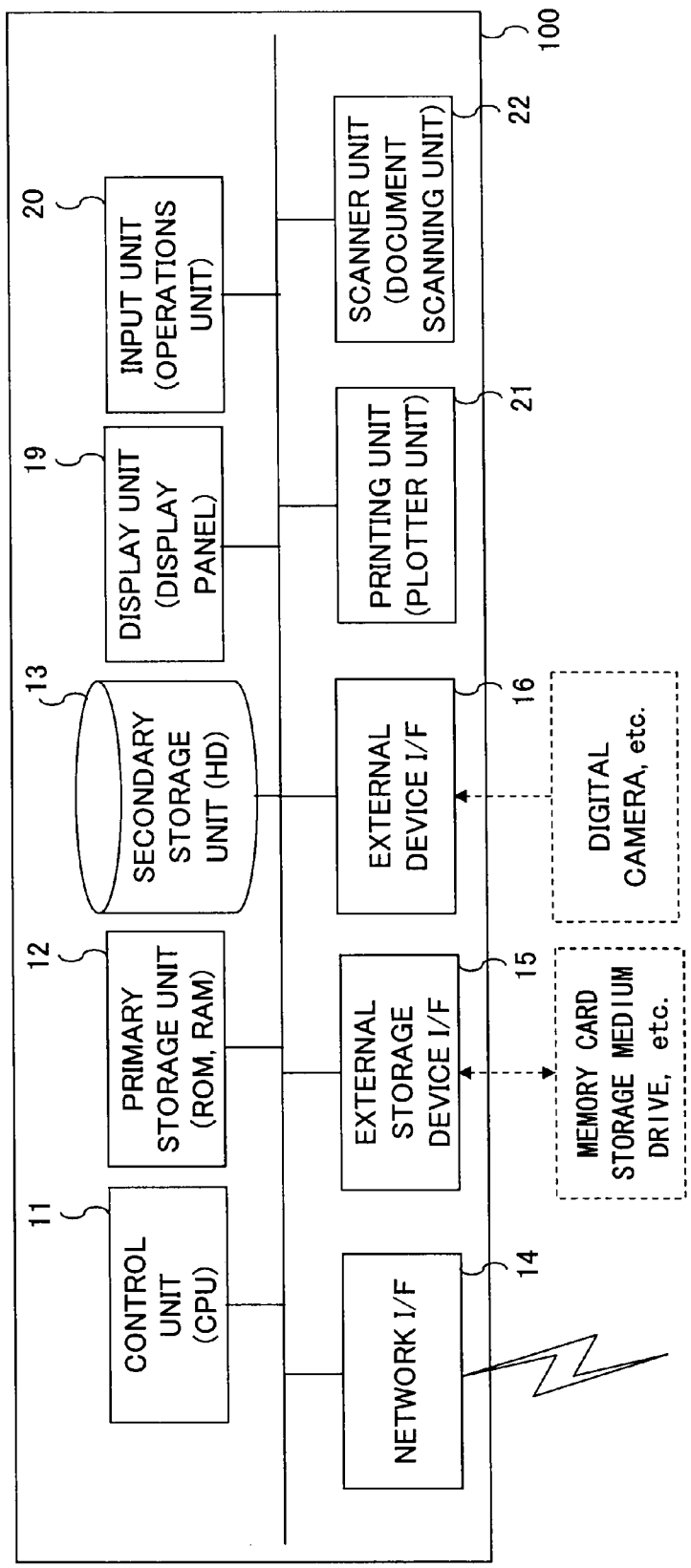
FIG. 1 is a diagram illustrating an exemplary hardware configuration of an image processing apparatus according to a first embodiment of the present invention.

FIG. 1 is a diagram illustrating an exemplary hardware configuration of the image processing apparatus 100 according to the first embodiment of the present invention.

As shown in FIG. 1, the image processing apparatus 100 includes a control unit (CPU (Central Processing Unit)) 11, a primary storage unit (ROM (Read Only Memory), RAM (Random Access Memory) 12, a secondary storage unit (HD (Hard Disk)) 13, a network I/F 14, an external storage device I/F 15, an external device I/F 16, a display unit (display panel) 19, an input unit (operations unit) 20, a printing unit (plotter unit) 21, and a scanner unit (document scanning unit) 22.

The control unit 11 controls other units of the image processing apparatus 100 and performs arithmetic operations and data processing. More specifically, the control unit 11 executes programs stored in the primary storage unit 12 so as to process data received from an input device or a storage device and output the processed data to an output device or the storage device.

The primary storage unit 12 stores or holds the programs, such as an OS (Operating System) as basic software and application software, to be executed and data to be processed by the control unit 11.

The secondary storage unit 13 stores data related to the application software. The secondary storage unit 13 also stores various types of information (e.g., user information) managed by the image processing apparatus 100 using a DB (database) function and a FS (File System) function.

The network I/F 14 interfaces the image processing apparatus 100 and peripheral devices that have communication functions and are connected via a network, such as a LAN (Local Area Network) or a WAN (Wide Area Network), which is implemented by wired and/or wireless data transmission channels.

The external storage device I/F 15 interfaces the image processing apparatus 100 and an external storage device (e.g., a storage medium drive) connected via a data transmission line such as a USB (Universal Serial Bus).

The external device I/F 16 interfaces the image processing apparatus 100 and an external device (e.g., a digital camera) connected via a data transmission line such as a USB.

The image processing apparatus 100 exchanges data (e.g., image data) with external devices (i.e., sends data to, receives data from, writes data into, and reads data from external devices) via these interfaces.

The display unit 19 and the input unit 20 include an LCD (Liquid Crystal Display) with a touch panel (including software keys of a GUI (Graphical User Interface) and key switches (hardware keys), respectively, and serve as UIs (User Interfaces) for using functions of the image processing apparatus 100.

The printing unit 21 outputs (or prints) an image on a transfer paper (printing paper) according to CMYK image data by an electrophotographic process (including exposure, latent image forming, developing, and transfer steps) using laser beams.

The scanner unit 22 includes a line sensor having CCDs (Charge Coupled Devices), an A/D converter, and a driving circuit for driving the line sensor and the A/D converter. The scanner unit 22 scans a document on a document scanning surface (i.e., a contact glass) and generates RGB 8-bit digital image data. In other words, the scanner unit 22 scans information from a document and converts the information into digital data.

Thus, the image processing apparatus 100 causes the control unit 11 to execute the programs stored in the primary storage unit 12 and the secondary storage unit 13, sends control signals (control commands) to the appropriate units (i.e., controls the appropriate units), and thereby provides functions, such as copier, facsimile, scanner, and printer functions to process information managed by the image processing apparatus 100 and information managed by a system connected to the image processing apparatus 100.

<Software Configuration of Image Processing Apparatus 100 and Basic Procedure>

An exemplary software configuration of the image processing apparatus 100 and an exemplary basic processing procedure for providing a function of the image processing apparatus 100 are described below with reference to FIGS. 2 through 5.

Figure 2:
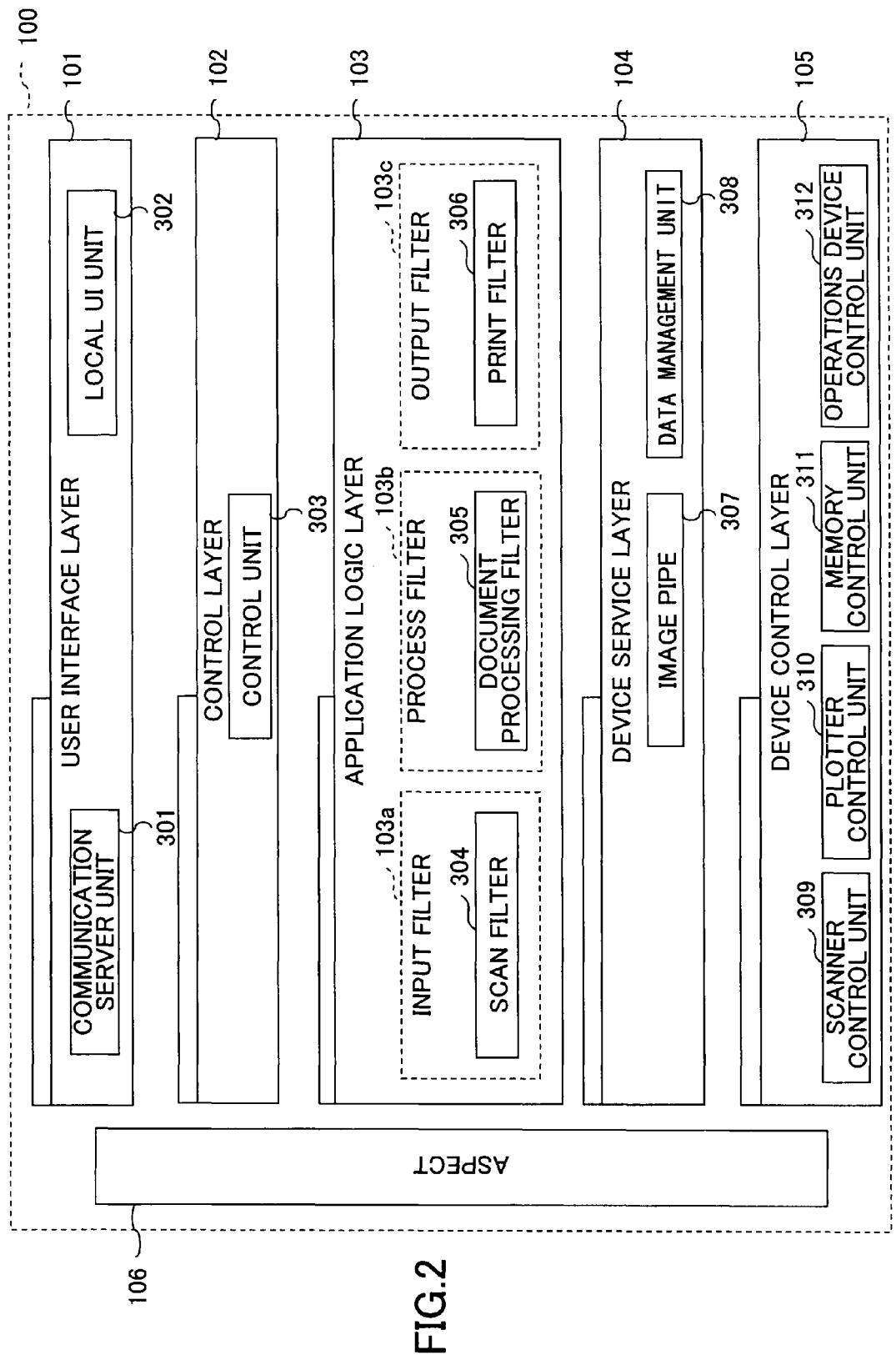
FIG. 2 is a diagram illustrating an exemplary software configuration of the image processing apparatus according to the first embodiment of the present invention.

FIG. 2 is a diagram illustrating an exemplary software configuration of the image processing apparatus 100 according to the first embodiment of the present invention.

As shown in FIG. 2, the image processing apparatus 100 includes a user interface layer 101, a control layer 102, an application logic layer 103, a device service layer 104, and a device control layer 105. In FIG. 2, the layers are arranged in a hierarchical order where an upper layer calls a lower layer.

The user interface layer 101 offers a UI function for receiving requests for execution of functions (e.g., application functions such as copier, facsimile, scanner, and printer functions) The user interface layer 101 includes a communication server unit 301 and a local UI unit 302, for example.

The communication server unit 301 receives various requests (e.g., a request for a printing operation) from, for example, a client PC (Personal Computer) (not shown), which is a peripheral device having a communication device, via the network. The local UI unit 302 receives various requests (e.g., a request for a copy operation and operation settings) via an operations panel (not shown).

The requests received by the user interface layer 101 are transmitted to the control layer 102.

The control layer 102 offers a function for controlling operations of executing a requested function. The control layer 102 includes a control unit 303, for example. More specifically, the control unit 303 connects filters in the application logic layer 103 (described below) according to a requested function and controls execution of the function based on the connected filters. In this embodiment, "a function of the image processing apparatus 100" refers to a single unit of service (from input of a request to provision of an output) that is provided by the image processing apparatus 100 to a user. In terms of software, "a function of the image processing apparatus 100" refers to an application that provides a single unit of service.

The application logic layer 103 includes a group of parts (software parts), each of which provides a part of a function of the image processing apparatus 100. In other words, the parts in the application logic layer 103 are selectively combined to provide a function. In this embodiment, since the image processing apparatus 100 is based on software architecture called "pipes-and-filters", each of the parts is called a "filter".

Figure 3A:
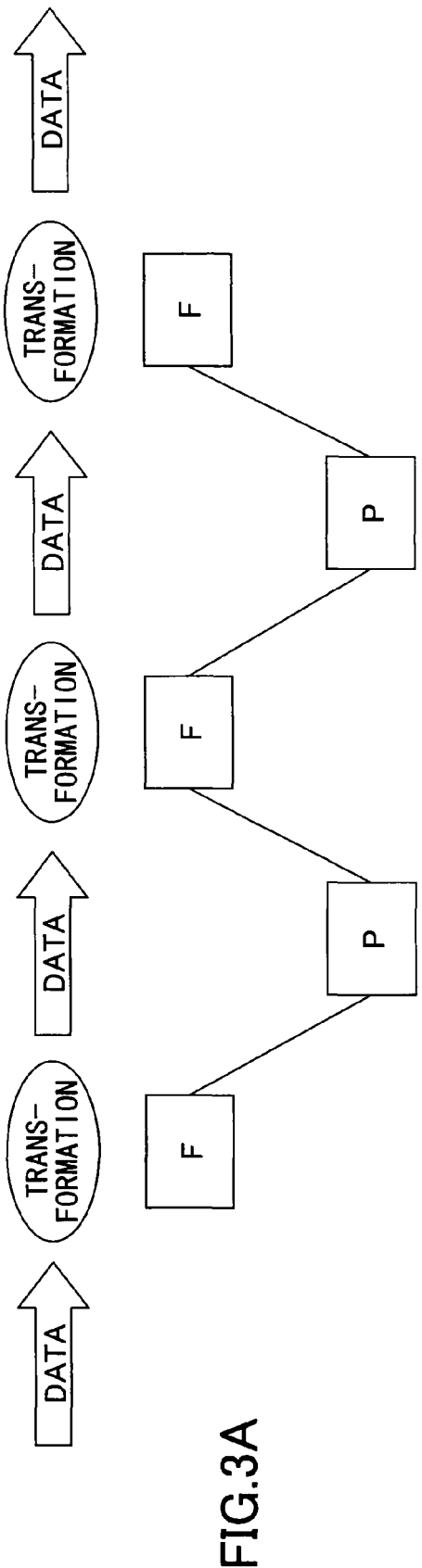
FIG. 3A is a conceptual diagram illustrating the pipes and filters architecture according to the first embodiment of the present invention.
Figure 3B:
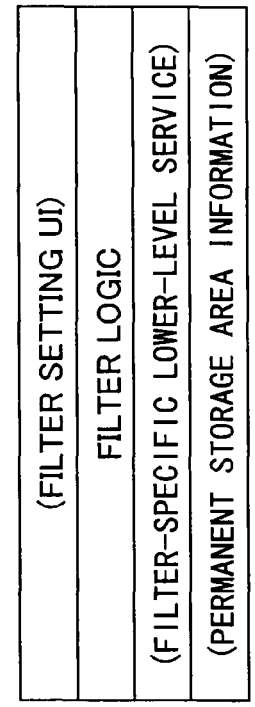
FIG. 3B is a diagram illustrating elements of a filter according to the first embodiment of the present invention.

FIG. 3A is a conceptual diagram illustrating the pipes-and-filters architecture according to the first embodiment of the present invention. FIG. 3B is a diagram illustrating elements of a filter according to the first embodiment of the present invention.

First, the pipes-and-filters architecture is described. In FIG. 3A, "F" indicates a filter, and "P" indicates a pipe. As shown in FIG. 3A, pipes interconnect filters. A filter converts input data and outputs the result. Then a pipe passes the output data to the next filter. That is, each function of the image processing apparatus 100 of this embodiment is a series of transformation operations that are performed on information (e.g., user information and image data) managed by the image processing apparatus 100. In a sense, each function of the image processing apparatus 100 is a combination of operations of inputting, processing, and outputting information managed by the image processing apparatus 100. Each of the input, processing, and output operations is a single transformation operation performed by a software part called a "filter". More specifically, a filter that performs an input operation is called an "input filter (input unit)". A filter that performs a processing operation is called a "process filter (processing unit)". A filter that performs an output operation is called an "output filter (output unit)". The filters are independent from each other and there is basically no dependency between the filters. Therefore, filters may be independently added to (installed into) or removed from (uninstalled from) the image processing apparatus 100.

Referring back to FIG. 2, the application logic layer 103 includes input filters 103a, process filters 103b, and output filters 103c. The input filters 103a include, for example, a scan filter 304.

The scan filter 304 controls scanning of image data by the scanner unit 22, and outputs the scanned image data.

The input filters 103a also include a stored document retrieving filter (not shown) for reading document data (image data) stored in the secondary storage unit 13 and outputting the read document data; an email receiving filter (not shown) for receiving an email message and outputting data in the received email message; a fax receiving filter (not shown) for receiving a fax message and outputting data in the fax message; a PC document receiving filter for receiving print data from a client PC (not shown) and outputting the received print data; and a report filter (not shown) for outputting setting information and history information of the image processing apparatus 100 in a tabular form, for example.

The process filters 103b include, for example, a document processing filter 305. The document processing filter 305 performs image processing operations (combining, scaling, etc.,) on the input data.

The process filters 103b also include a document process filter (not shown) for converting input PostScript data into bit map data and outputting the bitmap data (i.e., performing a rendering operation).

The output filters 103c include, for example, a print filter 306. The print filter 306 causes the printing unit 21 to output (print) input data.

The output filters 103c also include a stored document registration filter (not shown) for storing input data in the secondary storage unit 13; an email transmission filter (not shown) for attaching input data to an email message and sending the email message; a fax transmission filter (not shown) for sending input data as a fax message; a PC document transmission filter (not shown) for sending input data to a client PC (not shown); and a preview filter for displaying a preview of input data on the display unit 19.

The device service layer 104 includes lower-level functions shared by the filters in the application logic layer 103. The device service layer 104 includes an image pipe 307 and a data management unit 308, for example.

The image pipe 307 provides a function of a pipe that passes output data from a filter to the next filter. The data management unit 308 represents various databases such as a database in which user information is registered and a database in which documents and image data are stored.

The device control layer 105 includes a group of program modules called drivers for controlling hardware devices. For example, the device control layer 105 includes a scanner control unit 309, a plotter control unit 310, a memory control unit 311, a memory control unit 311, and an operations device control unit 312. These control units control devices indicated by their names.

An aspect 106 includes a group of program modules that handle cross-sectoral information related to the entire system, such as access control information, history information, and charging information.

A detailed description of a filter is given below. FIG. 3A is a diagram illustrating elements of a filter. As shown in FIG. 3B, a filter includes a filter setting UI, filter logic, a filter-specific lower-level service, and permanent storage area information. The filter setting UI, the filter-specific lower-level service, and the permanent storage area information are optional.

The filter setting UI is a program for displaying a screen for specifying execution conditions of the filter on a display such as the display unit 19. For example, the filter UI of the scan filter 304 displays a screen for setting resolution, density, and image type. The filter setting UI may be HTML (Hypertext Markup Language) data or a script for displaying a screen on the display unit 19

Filter logic is a program with logic that provides a function of the filter. More specifically, the filter logic provides a function of the filter using a filter-specific lower-level service of the filter as an element of the filter, a lower-level function in the device service layer 104, and/or a driver in the device control layer 105 according to the execution conditions specified via the filter setting UI. For example, filter logic of the scan filter 304 controls scanning of a document by the scanner unit 22.

A filter-specific lower-level service is a library used by the filter logic. The filter-specific lower-level service is similar to a lower-level function in the device service layer 104 or a driver in the device control layer 105, but may be implemented as a part of the filter since it is used only by the filter. For example, a function of the scan filter 304 for controlling the scanner unit 22 may be implemented as a filter-specific lower-level service, although the function is implemented as the scanner control unit 309 in the device control unit 105 in this embodiment. That is, the scan filter 304 does not have to include a filter-specific lower-level service.

The permanent storage area information includes a schema definition about data, such as filter setting information (e.g., default execution conditions), that need to be stored in a non-volatile memory (e.g., a NVRAM (Non Volatile RAM)). The schema definition is registered in the data management unit 308 upon installation of the filter.

An example of a combination of filters that provides a function of the image processing apparatus 100 of this embodiment is described.

For example, a copier function is provided by connecting the scan filter 304 and the print filter 306. Thus, image data scanned from a document by the scan filter 304 are printed by the print filter 306. If a processing operation such as combining and scaling is requested, the document processing filter 305 that provides the processing operation is inserted between the scan filter 304 and the print filter 306.

Next, an exemplary basic procedure performed by the image processing apparatus 100 of this embodiment having the above-described software configuration is described with reference to FIGS. 4 and 5.

Figure 4:
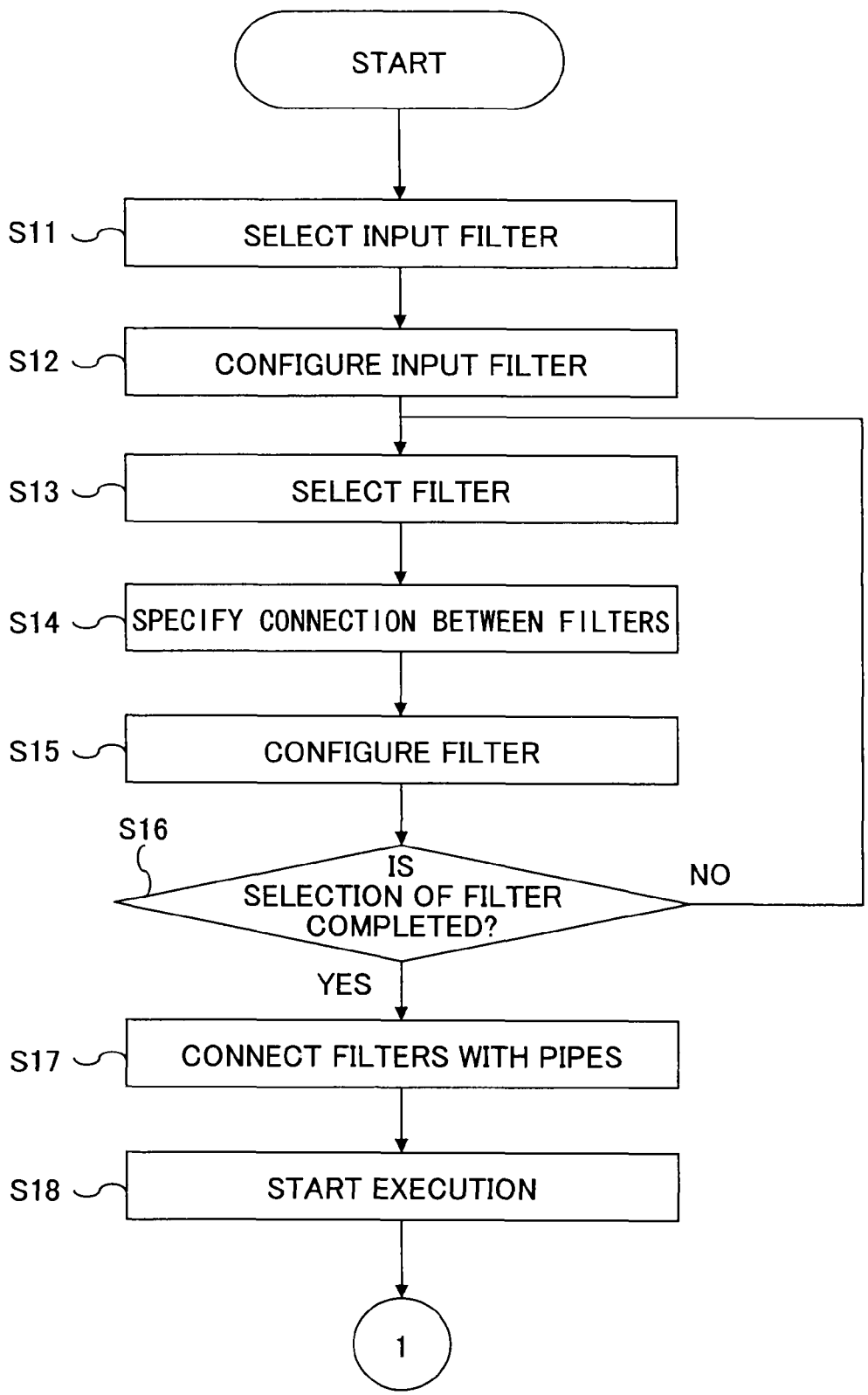
FIGS. 4 and 5 are flowcharts illustrating an exemplary basic procedure performed by the image processing apparatus according to the first embodiment of the present invention.
Figure 5:
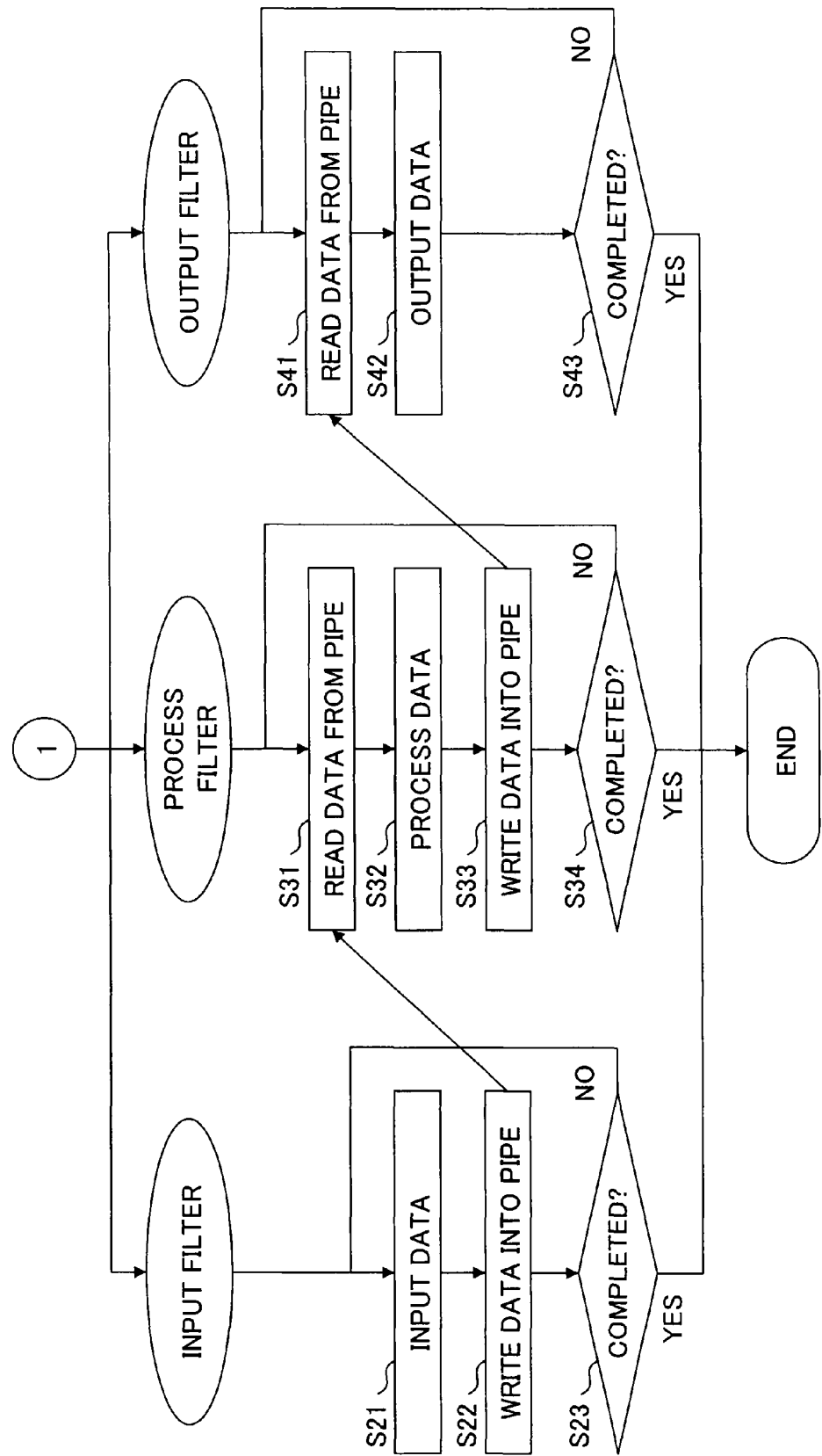

FIGS. 4 and 5 are flowcharts illustrating an exemplary basic procedure performed by the image processing apparatus 100 according to the first embodiment of the present invention. The "basic procedure" refers to a procedure performed by the image processing apparatus 100 upon providing a given function.

Referring first to FIG. 4, a user selects an input filter 103a (S11) and specifies execution conditions of the selected input filter (S12). Similarly, the user selects a process filter 103b and an output filter 103c (S13), specifies connection between the filters (S14), and specifies execution conditions of the filters (S15).

These steps are performed under the control of the local UI unit 302 of the user interface layer 101 using the display unit 19 that provides a touch panel function and the input unit 20 (FIG. 1).

When selection of filters is completed (YES in step S16) and a start button is pressed, the user interface layer 101 transmits content of a request (e.g. names of selected filters and information about operation settings for the filters) to the control layer 102.

The control layer 102 connects the selected filters with pipes according to the content of the request received from the user interface layer 101 (S17). A pipe is implemented by a memory (including the storage area of the secondary storage unit 13). Different types of memories are used as pipes depending on the types of filters at the opposing ends of the respective pipes. The correspondence between the types of memories and the types of filters is predefined in the secondary storage unit 13 of the image processing apparatus 100. The control layer 102 connects filters by appropriate pipes according to the predefined correspondence.

After Step S17, the control layer 102 sends execution requests to the filters in parallel (S18). In other words, the filters are not called in the order of connection, but are called at substantially the same time. This is possible because the filters are synchronized by the pipes. More specifically, when a filter receives an execution request from the control layer 102, the filter stands by until data are input to a pipe (input pipe) connected to its input end. As an exception, since no input pipe is connected to the input filter 103a, the input filter 103a starts its operation as soon as it receives an execution request.

Referring now to FIG. 5, the input filter 103a inputs data from an input device (S21) and outputs the input data to a pipe (output pipe) connected to its output end (S22). If data are input in multiple sessions (e.g. when scanning a document of multiple pages), data input to and data output from the pipe are repeated. After outputting all the pieces of the input data (YES in step S23), the operation of the input filter 103a ends.

The process filter 103b starts its operation upon detection of data input to its input pipe. The process filter 103b reads the data from the input pipe (S31) and performs image processing on the input data (S32). Then the process filter 103b outputs the processed data to its output pipe (S33). After outputting all the pieces of the input data (YES in step S34), the operation of the process filter 103b ends.

The output filter 103c starts its operation upon detection of data input to its input pipe. The output filter 103c reads the input data from the input pipe (S41) and outputs the read data to an output device (S42). After outputting all the pieces of the input data (YES in step S43), the operation of the output filter 103c ends.

<Application Functions Based on "Pipes-and-Filters" Architecture>

The following discusses how an application of this embodiment is provided based on the "pipes-and-filter" software configuration and the basic procedure.

In order to implement an application that runs on the "pipes-and-filter" software configuration and the basic procedure described above, an input filter 103a for inputting data, a process filter 103b for processing the input data, and an output filter 103c for outputting the processed data corresponding to a desired operation to be performed by the image processing apparatus 100 are combined, thereby creating a series of operation steps (workflow) including input, processing, and output steps. Then, these filters (input, processing, and output units) are connected with pipes.

Thus, the application can pass input data from the input filter 103a to the subsequent process filter 103b and pass the data processed by the process filter 103b to the subsequent output filter 103c. That is, the application provides a function by operating the input, processing, and output components (input, processing, and output software parts) of the image processing apparatus in conjunction with each other.

In this manner, the image processing apparatus 100 of this embodiment can provide a function of the application by installing input, processing, and output components corresponding to the function of the application as needed.

<Hardware Configuration of Information Processing Device>

Figure 6:
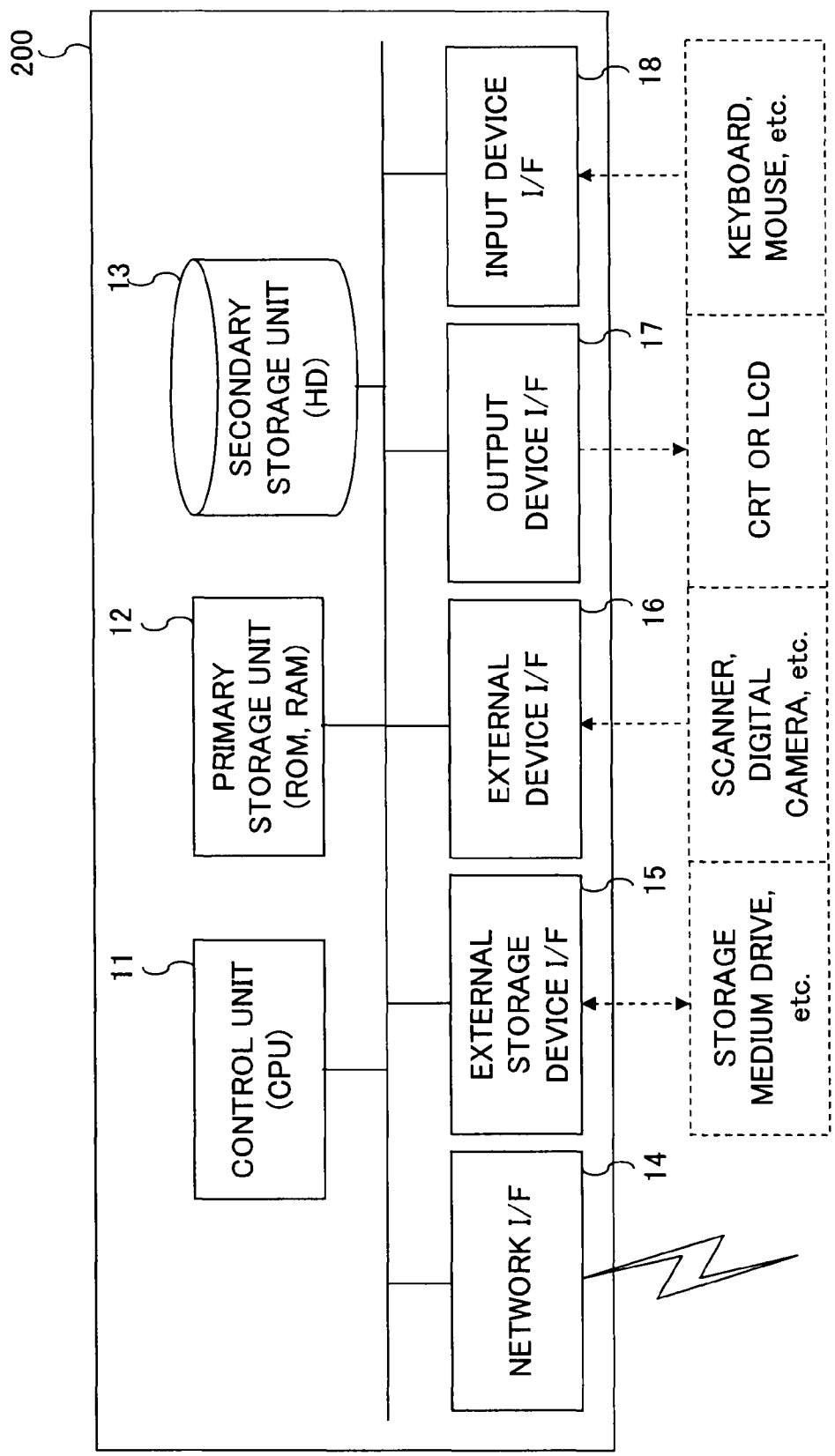
FIG. 6 is a diagram illustrating an exemplary hardware configuration of an information processing device according to the first embodiment of the present invention.

FIG. 6 is a diagram illustrating an exemplary hardware configuration of an information processing device 200 according to the first embodiment of the present invention.

As shown in FIG. 1, the information processing device 200 of this embodiment includes a control unit (CPU) 11, a primary storage unit (ROM, RAM) 12, a secondary storage unit (HD) 13, a network I/F 14, an external storage device I/F 15, an external device I/F 16, an output device I/F 17, and an input device I/F 18. Elements of the information processing device 200 shown in FIG. 6 corresponding to those of the image processing apparatus 100 of this embodiment shown in FIG. 1 are denoted by the same reference numerals and are not described here. The elements of the information processing device 200 different from those of the image processing apparatus 100 are described below.

The output device I/F 17 interfaces the information processing device 200 and an output device (e.g., a CRT (Cathode Ray Tube) and an LCD) connected via a data transmission line such as a dedicated cable.

The input device I/F 18 interfaces the information processing device 200 and an input device (e.g., a keyboard and a mouse) connected via a data transmission line such as a USB.

Thus, the information processing device 200 of this embodiment causes the control unit 11 to execute programs stored in the primary storage unit 12 and the secondary storage unit 13, sends control signals to appropriate units, and thereby provides functions of the information processing device 200. The information processing device 200 is connected to input and output devices that are different from those connected to the image processing apparatus 100. However, similar to the image processing apparatus 100, the information processing device 200 causes the control unit 11 to execute programs to control the appropriate units, and thereby process information managed by the information processing device 200 and information managed by a system connected to the information processing device 200.

That is, the minimum hardware elements required for the information processing device 200 to achieve an object the present invitation, which is to provide a highly robust system that allows easy customization and extension of an application without a need to consider multi-process architecture and that prevents basic functions of the system from being affected due to a failure of an extended function, are the same as the minimum required hardware elements of the image processing apparatus 100, is the same as the minimum hardware element required for the image processing apparatus 100. Accordingly, the above-described image processing apparatus 100 may correspond to an apparatus including the printing unit 21, the scanner unit 22, and the information processing device 200. Therefore, the information processing device 200 is illustrated in the following description.

<Multi-Process Architecture>

Multi-process architecture in the "pipes-and-filters" software configuration described with reference to FIGS. 2 through 5 is discussed with reference to FIGS. 7 through 9.

In the information processing device 200 of this embodiment, multi-process architecture is configured according to the following principles in order to provide a highly robust system that allows easy customization and extension of an application without a need to consider multi-process architecture and that prevents basic functions of the system from being affected due to a failure of an extended function.

(Principle 1) Execute self-developed basic functions and an extended function developed by a third-party vendor in different processes.

(Principle 2) Execute frequently-used basic functions (of a basic application) in the same process (the same JVM).

(Principle 3) Minimize influence of component implementation on the application logic layer 103.

<<Process Configuration>>

Figure 7:
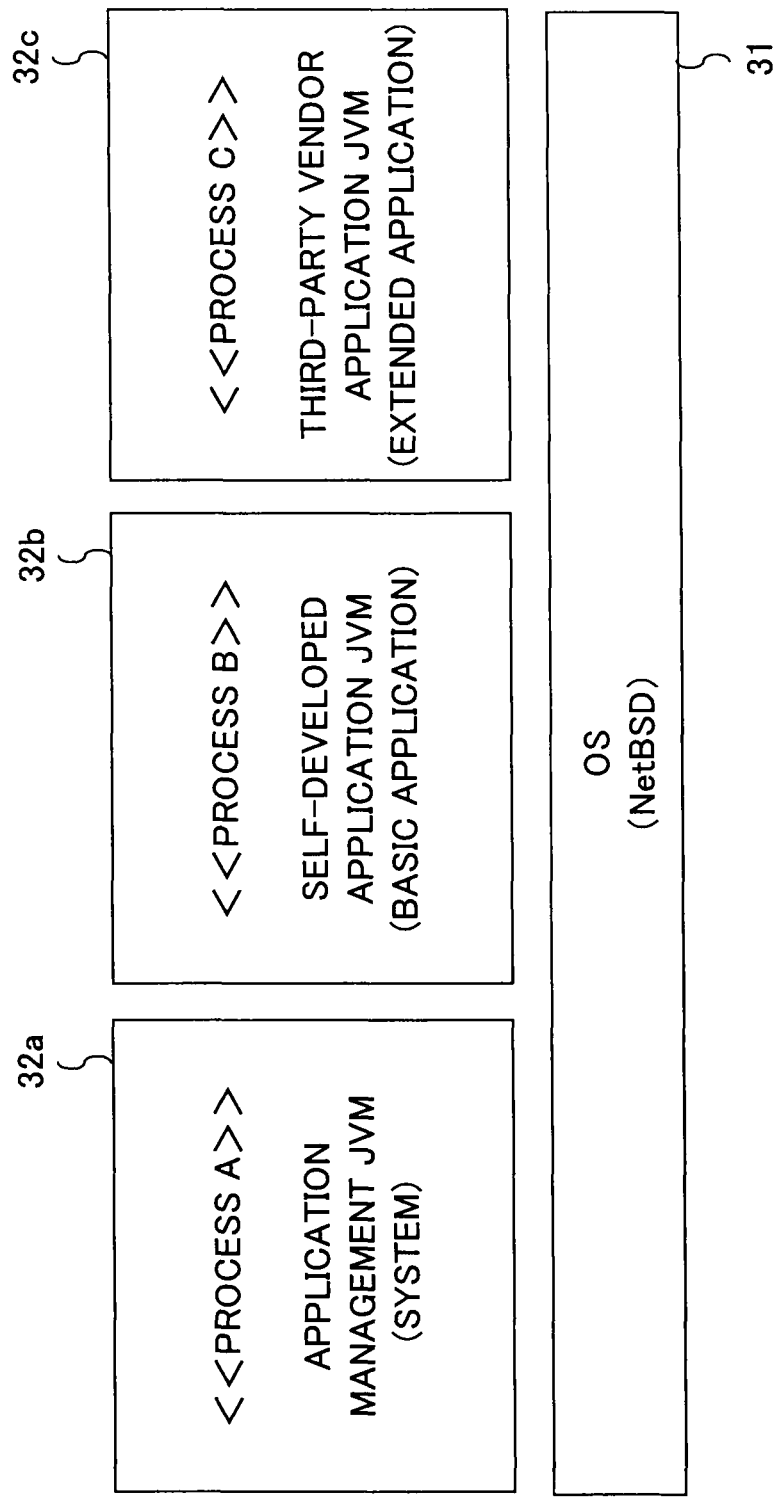
FIG. 7 is a diagram illustrating an exemplary process configuration according to the first embodiment of the present invention.

FIG. 7 is a diagram illustrating an exemplary process configuration according to the first embodiment of the present invention.

Referring to FIG. 7, in order to achieve multi-process architecture according to Principle 1, in the information processing device 200 of this embodiment, a process activated by an OS 31 (e.g., NetBSD) is split into a process A (first process) 32*a* for executing an application management JVM, a process B (second process) 32*b* for executing a self-developed application (basic application) JVM, and a process C (third process) 32*c* for executing a third-party vendor application (extended application) JVM.

A JVM is briefly described below. A JVM forms, as a process on the OS 31, address space on the main memory. The "address space" as used herein indicates a unit of memory management under process management. The OS 31 activates processes by expanding (loading) programs stored in the secondary storage unit 13 such as a hard disk onto the memory, allocates (dispatches) physical memory to each process, and manages usage. An area for expanding a Java application is reserved in the address space of the JVM expanded on the memory.

In the process A 32*a*, application management software (system: self-developed infrastructure software) that manages activation and termination of an application is executed. In the process B 32*b*, basic application software that provides basic functions of the information processing device 200 is executed. In the process C 32*c*, extended application software that provides an extended function added to the information processing device 200 is executed.

Thus, the information processing device 200 of this embodiment prevents the basic functions of the system from being affected due to a failure of an extended function (an installed extended application) (e.g., prevents a system crash (abnormal termination of the system)) and, even if the extended function uses a large amount of memory, stably provides functions to users without affecting the application management software.

<<Arrangement of Layers in Processes>>

Figure 8:
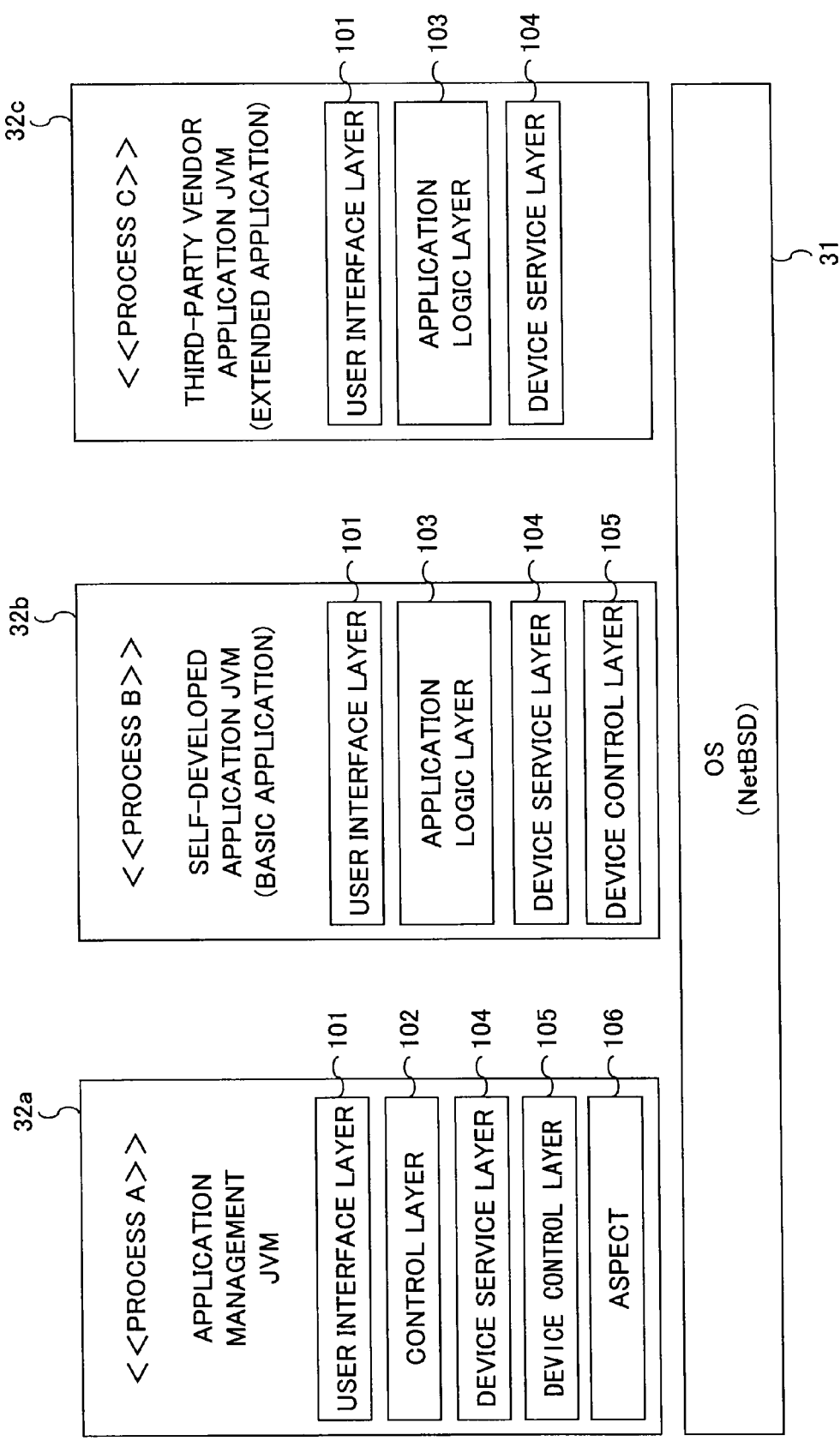
FIG. 8 is a diagram illustrating an exemplary arrangement of layers in processes according to the first embodiment of the present invention.

FIG. 8 is a diagram illustrating an exemplary arrangement of layers in processes according to the first embodiment of the present invention.

As shown in FIG. 8, the components of the layers are disposed in the three processes (three JVMs), which are split to have appropriate sizes as described with reference to FIG. 7, so as to be executed in the processes.

The user interface layer 101 includes components that serve as a framework of UIs for all the functions. Since these components have system-wide characteristics, the user interface layer 101 is disposed in the process A 32*a* for executing the application management software. Application-specific UIs are disposed in the process B 32*b* and the process C 32*c* for executing the basic application (self-developed application) and the extended application (third-party vendor application), respectively.

The control layer 102 includes components (software components for request management and session management) that control operations of applications and components (software components for plug-in management and apparatus monitoring) that provide functions related to all the components. Since these components have system-wide characteristics, the control layer 102 is disposed in the process A 32*a* for the application management software.

The application logic layer 103 includes components that provide the functions of the information processing device 200. In order to allow easy execution of operations of adding, modifying, and deleting functions, the application logic layer 103 is not disposed in the process A 32*a*, but is disposed in the process B 32*b* for the basic application and the process C 32*c* for the extended application.

The device service layer 104 includes components that provide common services used by the components of the application logic layer 103. Since the components of the application logic layer 103 are disposed in units of operations in the process B 32*b* and the process C 32*c*, the services required by the components of the application logic layer 103 are disposed in the process B 32*b* and the process C 32*c* that execute the corresponding components.

The device control layer 105 includes components corresponding to devices handled by the system and greatly affects the performance of the information processing device 200. Therefore, the device control layer 105 is disposed in the process A 32*a* for the application management software and the process B 32*b* for the basic application that provides the functions of the information processing device 200.

The aspect 106 includes components that handle cross-sectoral information related to the entire system. Since these components have system-wide characteristics, the aspect 106 is disposed in the process A 32*a* for the application management software.

In this manner, in the information processing device 200 of this embodiment, the components of the layers are disposed in appropriate processes in consideration of the characteristics of the layers. Further, according to Principle 2, the components of each of the input filters 103*a*, the process filters 103*b*, and the output filters 103*c* that are used for providing frequently-used functions of the application, such as a copier function, of the information processing device 200 are executed in the same process.

Thus the information processing device 200 of this embodiment can stably provide the frequently-used functions of the system to users.

<<Arrangement of Activities and Filters in Processes>>

FIGS. 9A and 9B are diagrams each illustrating an example in which activities and filters are disposed in processes according to the first embodiment of the present invention.

The arrangement of the components of the layers in the multiple processes based on characteristics of the layers is described above with reference to FIG. 8. The following describes, with reference to FIGS. 9A and 9B, arrangement of components in smaller units, i.e., in units of "filters" in the "pipes-and-filters" architecture and in units of "activities" that are provided by connecting filters, in multiple processes.

FIG. 9A shows an example of an "activity-based type" in which components are disposed in units of "activities". FIG. 9B shows an example of a "filter-based type" in which components are disposed in units of "filters". In FIGS. 9A and 9B, an "activity 1" A1 provided by connecting a "filter A" Fa and a "Filter B" Fb with a "pipe" P and an "activity 2" A2 provided by connecting a "filter A" Fa and a "filter C" Fc with a "pipe" P are shown.

In the "activity-based type" component configuration as shown in FIG. 9A, one or more filter components required by an activity component are disposed in a process including the activity component such that an activity is executed within a single process (single JVM).

On the other hand, in the "filter-based type" component configuration as shown in FIG. 9B, a single filter component is disposed in a single process such that an activity uses filters across plural processes (plural JVMs).

The "activity-based type" has the following advantages and disadvantages.

Advantages

Malfunction of a component of the extended application does not affect execution of other activities.

Since a series of operations from selecting a function, specifying operation settings, to executing an activity is performed within a single process, there is no need to perform inter-process communications. Therefore, it is possible to reduce the number of components that implement inter-process communications, and to prevent performance degradation due to overhead of inter-process communications.

It is possible to easily perform post-processing, such as dynamic termination of a process, during execution of an activity.

Disadvantages

Since different processes include the same component, the processes require byte code of the same class (or otherwise may share the byte code).

Since different processes include the same filter component, it is necessary to adjust a schedule of use of resources by filters among processes (i.e., it is necessary to perform exclusion control).

The "filter-based type" has the following advantages and disadvantages.

Advantages

Since different components do not include the same filter component, it is possible to improve memory efficiency.

Since different components do not include the same filter component, it is possible to determine a schedule of use of resources by filters within a single process.

Disadvantages

Execution of the basic application is affected due to use of a filter component for a basic application by an extended application.

Since a series of operations from selecting a function, specifying operation settings, to executing an activity is performed across plural processes, it is necessary to access plural filter components, resulting in frequent inter-process communications between filters.

Since processes are allocated on a per filter component basis, it is difficult to perform post-processing, such as dynamic termination of a process, during execution of an activity.

Since the "activity-based-type" has the advantages in that "malfunction of a component of the extended application does not affect execution of other activities" and in that "since a series of operations from selecting a function, specifying operation settings, to executing an activity is performed within a single process, there is no need to perform inter-process communications and therefore it is possible to reduce the number of components that implement inter-process communications and to prevent performance degradation due to overhead of inter-process communications", the "activity-based-type" is employed to achieve suitable multi-process architecture in the "pipes-and-filters" of the information processing device 200.

That is, the information processing device 200 of this embodiment employs, according to Principle 3, the activity-based type component configuration in which one or more filter components required by an activity component are disposed in a process including the activity component such that an activity is executed within a single process, and thereby provides a highly robust system that allows easy customization and extension of an application without a need to consider multi-process architecture and that prevents basic functions of the system from being affected due to a failure of an extended function.

Thus, the information processing device 200 of this embodiment is configured such that limited components corresponding to the framework perform inter-process communications between processes (JVMs) in the multiple-process environment, thereby hiding the influence of multi-process architecture on applications. This allows designing and developing an application without a need to consider the multiple-process environment.

<Functional Configuration of Information Processing Device>

The following discusses, with reference to FIGS. 10 through 16, how to execute the basic functions and the extended function of the information processing device 200 of this embodiment having the process configuration and the layer arrangement that are described with reference to FIGS. 7 through 9B, i.e. how to execute applications in the multiple-process environment.

FIG. 10 is a diagram illustrating an exemplary functional configuration of the information processing device 200 according to the first embodiment of the present invention.

The information processing device 200 of this embodiment includes an execution unit 51 for executing three processes (three JVMs) shown in FIG. 7.

With reference to FIG. 10, the execution unit 51 executes the following three processes. The execution unit 51 may be the OS 31, for example.

Process A

The process A 32a executes application management software that manages activation and termination of an application. The process A 32a stays resident after activation of the information processing device 200.

Process B

The process B 32b executes components that are preinstalled in the information processing device 200 and that serve as an input filter 103a, a process filter 103b, and/or an output filter 103c, i.e., components that provide standard functions of the information processing device 200.

Process C

The process C 32c executes components that are added to the information processing device 200 for function extension and that serve as an input filter 103a, a process filter 103b, and/or an output filter 103c.

The process B 32b and the process C 32c are executed by the execution unit 51 when necessary such as when an operations request is received from a user.

In this manner, in the information processing device 200 of this embodiment, memory space is split into space for executing the system, space for executing basic application software 81 that provides basic functions, and space for executing extended application software 82 that provides an extended function, thereby achieving multi-process architecture in which processes do not affect each other.

In the three processes executed by the execution unit 51, although the component configuration that minimizes inter-process communications is employed according to Principle 3, inter-process communications for operations requests, operation settings, and execution requests need to be performed between the application management software and the basic application software 81 and between the application management software and the extended application software 82.

Therefore, the information processing device 200 of this embodiment includes proxy components 71 that exchange data between the application management software executed in the process A and application software executed in the process B 32b or the process C 32c.

FIGS. 11A and 11B are diagrams each illustrating an exemplary mechanism of a proxy component 71 according to the first embodiment of the present invention.

In the example shown in FIG. 11A, the application management software calls applications AP. In the example shown in FIG. 11B, the applications AP call the application management software.

Normally, when the application management software calls the application AP1 or AP2, a call event is sent from a system-wide framework FW component to the application AP1 or AP2 using inter-process communications. On the other hand, when the application AP1 and AP2 call the application management software, call events are sent from the application AP1 and AP2 to the system-wide framework FW component using inter-process communications. Therefore, the applications AP need to be developed in consideration with inter-process communications.

In this embodiment, the proxy component 71 is disposed in each of the process B 32b for executing the extended application software 82 and the process C 32c for executing the application AP2. The proxy components 71 exchange data between the application management software between the application AP by performing inter-process communications between the application management process A 32a and the application process B 32b and between the application management process A 32a and the application process C 32c, thereby hiding inter-process communications (remote call function).

Thus, the applications AP can exchange events with the application management software using local calls as in the case where the applications AP are executed in single processes.

In this way, in the information processing device 200 of this embodiment, limited components corresponding to the framework FW perform inter-process communications between processes in the multiple-process environment, thereby hiding the influence of the multi-process architecture. This allows designing and developing the applications AP without a need to consider the inter-process communications with the application management software (i.e., without a need to consider the multiple-process environment).

Figure 12:
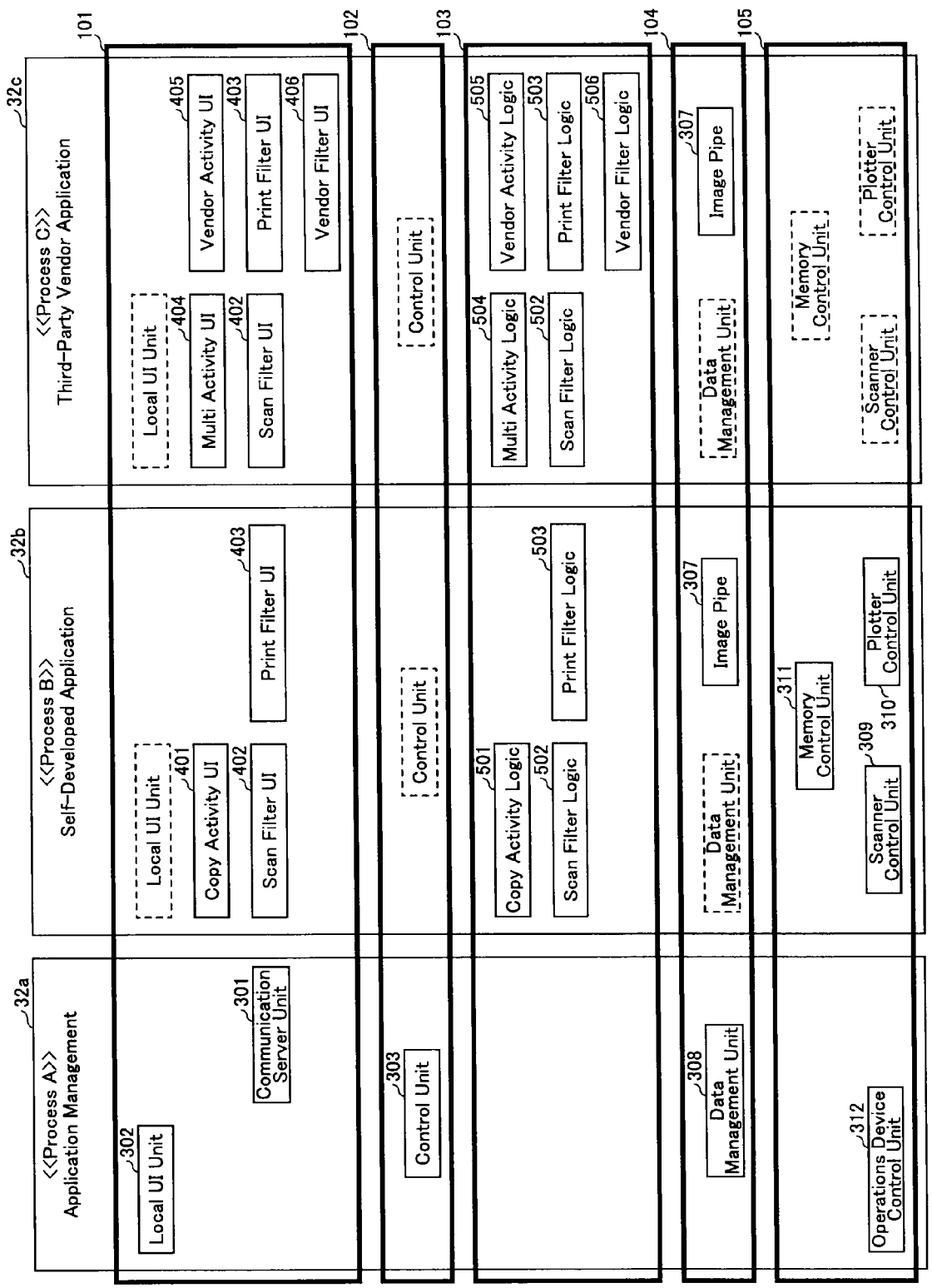
FIG. 12 is a diagram illustrating an exemplary arrangement of components of layers in processes (in the case of an activity-based type) according to the first embodiment of the present invention.

FIG. 12 is a diagram illustrating an exemplary arrangement of components of layers in processes (in the case of an activity-based type) according to the first embodiment of the present invention.

Components that need to perform inter-process communications between the process A 32a for the application management software and the process B 32b for the basic application software 81 or the process C 32c for the extended application software 82 and that have system-wide characteristics include the local UI unit 302 of the user interface layer 101, the control unit 303 of the control layer 102, the data management unit 308 of the device service layer 104, the scanner control unit 309, the plotter control unit 310, and the memory control unit 311 of the device control layer 105.

Therefore, proxy components 71, which are shown by dotted lines in FIG. 12, of these components are disposed in the process B 32b and the process C.

The following describes how the information processing device 200 of this embodiment makes a request for an operation of the application AP, a request for operation settings of the application AP, and a request for execution of the application AP upon execution of the application AP in the multiple-process environment.

According to the information processing device 200 of this embodiment, operations performed by a user using the UI screen to execute the application AP include selecting the application AP to be executed (i.e., making an operations request), specifying operation settings of input, processing, input filters of the selected application AP, and instructing execution of the application AP (i.e., making an execution request) in this order.

Therefore, in the multiple-process environment, the application management software needs to transmit an event based on a user instruction to a component that performs the subsequent operation in each operation step. That is, the application management software needs to determine the process that executes the component which performs the subsequent operation.

Therefore, the information processing device 200 of this embodiment includes an operations request transmission unit 61, an operation setting request transmission unit 62, and an execution request management unit 63.

The operations request transmission unit 61 is configured to transmit, when an instruction for selecting an application AP to be executed is received, the received operations request to the process for executing the application AP.

The operation setting request transmission unit 62 is configured to transmit, when a request for specifying the operation settings of an application AP is received, the received operation setting request to the process for executing the application AP.

The execution request management unit 63 arranges the registered execution request in a schedule, and instructs the process for the application AP when it is ready to execute the application AP.

The operations request transmission unit 61, the operation setting request transmission unit 62, and the execution request management unit 63 are described below in greater detail.

First, the operations request transmission unit 61 is described. The operations request transmission unit 61 is a function of the local UI unit 302 of the application management software. Upon receiving an instruction for selecting an application AP to be executed through a UI, the operations request transmission unit 61 determines a process for executing the application AP based on information for determining the process for executing the selected application AP and transmits the received operations request to the determined process.

Figure 13:
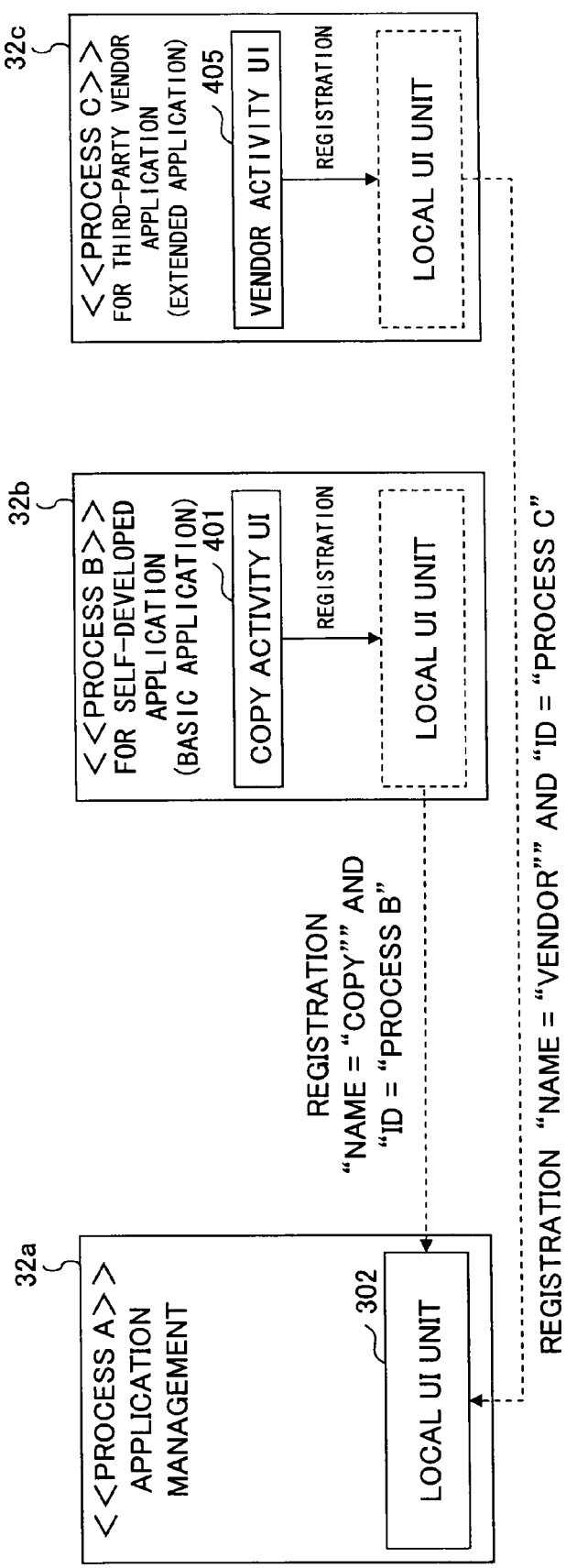
FIG. 13 is a diagram illustrating an exemplary method (activity selection method) of determining a process for an application according to the first embodiment of the present invention.

Information for determining processes for executing applications AP is generated according to a method shown in FIG. 13 and is stored in the memory by the application management software.

FIG. 13 is a diagram illustrating an exemplary method (activity selection method) of determining a process for executing an application according to the first embodiment of the present invention.

FIG. 13 shows how information for determining a process for executing an applications AP is registered in the application management software upon installation of the application AP.

Referring to FIG. 13, when an application AP is installed, an application identification information piece (e.g., activity name) for identifying the application AP and a process identification information piece (e.g., process ID) for identifying a process for executing the application AP are sent to the application management software through a proxy component 71 of the local UI unit 302.

For example, when a copy application is installed, a copy activity UI 401 of the copy application sends information pieces indicating "activity name="Copy"" and "process ID="Process B"" to the application management software as registration information pieces through a proxy component 71. When a third-party vendor application is installed, a vendor activity UI 405 of the third-party vendor application sends information pieces indicating "activity name="Vendor"" and "process ID="Process C"" to the application management software as registration information pieces through a proxy component 71.

FIG. 14 is a diagram illustrating exemplary correspondence relationship data 41 in which activities are associated with processes that execute the activities according to the first embodiment of the present invention.

Thus, the application management software collects an application identification information piece for identifying an application AP and a process identification information piece for identifying a process for executing the application AP from each process through inter-process communications with the proxy component 71, associates the collected application identification information piece and the process identification information piece with each other in the data structure as shown in FIG. 14, for example, and temporarily stores as the correspondence relationship data 41 in the memory.

The operations request transmission unit 61 sends the received operations request to the process determined from the application identification information piece of the selected application AP based on the correspondence relationship data 41 in which application identification information pieces are associated with the process identification information pieces.

Referring back to FIG. 10, the operation setting request transmission unit 62 is described. The operation setting request transmission unit 62 is a function of the local UI unit 302 of the application management software. When the operation setting request transmission unit 62 receives an operation setting request of an application AP (instruction for specifying the operations settings of an application AP) from a user through a UI, the operation setting request transmission unit 62 determines a process for executing the application AP based on information for determining the processes for executing the application AP and transmits the received operation setting request to the determined process.

After selecting the application AP to be executed (i.e., making an operations request), the user specifies operation settings of input, processing, input filters of the selected application AP. Therefore, the application management software needs to transmit an instruction for generating and displaying a UI screen for receiving operation settings of the application AP from the user to activity UIs and filter UIs which are components that generate UI elements (i.e., objects). The operations device control unit 312 of the application receives operation events through the displayed UI screen and transmits the received events to appropriate processes. That is, the application management software needs to determine the processes in which the activity UIs and the filter UIs are executed.

Information for determining processes for executing the application management software, activity UIs, and filter UIs is stored by the application management software as correspondence relationship data 42 shown in FIG. 15, for example.

FIG. 15 is a diagram illustrating exemplary correspondence relationship data 42 in which UIs are associated with processes that generate the UIs according to the first embodiment of the present invention.

As shown in FIG. 15, the application management software stores UI control component identification information pieces for identifying components (hereinafter referred to as "UI control components") that control activity UIs and filter UIs (and generate UI elements), screen element identification information pieces for identifying UI elements of applications AP that are generated by the UI control components and are displayed on the display screen, and process identification information pieces for identifying processes that execute the activities and filters as destinations of requests. The application management software stores these information pieces in combination with each other in the memory.

The screen element information pieces are numbers automatically assigned to the UI elements generated by the UI components (the activity UIs or the filter UIs) of the selected application AP. The local UI unit 302, including the proxy components 71, adds the screen element identification information pieces to the correspondence relationship data 42 in combination with the process identification information pieces.

For example, referring to FIG. 15, in the case where a copy application is installed, a screen element ID "1" is assigned to a UI element generated by the UI control component (the copy activity UI 401) of the copy application. Then the local UI unit 302 and the proxy component 71 in the process B 32b associate the screen element ID "1" with the process B 32b that executes the copy activity UI 401. Information pieces related to a scan filter UI 402 and a print filter UI 403 that provide a copy application function are added to the correspondence relationship data 42 in the same manner as described above. In the case where a third-party vendor application is installed, a screen element ID "4" is assigned to a UI element generated by the UI control component (the vendor activity UI 405) of the third-party vendor application. Then the local UI unit 302 and the proxy component 71 in the process C 32c associate the screen element ID "4" with the process C 32c that executes the vendor activity UI 405. Information pieces related to a vendor filter UI 406 and a print filter UI 403 that provide a vendor application function are added to the correspondence relationship data 42 in the same manner as described above.

In this way, the application management software causes the local UI unit 302 (including the proxy components 71) to associate the generated screen element identification information pieces and the process identification information pieces in combination with each other and temporarily stores them as the correspondence relationship data 42 in the memory.

Thus, in the case where a display device with a touch panel function is connected to the output device I/F 17 of the information processing device 200 of this embodiment, when a user touches a screen displayed on the display device to specify operation settings of the application AP, the application management software determines a screen element (a screen display region) touched on the screen and determines the screen element identification number of the determined screen element.

The process that executes corresponding activities UI and filter UIs are determined from screen element identification information pieces based on the correspondence relationship data 42 in which the screen element identification information pieces are associated with process identification information pieces. Then the operation setting request transmission unit 62 delivers an operation settings request, which is received by the operations device control unit 312, to the determined process.

Referring back to FIG. 10, the execution request management unit 63 is described. The execution request management unit 63 provides two major functions. The first is an execution request registration function provided using the local UI unit 302 (including the proxy components 71) of the application management software. The second is an execution start instructing function provided using the control unit 303.

Execution Request Registration Function

The execution request management unit 63 provides the execution request registration function for registering an execution request, which is received by the local UI unit 302, into the control unit 303. More specifically, when the an execution request of the application AP is received, execution request management unit 63 determines a process for executing the application AP based on information for determining the processes for the application AP and transmits the received execution request to the determined process.

After specifying the operation settings of input, processing, and output filters of the selected application AP, the user instructs execution (i.e., makes an execution request) of the application AP.

When the user instructs execution (i.e., makes an execution request) of the application AP, the operations device control unit 312 receives an operation event including the corresponding screen element ID. If the execution request is made by pressing a hardware key (a tart key of the image processing apparatus 100, an Enter key of the information processing device 200, etc.,), the operation event includes the screen element ID of the screen element displayed on the front side of the currently displayed screen.

The execution request management unit 63 uses the execution request registration function to refer to the correspondence relationship data 42 of FIG. 15 and determines the component as the destination of the execution request, and determines the process that executes the component. Then the execution request management unit 63 transmits the operation event to a proxy component 71 using inter-process communications, the proxy component 71 reports the screen element to the to the UI control component (activity UI corresponding to the application AP to be executed). The UI control component registers the execution request including information about operation settings that are currently applied on the reported screen element.

Execution Start Instructing Function

The execution request management unit 64 provides an execution start instructing function for arranging the received execution request in a schedule and instructing execution of the application AP when it is ready to execute the request. More specifically, when an execution request of the application AP is received, the execution request management unit 64 queues the received request using a predetermined method. Then, the execution request management unit 64 transmits the request to the application AP when it is ready to execute the request based on queuing information.

Since plural processes generate requests, the requests generated by the processes need to be centrally managed (queued). Therefore, the requests registered in the control unit 303 by the UI control components are transmitted to the application management process A 32a via the proxy components 71 and are centrally managed by the control unit 303 in the application management process A 32a. Since an executable request needs to be transmitted to the application AP, data as shown in FIG. 16 need to be stored in the memory as information for determining the process for executing the application AP that generated the request.

FIG. 16 is a diagram illustrating exemplary correspondence relationship data 43 in which requests are associated with processes that generate the requests according to the first embodiment of the present invention.

Referring to FIG. 16, the application management software holds execution request identification information pieces for identifying received execution requests of the applications AP to be registered into the control unit 303 and process identification information pieces for identifying processes for executing the applications AP as destinations of the requests.

The execution request identification pieces are automatically generated, for example, in the order of reception upon reception of the execution requests of the applications AP. The control unit 303 adds the generated execution request information pieces and the process identification information pieces in combination with each other to the correspondence relationship data 43.

For example, referring to FIG. 16, when an execution request of the copy application is received, the control unit 303 and the proxy component 71 in the process B 32b associate a request ID "1", which is generated upon reception of the execution request for identifying the execution request, with the process B 32b for executing the copy application and add these information pieces to the correspondence relationship data 43. When an execution request of the third-party vendor application is received, the control unit 303 and the proxy component 71 in the process B 32b associate a request ID "2", which is generated upon reception of the execution request for identifying the execution request, with the process B 32b for executing the third-party vendor application and add these information pieces to the correspondence relationship data 43.

In this way, the application management software causes the control unit 303 (including the proxy components 71) to associate the generated execution request identification information pieces and the process identification information pieces in combination with each other and temporarily stores them as the correspondence relationship data 43 in the memory.

The execution request management unit 63 uses the execution start instructing function to transmit an instruction for starting execution of a request to the proxy component 71 in the process for the application AP, wherein the process is determined from the execution request identification information piece of the executable request based on the correspondence relationship data 43 in which execution request identification information pieces are associated with process identification information pieces, and reports it to the application AP in the process that executes the proxy component 71.

In this way, the execution request management unit 63 instructs starting execution of the application AP according to the execution request received from the user using the above-described two functions.

The information processing device 200 of this embodiment executes the above-described units in the multiple-process environment using the following steps to execute an application.

Step 1: Selecting an Application AP to be Operated (Selecting an Activity)

The information processing device 200 receives an operations request from a user via the local UI unit 302 of the application management software.

Upon receiving the operations request (instruction for selecting the application AP to be operated), the information processing device 200 causes the operations request transmission unit 61 of the local UI unit 302 to transmit the received operations request to the process determined from the application identification information piece based on the correspondence relationship data 41, in which application identification information pieces are associated with process identification information pieces, stored in the memory.

Step 2: Specifying Operation Settings of Application AP

The information processing device 200 receives a request for specifying operation settings of an application AP from a user via the local UI unit 302 of the application management software.

Upon receiving the request for specifying operation settings of the application AP to be performed, the information processing device 200 causes the operation setting request transmission unit 62 of the local UI unit 302 to transmit the received operation setting request to the process determined from the screen element identification information piece based on the correspondence relationship data 42, in which the screen element identification information pieces are associated with the process identification information pieces, stored in the memory.

Step 3: Executing Application AP

The information processing device 200 receives a request for execution of the application AP from a user via the local UI unit 302 of the application management software.

Upon receiving the request for execution of the application AP, the information processing device 200 uses the execution request transmission function, which is provided by the execution request management unit 63 using the local UI unit 302, to send the received execution request to the process determined from the execution request information piece based on the correspondence relationship data 42, in which screen element identification information pieces are associated with process identification information pieces, stored in the memory. Then the information processing device 200 uses the execution start instructing function, which is provided by the execution request management unit 63 using the control unit 303, to send the executable execution request to the process determined from the execution request information piece based on the correspondence relationship data 43, in which execution request identification information pieces are associated with process identification information pieces, stored in the memory.

In this way, the information processing device 200 of this embodiment can stably perform operations such as selecting an application AP, specifying operation settings, and executing a function in the multiple-process environment using Steps 1 through 3 described above. That is, the information processing device 200 of this embodiment can stably provide functions to users.

<Basic Procedure for Application Execution (Copier Function)>

A specific procedure for application execution in the information processing device 200 of this embodiment is described below with reference to FIGS. 17 through 19 by taking a procedure to provide a copier function as an example.

The information processing device 200 of this embodiment expands, for example, application management software and a basic application program (self-developed application program) stored in the secondary storage unit 13, such as a hard disk, of the information processing device 200 and an installed extended application program (third-party vendor application program) into the memory and causes the control unit 11 to execute the programs. The procedures shown in FIGS. 17 through 19 are performed in the corresponding user operation stages. The "user operation stages" as used here indicate operations performed by a user using the UI screen to execute the application AP, including operations for selecting the application AP to be executed (i.e., making an operations request), specifying operation settings of input, processing, input filters of the selected application AP, and instructing execution of the application AP (i.e., making an execution request).

Figure 17:
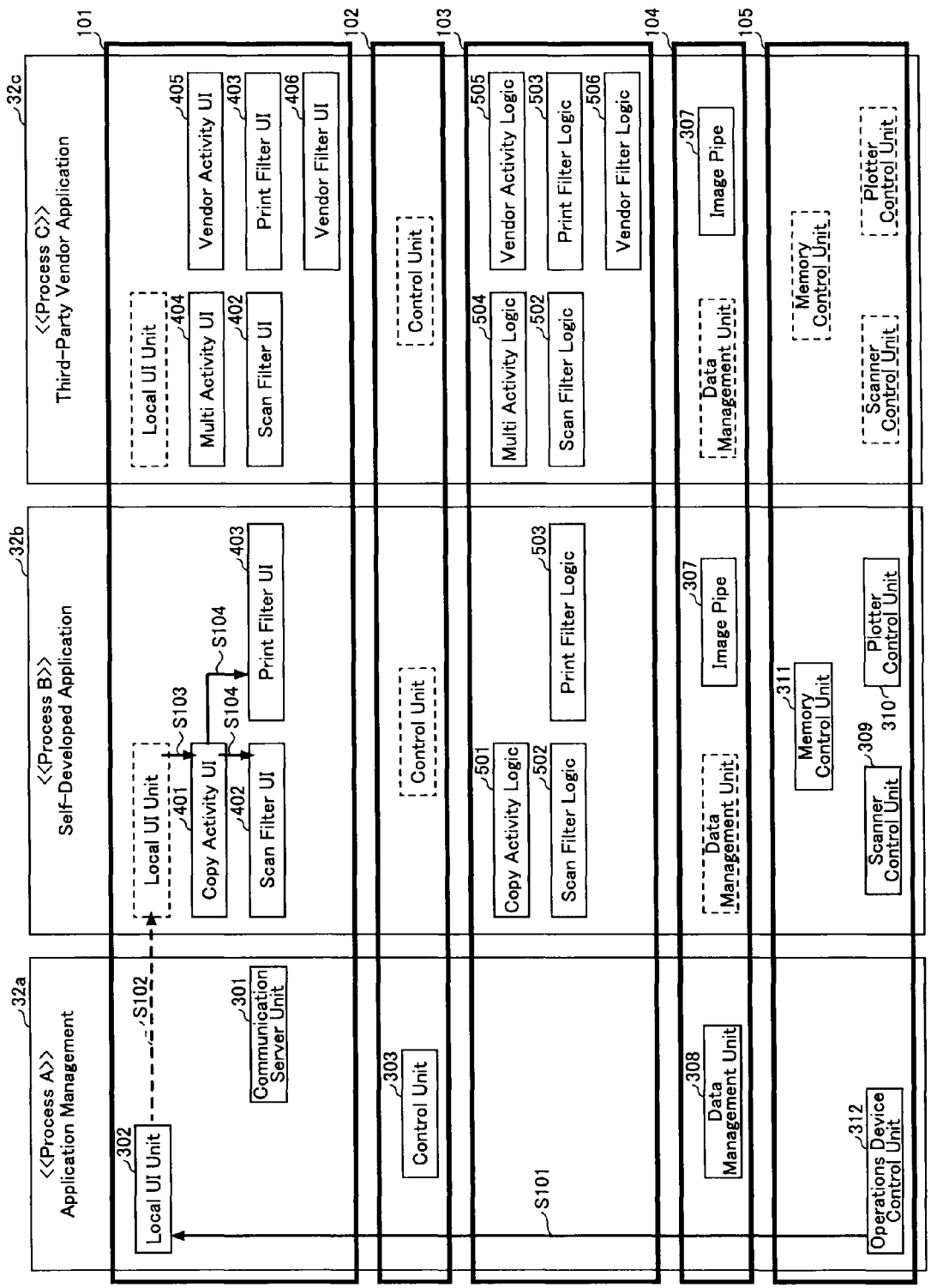
FIG. 17 is a diagram illustrating an exemplary procedure (of selecting an activity) that is performed for providing a copier function according to the first embodiment of the present invention.

FIG. 17 is a diagram illustrating an exemplary procedure (of selecting an activity) that is performed for providing a copier function according to the first embodiment of the present invention.

According to the information processing device 200 of this embodiment, in the process A 32a for the application management software executed by the execution unit 51, upon receiving an operations request from a user based on an instruction for selecting an application AP (copier function), the operations device control unit 312 transmits the received UI event (operations request) to the local UI unit 302 (S101).

The local UI unit 302 causes the operations request transmission unit 61 to determine the process B 32b that is executed by the execution unit 51 and executes the copier function based on the correspondence relationship data 41, in which application identification information pieces are associated with process identification information pieces, stored in the memory and to send the UI event (operations request) to the determined process B 32b using inter-process communications (S102).

In the process B 32b, the UI event (operations request) received via a proxy component 71 of the local UI unit 302 (i.e., a local UI unit in the process B 32b shown by dotted lines in FIG. 17) is sent to the copy activity UI 401 of the copier function to be executed (S103).

Upon receiving the UI event (operations request), the copy activity UI 401 generates its UI element and sends the received UI event to the scan filter UI 402 and the print filter UI 403 that provide the copy application (S104).

Upon receiving the UI event (operations request), the scan filter UI 402 and the print filter UI 403 generate their UI elements. The generated UI elements are sent to the proxy component 71 of the local UI unit 302. The local UI unit 302 assigns screen element identification information pieces to the UI elements and stores the screen element identification information pieces in combination with process identification information pieces in the correspondence relationship data 42 stored in the memory. The registered UI elements are sent to and displayed by the operations device control unit 312.

In this way, the information processing device 200 of this embodiment can display a UI screen for specifying operation settings of the application AP to be executed in response to the operations request from the user.

Figure 18:
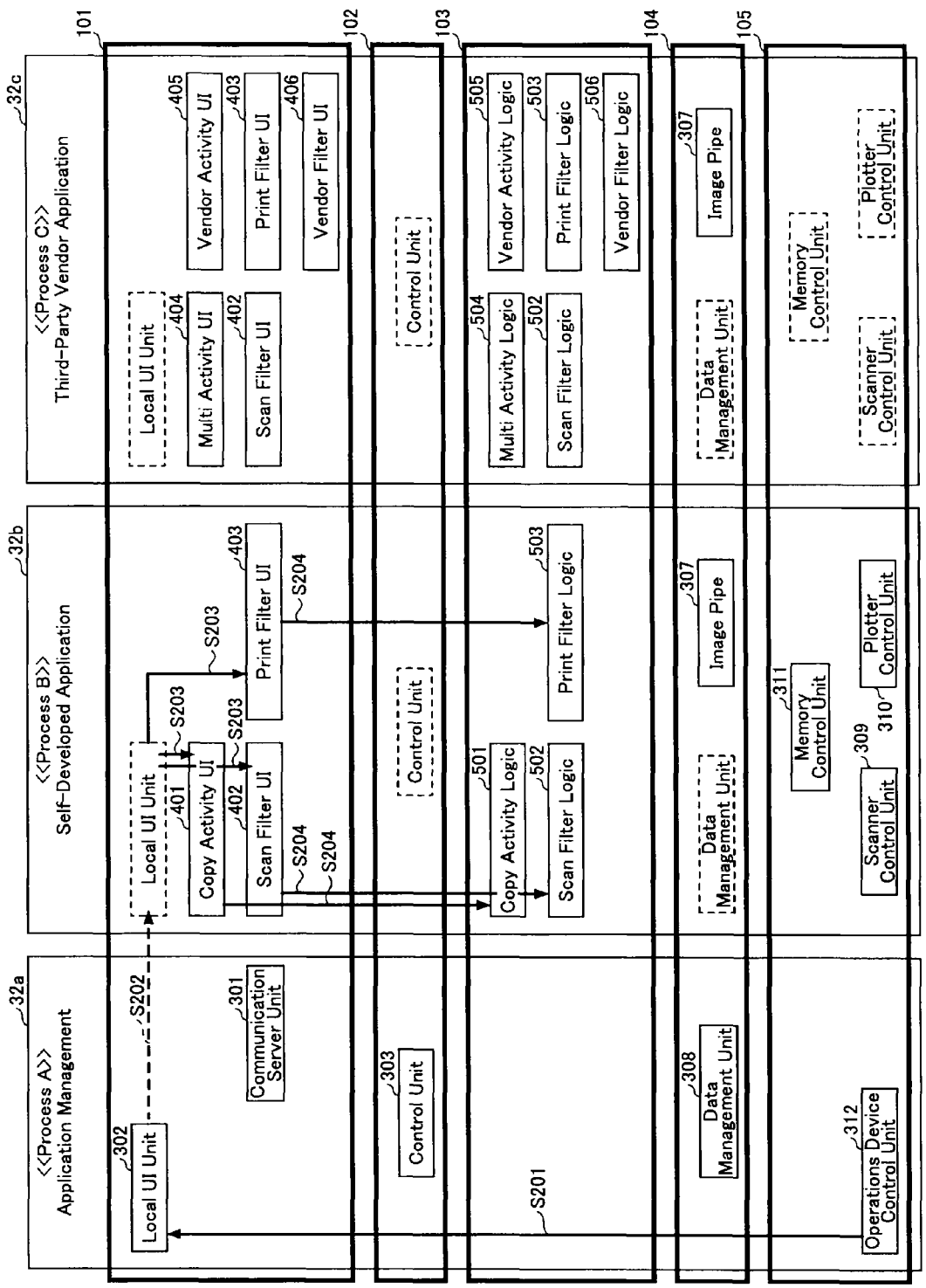
FIG. 18 is a diagram illustrating an exemplary procedure (of changing a setting) that is performed for providing a copier function according to the first embodiment of the present invention.

FIG. 18 is a diagram illustrating exemplary procedure (of changing a setting) that is performed for providing a copier function according to the first embodiment of the present invention.

According to the information processing device 200 of this embodiment, in the process A 32a for the application management software executed by the execution unit 51, upon receiving an operation setting request from a user based on an instruction for specifying operation settings of an application AP, the operations device control unit 312 transmits the received UI event (operation setting request) to the local UI unit 302 (S201).

The local UI unit 302 causes the operation setting request transmission unit 62 to determine the process B 32b that is executed by the execution unit 51 and executes the copier function based on the correspondence relationship data 42, in which screen element identification information pieces are associated with process identification information pieces, stored in the memory and to send the UI event (operation setting request) to the determined process B 32b using inter-process communications (S202).

In the process B 32b, based on screen element identification information pieces contained in the UI event (operation setting request) received via the proxy component 71 of the local UI unit 302 (i.e., the local UI unit of the process B 32b shown by dotted lines in FIG. 18), components that have generated the UI elements, namely, the copy activity UI 401, and the scan filter and print filter UIs 402 and 403 that provide the copy application, are determined. Then the operation settings are sent to the copy activity UI 401, the scan filter UI 402, and the print filter UI 403 (S203).

The copy activity UI 401, the scan filter UI 402, and the print filter UI 403 apply the corresponding operation settings to a copy activity logic 501, a scan filter logic 502, and a print filter logic 503, respectively (S204).

In this way, the information processing device 200 of this embodiment can apply the operation settings specified by the user to the components that provide the functions of the application AP to be executed.

Figure 19:
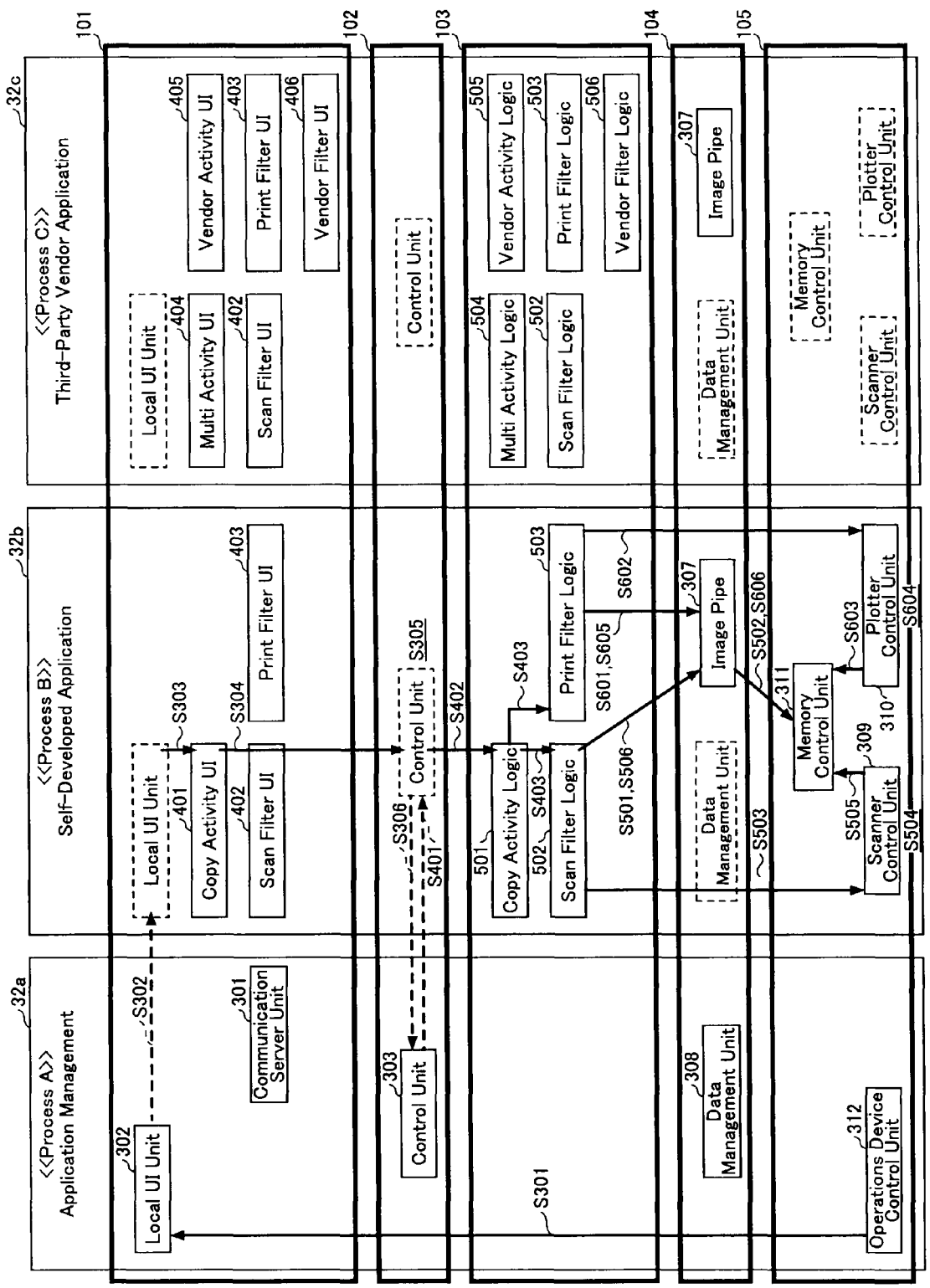
FIG. 19 is a diagram illustrating an exemplary procedure (of executing a request) that is performed for providing a copier function according to the first embodiment of the present invention.

FIG. 19 is a diagram illustrating an exemplary procedure (of executing a request) that is performed for providing a copier function according to the first embodiment of the present invention.

According to the information processing device 200 of this embodiment, in the process A 32a for the application management software executed by the execution unit 51, upon receiving an execution request from a user based on an instruction for executing the application AP, the operations device control unit 312 transmits the received UI event (execution request) to the local UI unit 302 (S301).

The local UI unit 302 causes the execution request management unit 63 to determine the process B 32b that is executed by the execution unit 51 and executes the copier function based on the correspondence relationship data 42, in which screen element identification information pieces are associated with process identification information pieces, stored in the memory and to send the UI event to the determined process B 32b using inter-process communications (S302).

In the process B 32b, the UI event (execution request) received via the proxy component 71 of the local UI unit 302 (i.e., the local UI unit of the process B 32b shown by dotted lines in FIG. 19) is sent to a UI control component to be executed, namely, the copy activity UI 401 of the copier function (S303).

The copy activity UI 401 registers the received UI event (execution request) into a proxy component 71 of the control unit 303 (i.e., a control unit of the process B 32b shown by dotted lines in FIG. 19) (S304).

The proxy component 71 of the control unit 303 in the process B 32b connects the scan filter logic 502 and the print filter logic 503 that provide the copy application function with the image pipe 307 (S305). The proxy component 71 of the control unit 303 generates an execution request identification information piece for the received UI event (execution request). After Step S305, the proxy component 71 of the control unit 303 sends the UI event (execution request) to the process A 32a using inter-process communications (S306).

In the process A 32a, the control unit 303 queues the UI event (execution request). The control unit 303 arranges the registered execution request in a schedule and sends an instruction for starting execution to the proxy component 71 in the process for the application AP, wherein the process is determined from an execution request identification information piece of the executable execution request (S401). This embodiment is described by taking the copier function as an example. Therefore, if an execution request of a copier function is executable, the execution request is sent to the determined process B 32*b* to instruct the copy application to start execution.

In the process B 32*b*, the proxy component 71 of the control unit 303 transmits the received execution request to the copy activity logic 501 (S402). The copy activity logic 501 transmits the execution request to the scan filter logic 502 and the print filter logic 503 that provide the copy application function (S403).

Upon receiving the execution request, the scan filter logic 502 instructs the image pipe 307, which is connected to the filters in Step S305, to reserve memory space for storing an image to be scanned (S501). The image pipe 307 causes the memory control unit 311 to reserve predetermined memory space according to the instruction for reserving memory space (S502).

Then, according to the received execution request, the scan filter logic 502 instructs the scanner control unit 309 to scan an image (S503). The scanner control unit 309 scans an image according to the scan instruction (S504), and writes the scanned image data into the reserved predetermined memory space (S505). The scan filter logic 502 instructs the image pipe 307 to transmit storage location information (address information) of the written image data (S506).

On the other hand, upon receiving the execution request, the print filter logic 503 requests the image pipe 307 for the storage location information of the written image data and acquires the storage location information from the image pipe 307 if the image data are written into the memory in Step S505 (S601).

Then, the print filter logic 503 instructs the plotter control unit 310 to print (plot) the image data based on the acquired storage location information (S602). The plotter control unit 310 reads the image data via the memory control unit 311 based on the storage location information (S603) and prints the read image data onto paper (S604).

Then, the print filter logic 503 instructs, based on the storage location information, the image pipe 307 to release the memory space that is reserved in Step S501 (S605).

The image pipe 307 instructs the memory control unit 311 to release the reserved memory space (S606).

In this way, the information processing device 200 of this embodiment can execute the application AP according to an execution request from a user.

<Basic Procedure for Application Execution (Vendor Extended Function)>

Figure 21:
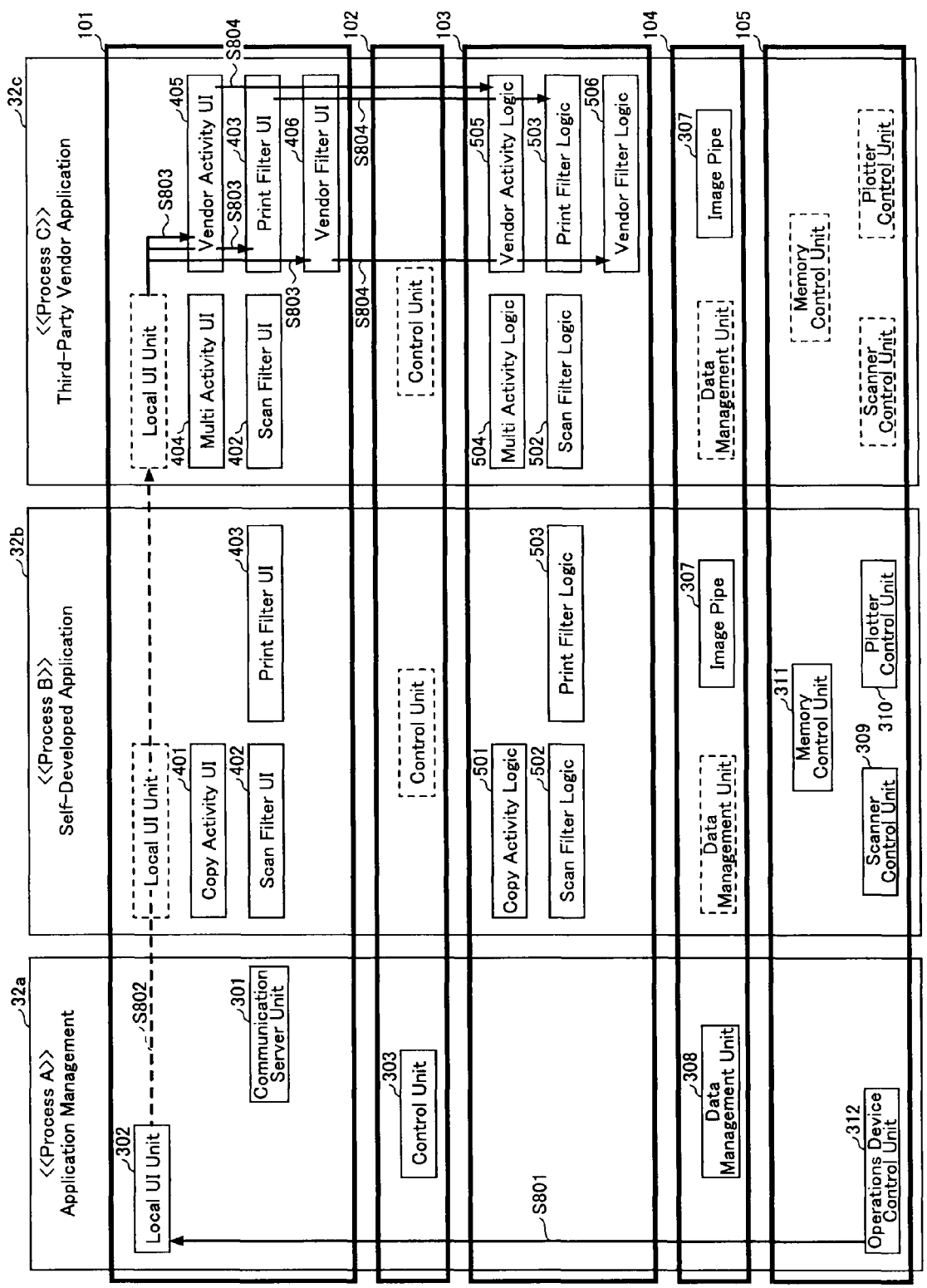
FIG. 21 is a diagram illustrating an exemplary procedure (of changing a setting) that is performed for providing a function of a third-party vendor application according to the first embodiment of the present invention.
Figure 22:
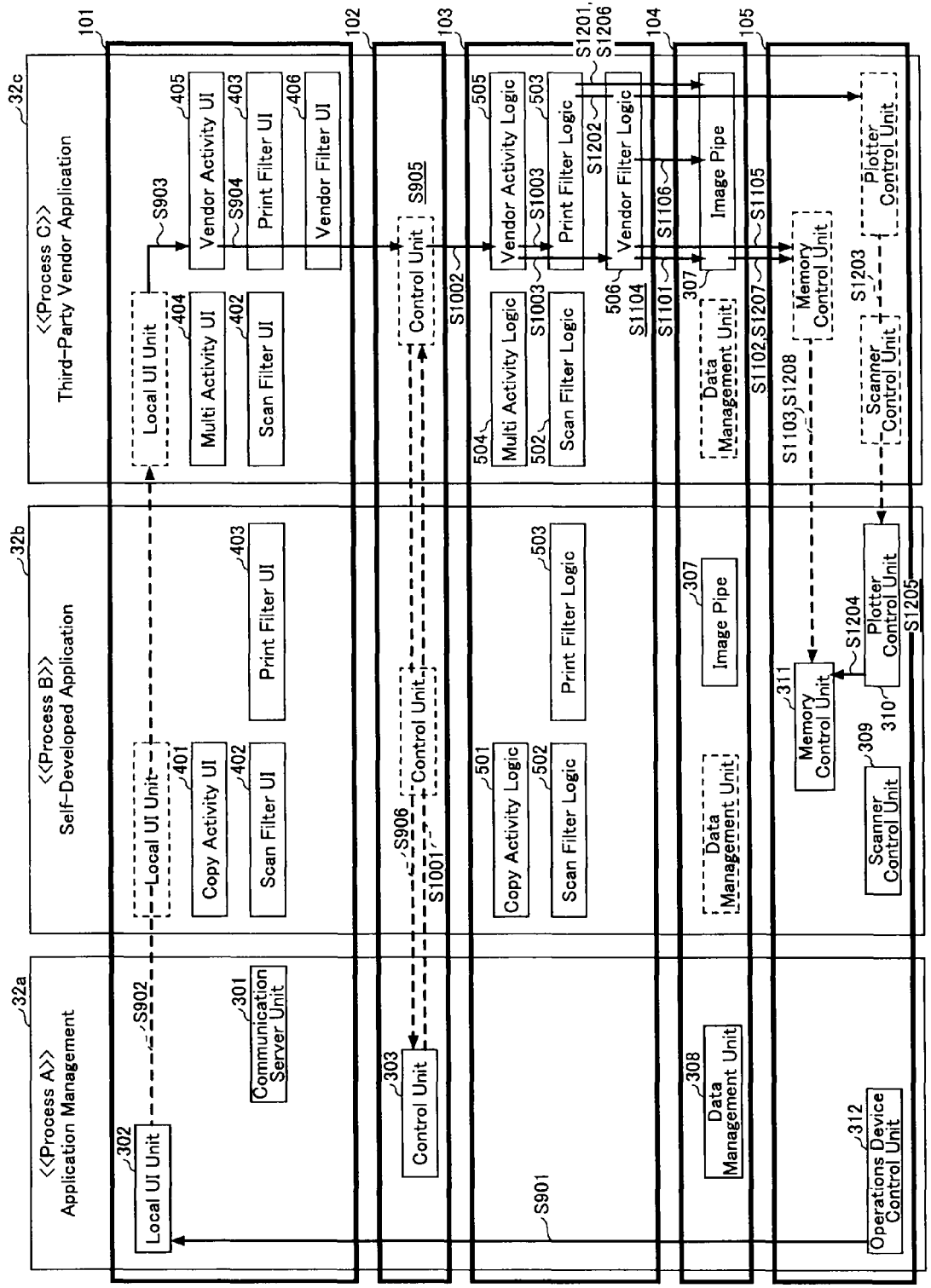
FIG. 22 is a diagram illustrating an exemplary procedure (of executing a request) that is performed for providing a function of a third-party vendor application according to the first embodiment of the present invention.

A specific procedure for application execution in the information processing device 200 of this embodiment is described below with reference to FIGS. 20 through 22 by taking a procedure to provide a vendor extended function of the extended application software 82 as an example. The extended application software 82 (third-party vendor application software 82) described below with reference to FIGS. 20 through 22 provides an extended function by connecting an input filter 103*a* developed by a third-party vendor and an output filter 103*c* pre-installed in the information processing device 200 with an image pipe 307.

Figure 20:
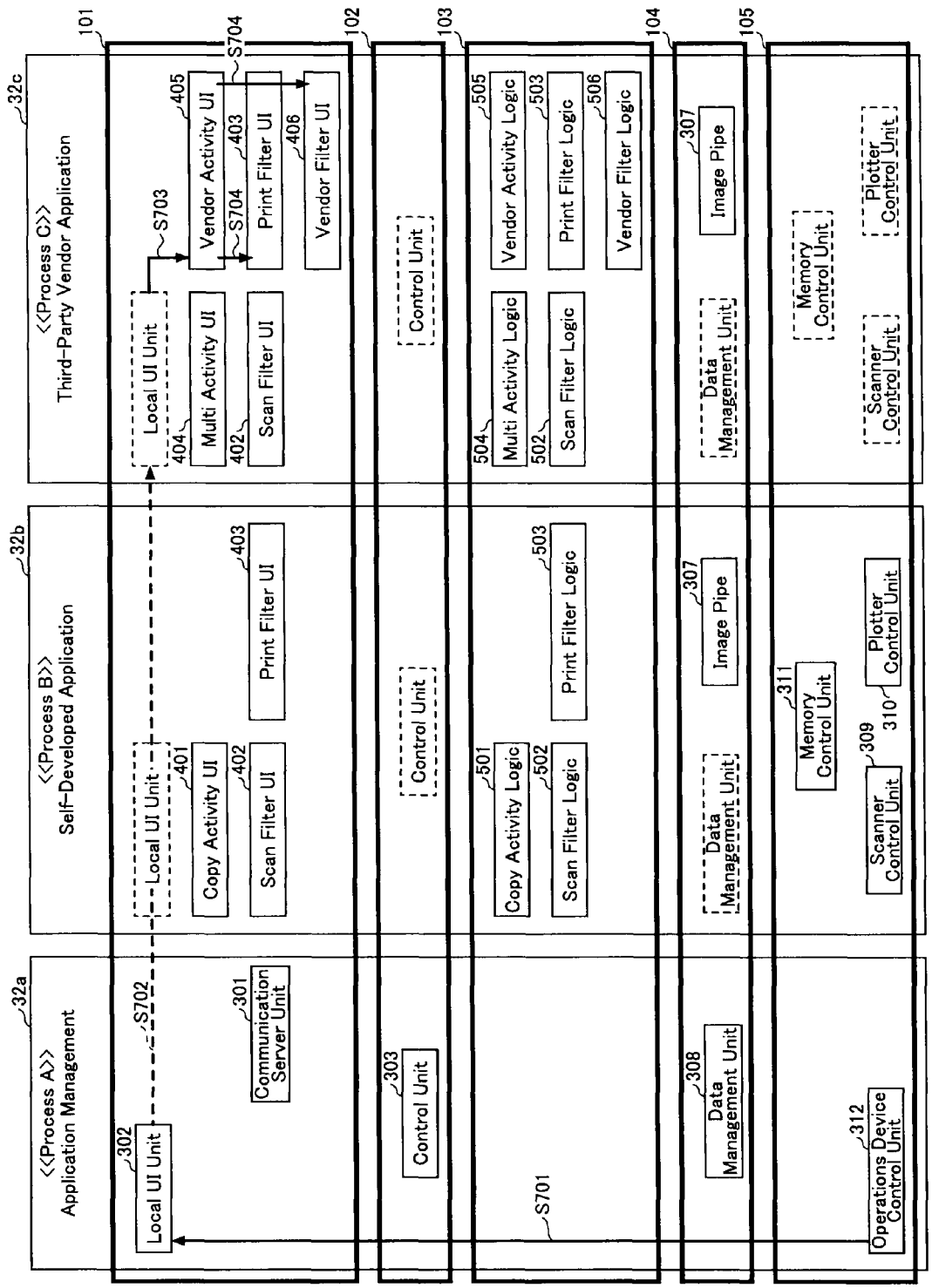
FIG. 20 is a diagram illustrating an exemplary procedure (of selecting an activity) that is performed for providing a function of a third-party vendor application according to the first embodiment of the present invention.

FIG. 20 is a diagram illustrating an exemplary procedure (of selecting an activity) that is performed for providing a function of a third-party vendor application according to the first embodiment of the present invention.

According to the information processing device 200 of this embodiment, in the process A 32*a* for the application management software executed by the execution unit 51, upon receiving an operations request from a user based on an instruction for selecting an application AP (vendor function), the operations device control unit 312 transmits the received UI event (operations request) to the local UI unit 302 (S701).

The local UI unit 302 causes the operations request transmission unit 61 to determine the process C 32*c* that is executed by the execution unit 51 and executes the vendor function based on the correspondence relationship data 41, in which application identification information pieces are associated with process identification information pieces, stored in the memory and to send the UI event (operations request) to the determined process C 32*c* using inter-process communications (S702).

In the process (third process) C 32*c*, the UI event (operations request) received via a proxy component 71 of the local UI unit 302 (i.e., a local UI unit of the process C 32*c* shown by dotted lines in FIG. 20) is sent to the vendor activity UI 405 of the vendor function to be executed (S703).

The vendor activity UI 405 generates its UI element and sends the received UI event to a vendor (input) filter UI 406 (hereinafter referred to as a "vendor filter UI 406") and the print filter UI 403 that provide the third-party vendor application (S704).

Upon receiving the UI event (operations request), the vendor filter UI 406 and the print filter UI 403 generate their UI elements. The generated UI elements are sent to the proxy component 71 of the local UI unit 302. The proxy component 71 assigns screen element identification information pieces to the UI elements and stores the screen element identification information pieces in combination with process identification information pieces in the correspondence relationship data 42 stored in the memory. The registered UI elements are sent to and displayed by the operations device control unit 312.

FIG. 21 is a diagram illustrating the exemplary procedure (of changing a setting) that is performed for providing a function of a third-party vendor application according to the first embodiment of the present invention.

According to the information processing device 200 of this embodiment, in the process A 32*a* for the application management software executed by the execution unit 51, upon receiving an operation setting request from a user based on an instruction for specifying operation (condition) settings of an application AP, the operations device control unit 312 transmits the received UI event (operation setting request) to the local UI unit 302 (S801).

The local UI unit 302 causes the operation setting request transmission unit 62 to determine the process C 32*c* that is executed by the execution unit 51 and executes the vendor function based on the correspondence relationship data 42, in which screen element identification information pieces are associated with process identification information pieces, stored in the memory and to send the UI event (operation setting request) to the determined process C 32*c* using inter-process communications (S802).

In the process (third process) C 32*c*, based on screen element identification information pieces contained in the UI event (operation setting request) received via the proxy component 71 of the local UI unit 302 (i.e., the local UI unit in the process C 32*c* shown by dotted lines in FIG. 21), components that have generated the UI elements, namely, the vendor activity UI 405, the vendor and print filter UIs 406 and 403 that provide the third-party vendor application, are determined. Then the operation settings are sent to the vendor activity UI 405, the vendor filter UI 406, and the print filter UI 403 (S803).

The vendor activity UI 405, the vendor filter UI 406, and the print filter UI 403 apply the corresponding operation settings to a vendor activity logic 505, a vendor input filter logic 506 (hereinafter referred to as a "vendor filter logic 506"), and a print filter logic 503, respectively (S804).

FIG. 22 is a diagram illustrating the exemplary procedure (of executing a request) that is performed for providing a function of a third-party vendor application according to the first embodiment of the present invention.

According to the information processing device 200 of this embodiment, in the process A 32a for the application management software executed by the execution unit 51, upon receiving an execution request from a user based on an instruction for executing the application AP, the operations device control unit 312 transmits the received execution request to the local UI unit 302 (S901).

The local UI unit 302 causes the execution request management unit 63 to determine the process C 32c that is executed by the execution unit 51 and executes the vendor function based on the correspondence relationship data 42, in which screen element identification information pieces are associated with process identification information pieces, stored in the memory and to send the UI event (operation request) to the determined process C 32c using inter-process communications (S902).

In the process C 32c, the UI event (execution request) received via the proxy component 71 of the local UI unit 302 (i.e., the local UI unit in the process C 32c shown by dotted lines in FIG. 22) is sent to a UI control component to be executed, namely, the vendor activity UI 405 of the vendor function (S903).

The vendor activity UI 405 registers the received UI event (execution request) into a proxy component 71 of the control unit 303 (i.e., a control unit in the process C 32c shown by dotted lines in FIG. 22) (S904).

The proxy component 71 of the control unit 303 in the process C 32c connects the vendor filter logic 506 and the print filter logic 503 that provide the vendor application function with the image pipe 307 (S905). The proxy component 71 of the control unit 303 generates an execution request identification information piece for the received UI event (execution request). After Step S905, the proxy component 71 of the control unit 303 sends the UI event (execution request) to the process A 32a using inter-process communications (S906).

In the process A 32a, the control unit 303 queues the UI event (execution request). The control unit 303 arranges the registered execution request in a schedule and sends an instruction for starting execution to the proxy component 71 in the process for the application AP, wherein the process is determined from an execution request identification information piece of the executable execution request (S1001). This embodiment is described by taking the vendor function as an example. Therefore, if an execution request of a vendor function is executable, the execution request is sent to the determined process C 32c to instruct the third-party vendor application to start execution.

In the process C 32c, the proxy component 71 of the control unit 303 transmits the received execution request to the vendor activity logic 505 (S1002). The vendor activity logic 505 transmits the execution request to the vendor filter logic 506 and the print filter logic 503 that provide the vendor application function (S1003).

Upon receiving the execution request, the vendor filter logic 506 instructs the image pipe 307, which is connected to the filters in Step S905, to reserve memory space for storing an image to be scanned (S1101). The image pipe 307 causes the memory control unit 311 in the process B 32b to reserve predetermined memory space via a proxy component 71 of the memory control unit 311 (i.e., a memory control unit in the process C 32c shown by dotted lines in FIG. 22) according to the instruction for reserving memory space (S1102 and S1103).

Then, according to the received execution request, the vendor filter logic 506 inputs image data via the network I/F 14 of the information processing device 200 or from a memory card via the external storage device I/F 15, for example (S1104). The vendor filter logic 506 writes the input image data into the reserved predetermined memory space via the proxy component 71 of the memory control unit 311 (S1105). The vendor filter logic 506 instructs the image pipe 307 to transmit storage location information of the written image data (S1106).

On the other hand, upon receiving the execution request, the print filter logic 503 requests the image pipe 307 for the storage location information of the written image data and acquires the storage location information from the image pipe 307 if the image data are written into the memory in Step S1105 (S1201).

The print filter logic 503 instructs the plotter control unit 310 in the process C 32c to print the image data based on the acquired storage location information via a proxy component 71 of the plotter control unit 310 (i.e., a plotter control unit in the process C 32c shown by dotted lines in FIG. 22) (S1202 and S1203) The plotter control unit 310 reads the image data via the memory control unit 311 based on the storage location information (S1204) and prints the read image data onto paper (S1205).

Then, the print filter logic 503 instructs, based on the storage location information, the image pipe 307 to release the memory space that is reserved in Step S1101 (S1206).

The image pipe 307 causes the memory control unit 311 of the process B 32b to release the reserved predetermined memory space via the proxy component 71 of the memory control unit 311 (i.e., the memory control unit in the process C 32c shown by dotted lines in FIG. 22) according to the instruction for releasing memory space (S1207 and S1208).

<Component Arrangement of Filter-Based Type>

The suitable distributed arrangement of components that are executed in processes is described above with reference to FIGS. 9A and 9B. The above description shows that the activity-based type is more suitable than the filter-based type.

In view of this, the procedures for application execution based on the component arrangement of the activity-based type are described above with reference to FIGS. 17 through 22.

The following describes component arrangement of the filter-based type and procedures for application execution based on the component arrangement of the filter-based type with reference to FIGS. 23 through 26.

Figure 23:
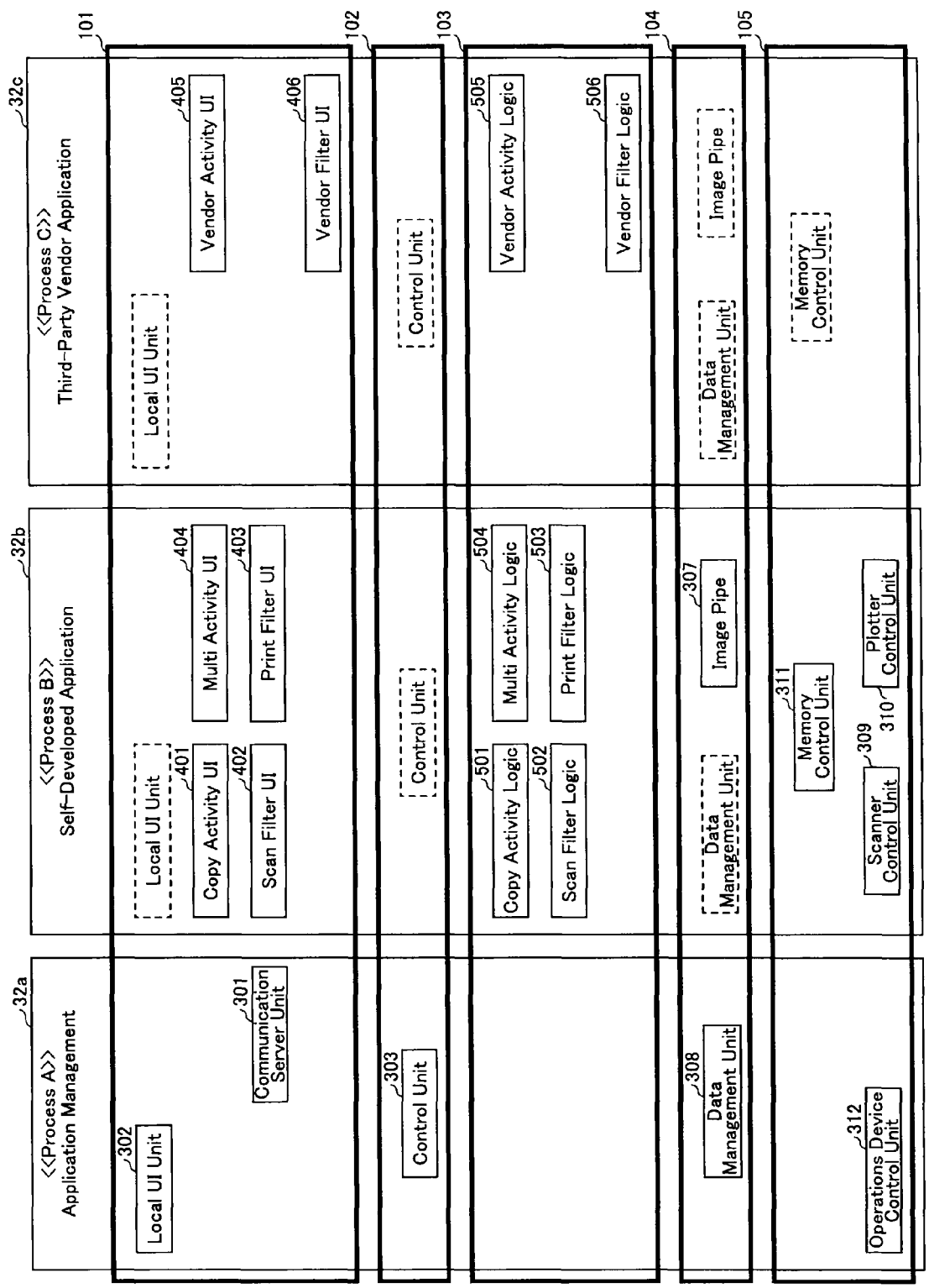
FIG. 23 is a diagram illustrating an exemplary arrangement of components of layers in processes (in the case of a filter-based type) according to the first embodiment of the present invention.

FIG. 23 is a diagram illustrating an exemplary arrangement of components of layers in processes (in the case of a filter-based type) according to the first embodiment of the present invention.

The filter-based type is different from the activity-based type in that the processes are split on a per filter basis, which is the characteristic of the filter-based type.

Comparing the activity-based component arrangement of FIG. 12 with the filter-based component arrangement of FIG. 23, for example, in the case of an extended function provided by the extended application software 82 (third-party vendor application software 82) by connecting an input filter 103a developed by a third-party vendor and an output filter 103c pre-installed in the information processing device 200 with an image pipe 307, the components related to a print filter as the output filter 103c pre-installed in the information processing device 200 are disposed in each of the process B 32b and the process C 32*c* in the activity-based type of FIG. 12, while the components related to a print filter are not disposed in the process C 32*c* but only components related to the input filter 103*a* developed by the third-party vendor are disposed in the process C 32*c* in the filter-based type of FIG. 23.

That is, in the filter-based type component arrangement, filters shared by the basic application software 81 and the extended application software 82 are not disposed in the process for executing the extended application software 82. In other words, different processes do not include the same filter components.

<Basic Procedure for Application Execution Based on Filter-Based Type Component Arrangement (Vendor Extended Function)>

A procedure for application execution based on the filter-based type component arrangement of FIG. 23 is described below.

Figure 24:
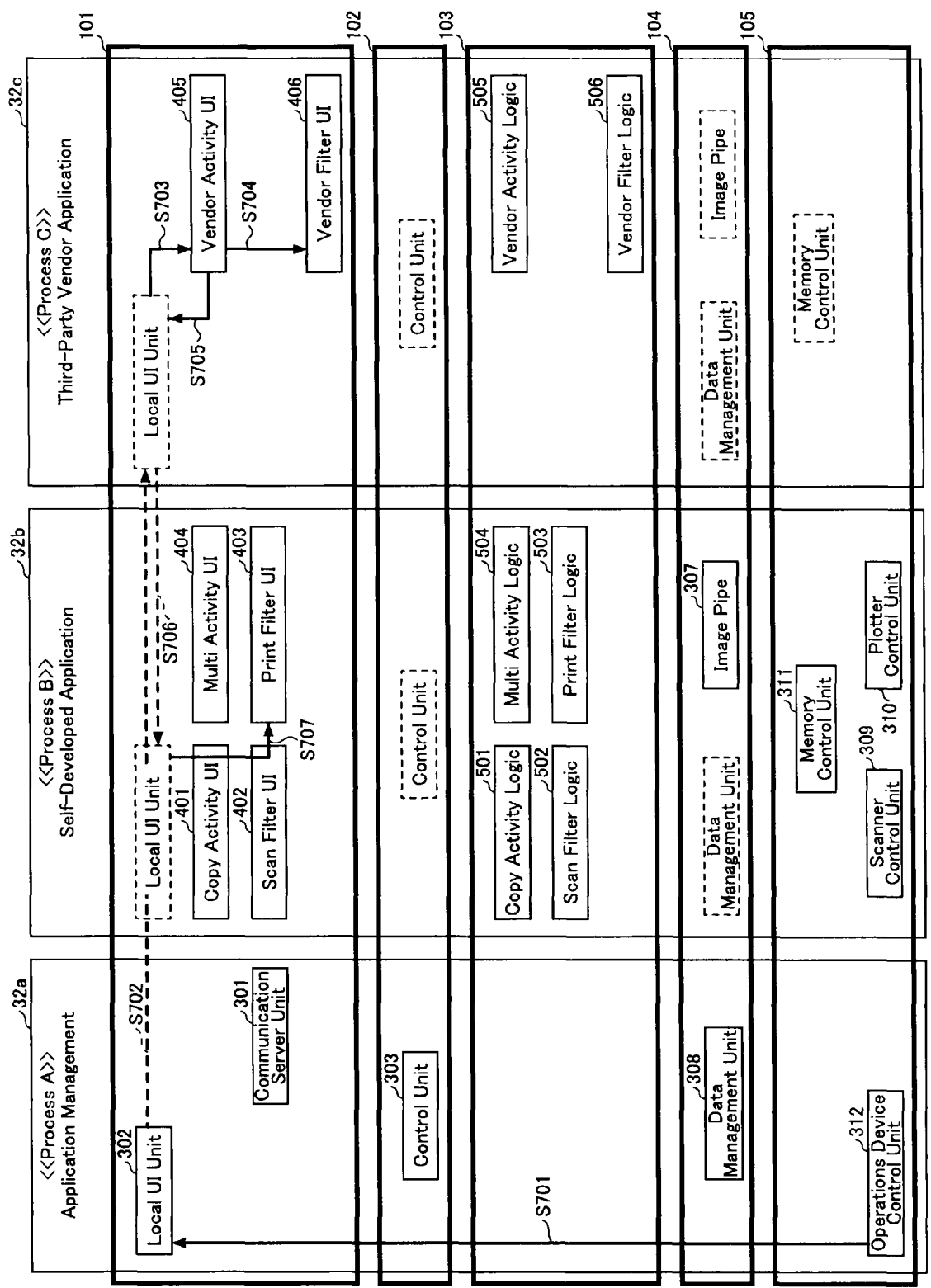
FIG. 24 is a diagram illustrating an exemplary procedure (of selecting an activity) that is performed for providing a function of a third-party vendor application according to the first embodiment of the present invention.

FIG. 24 is a diagram illustrating an exemplary procedure (of selecting an activity) that is performed for providing a function of a third-party vendor application according to the first embodiment of the present invention.

According to the information processing device 200 of this embodiment, in the process A 32*a* for the application management software executed by the execution unit 51, upon receiving an operations request from a user based on an instruction for selecting an application AP (vendor function), the operations device control unit 312 transmits the received UI event (operations request) to the local UI unit 302 (S701).

The local UI unit 302 causes the operations request transmission unit 61 to determine the process C 32*c* that is executed by the execution unit 51 and executes the vendor function based on the correspondence relationship data 41, in which application identification information pieces are associated with process identification information pieces, stored in the memory and to send the UI event (operations request) to the determined process C 32*c* using inter-process communications (S702).

In the process C 32*c*, the UI event (operations request) received via a proxy component 71 of the local UI unit 302 (i.e., a local UI unit in the process C 32*c* shown by dotted lines in FIG. 24) is sent to the vendor activity UI 405 of the vendor function to be executed (S703).

The vendor activity UI 405 generates its UI element and sends the received UI event to a vendor filter UI 406 that provides the third-party vendor application (S704). Upon receiving the UI event (operations request), the vendor filter UI 406 generates its UI element.

The vendor activity UI 405 transmits the received UI event (operations request) from the proxy component 71 of the local UI unit 302 in the process C 32*c* to a proxy component 71 of the local UI unit 302 in the process B 32*b* (i.e., a local unit in the process B 32*b* shown by dotted lines in FIG. 24) using inter-process communications (S705 and S706).

In the process B 32*b*, upon receiving the UI event (operations request) via the proxy component 71 of the local UI unit 302, the print filter UI 403 generates its UI element (S707).

The generated UI elements are sent to the proxy component 71 of the local UI unit 302. The proxy component 71 assigns screen element identification information pieces to the UI elements and stores the screen element identification information pieces in combination with process identification information pieces in the correspondence relationship data 42 stored in the memory. The registered UI elements are sent to and displayed by the operations device control unit 312.

Figure 25:
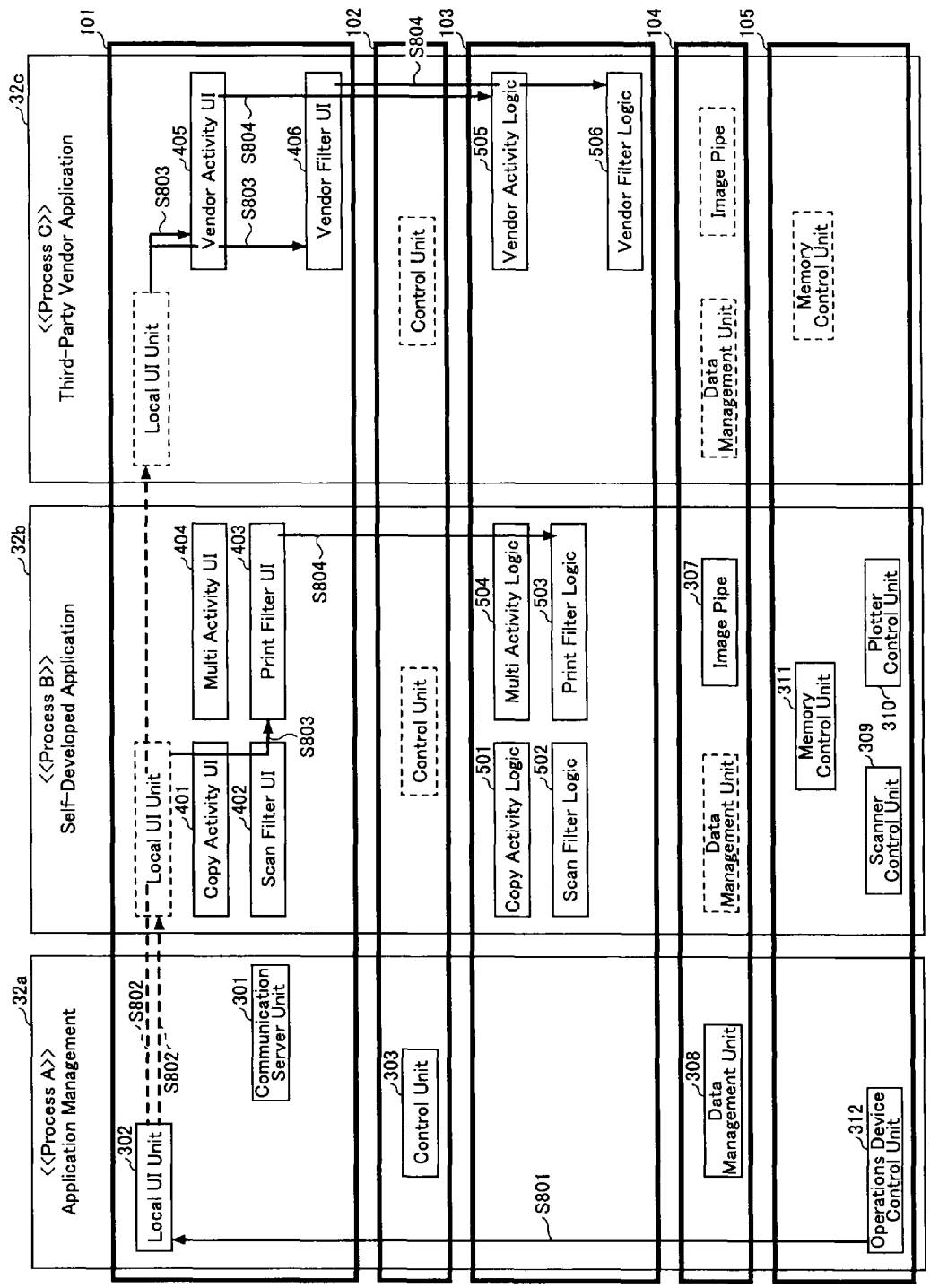
FIG. 25 is a diagram illustrating an exemplary procedure (of changing a setting) that is performed for providing a function of a third-party vendor application according to the first embodiment of the present invention.

FIG. 25 is a diagram illustrating an exemplary procedure (of changing a setting) that is performed for providing a function of a third-party vendor application according to the first embodiment of the present invention.

According to the information processing device 200 of this embodiment, in the process A 32*a* for the application management software executed by the execution unit 51, upon receiving an operation setting request from a user based on an instruction for specifying operation settings of an application AP, the operations device control unit 312 transmits the received UI event (operation setting request) to the local UI unit 302 (S801).

The local UI unit 302 causes the operation setting request transmission unit 62 to determine the process C 32*c* that is executed by the execution unit 51 and executes the vendor function or the process B 32*b* that is executed by the execution unit 51 and executes the printer function based on the correspondence relationship data 42, in which screen element identification information pieces are associated with process identification information pieces, stored in the memory and to send the UI event (operation setting request) to the determined process C 32*c* or process B 32*b*. If the process B 32*b* that executes the printer function is determined, the UI event (operation setting request) is sent to the determined process B 32*b* using inter-process communications (S802).

In the process C 32*c*, based on screen element identification information pieces contained in the UI event (operation setting request) received via the proxy component 71 of the local UI unit 302 (i.e., the local UI unit in the process C 32*c* shown by dotted lines in FIG. 25), components that have generated the UI elements, namely, the vendor activity UI 405 and the vendor filter UI 406 that provides the third-party vendor application, are determined. Then, the operation settings as the UI event are sent to the vendor activity UI 405 and the vendor filter UI 406 (S803).

The vendor activity UI 405 and the vendor filter UI 406 apply the corresponding operation settings to the vendor activity logic 505 and the vendor filter logic 506, respectively (S804).

Meanwhile, in the process B 32*b*, the UI event (operations request) received via the proxy component 71 of the local UI unit 302 (i.e., the local UI unit in the process B 32*b* shown by dotted lines in FIG. 25) is sent to the print filter UI 403 of the print function to be executed (S803).

The print filter UI 403 applies the operation settings to the print filter logic 503 (S804).

Figure 26:
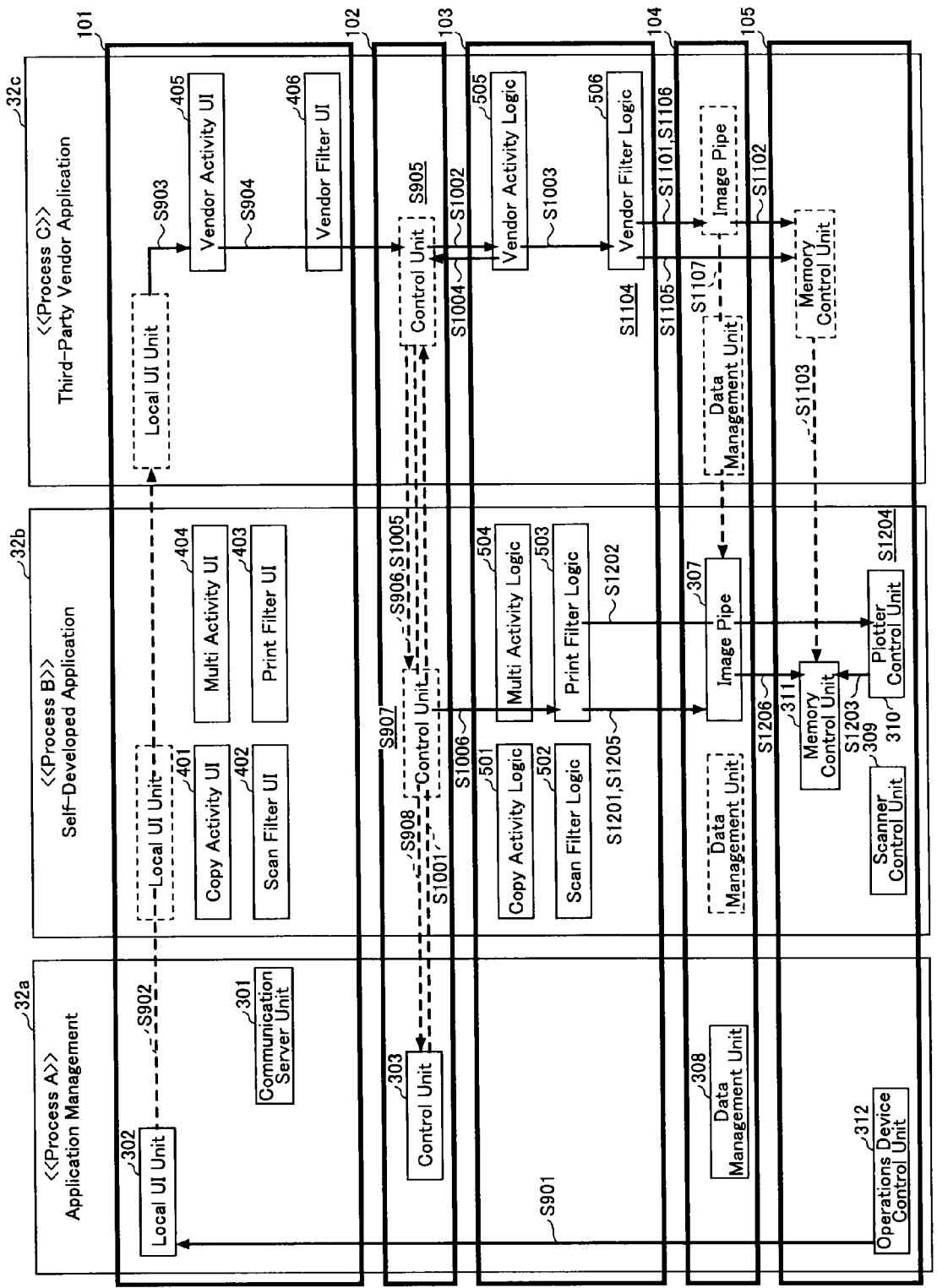
FIG. 26 is a diagram illustrating an exemplary procedure (of executing a request) that is performed for providing a function of a third-party vendor application according to the first embodiment of the present invention.

FIG. 26 is a diagram illustrating an exemplary procedure (of executing a request) that is performed for providing a function of a third-party vendor application according to the first embodiment of the present invention.

According to the information processing device 200 of this embodiment, in the process A 32*a* for the application management software executed by the execution unit 51, upon receiving an execution request from a user based on an instruction for executing the application AP, the operations device control unit 312 transmits the received execution request to the local UI unit 302 (S901).

The local UI unit 302 causes the execution request management unit 63 to determine the process C 32*c* that is executed by the execution unit 51 and executes the vendor function based on the correspondence relationship data 42, in which screen element identification information pieces are associated with process identification information pieces, stored in the memory and to send the UI event (operation request) to the determined process C 32*c* using inter-process communications (S902).

In the process C 32*c*, the UI event (execution request) received via the proxy component 71 of the local UI unit 302 (i.e., the local UI unit in the process C 32*c* shown by dotted lines in FIG. 26) is sent to a UI control component to be executed, namely, the vendor activity UI 405 of the vendor function (S903).

The vendor activity UI 405 registers the received UI event (execution request) into a proxy component 71 of the control unit 303 (i.e., a control unit in the process C 32c shown by dotted lines in FIG. 26) (S904).

The proxy component 71 of the control unit 303 in the process C 32c connects the vendor filter logic 506 and the print filter logic 503, which provide the vendor application function in cooperation with each other using inter-process communications via a proxy component 71 in the process B 32b (i.e., a control unit in the process B 32b shown by dotted lines in FIG. 26), with the image pipe 307 (S905 through S907) The proxy component 71 of the control unit 303 generates an execution request identification information piece for the received execution request. After Steps S905 through S907, the proxy component 71 of the control unit 303 sends the execution request to the process A 32a using inter-process communications (S908).

In the process A 32a, the control unit 303 queues the execution request. The control unit 303 arranges the registered execution request in a schedule and sends an instruction for starting execution to the proxy component 71 in the process for the application AP, wherein the process is determined from an execution request identification information piece of the executable execution request (S1001). This embodiment is described by taking the vendor function as an example. Therefore, if an execution request of a vendor function is executable, the execution request is sent to the determined process C 32c to instruct the third-party vendor application to start execution.

In the process C 32c, the proxy component 71 of the control unit 303 transmits the received execution request to the vendor activity logic 505 (S1002). The vendor activity logic 505 transmits the execution request to the vendor filter logic 506 that provides the vendor application function (S1003).

The vendor activity logic 505 transmits the received operations request from the proxy component 71 of the control unit 303 in the process C 32c to the proxy component 71 of the control unit 303 in the process B 32b (i.e., the control unit in the process B 32b shown by dotted lines in FIG. 26) using inter-process communications (S1004 and S1005).

In the process B 32b, the execution request is transmitted to the print filter logic 503 via the proxy component 71 of the control unit 303 (S1006).

Upon receiving the execution request, the vendor filter logic 506 instructs the image pipe 307, which is connected to the filters in Steps S905 through S907, to reserve memory space for storing an image to be scanned via a proxy component 71 of the image pipe 307 in the process C 32c (i.e., an image pipe in the process C 32c shown by dotted lines in FIG. 26) (S1101). The image pipe 307 causes the memory control unit 311 of the process B 32b to reserve predetermined memory space via a proxy component 71 of the memory control unit 311 (i.e., a memory control unit in the process C 32c shown by dotted lines in FIG. 26) according to the instruction for reserving memory space received via the proxy component of the image pipe 307 (S1102 and S1103).

Then, according to the received execution request, the vendor filter logic 506 inputs image data via the network I/F 14 of the information processing device 200 or from a memory card via the external storage device I/F 15, for example (S1104). The vendor filter logic 506 writes the input image data into the reserved predetermined memory space via the proxy component 71 of the memory control unit 311 (S1105). The vendor filter logic 506 instructs the image pipe 307 to transmit storage location information of the written image data via the proxy component 71 of the image pipe 307 (S1106 and S1107).

On the other hand, according to the execution request transmitted in S1006, the print filter logic 503 requests the image pipe 307 for the storage location information of the written image data and acquires the storage location information from the image pipe 307 if the image data are written into the memory in Step S1105 (S1201).

Then, the print filter logic 503 instructs the plotter control unit 310 to print the image data based on the acquired storage location information (S1202). The plotter control unit 310 reads the image data via the memory control unit 311 based on the storage location information (S1203) and prints the read image data onto paper (S1204).

Then, the print filter logic 503 instructs, based on the storage location information, the image pipe 307 to release the memory space that is reserved in Steps S1102 and S1103 (S1205).

The image pipe 307 instructs the memory control unit 311 to release the reserved memory space (S1206).

<Summary>

As described above, according to the first embodiment of the present invention, the information processing device 200 of this embodiment can execute the basic application software 81 that provides basic functions of the system and the extended application software 82 that provides an added extended function in different processes and can perform operations associated with the multi-process architecture such as inter-process communications using limited components corresponding to a framework FW (i.e., hide the influence of the multi-process architecture).

Therefore, the information processing device 200 of this embodiment can provide a highly robust system that allows easy customization and extension of an application AP without a need to consider the multi-process architecture and that prevents basic functions of the system from being affected due to a failure of an extended function.

Second Embodiment

According to a second embodiment of the present invention, there is provided an information processing device 200 having a process configuration in which, in multi-process architecture in which a basic application that provides basic functions and an extended application that provides an added extended function are executed in different processes, application management software that manages activation and termination of an application and basic application software that provides a basic function of the information processing device 200 are executed in a first process and extended application software that provides an extended function added to the information processing device 200 is executed in a second process. Thus, the information processing device 200 provides a highly robust system that allows easy customization and extension of an application without a need to consider the multi-process architecture and that prevents basic functions of the system from being affected due to a failure of the extended function.

The second embodiment is different from the first embodiment, in which three processes are provided such that the application management software is executed in the first process; the basic application software is executed in the second process; and the extended application software is executed in the third process, in that two processes are provided such that the application management software and the basic application software is executed in the first process and the extended application software is executed in the second process.

Elements of the second embodiment corresponding to those of the first embodiment are denoted by the same reference numerals and are not further described here. The differences from the first embodiment are described below with reference to FIGS. 27 through 31.

<Multi-Process Architecture>

As in the case of the multi-process architecture in the "pipes-and-filters" software configuration described with reference to FIGS. 7 through 9B, in the information processing device 200 of the second embodiment, multi-process architecture is configured according to Principles 1 through 3 of the first embodiment in order to provide a highly robust system that allows easy customization and extension of an application without a need to consider multi-process architecture and that prevents basic functions of the system from being affected due to a failure of an extended function.

<<Process Configuration>>

Figure 27:
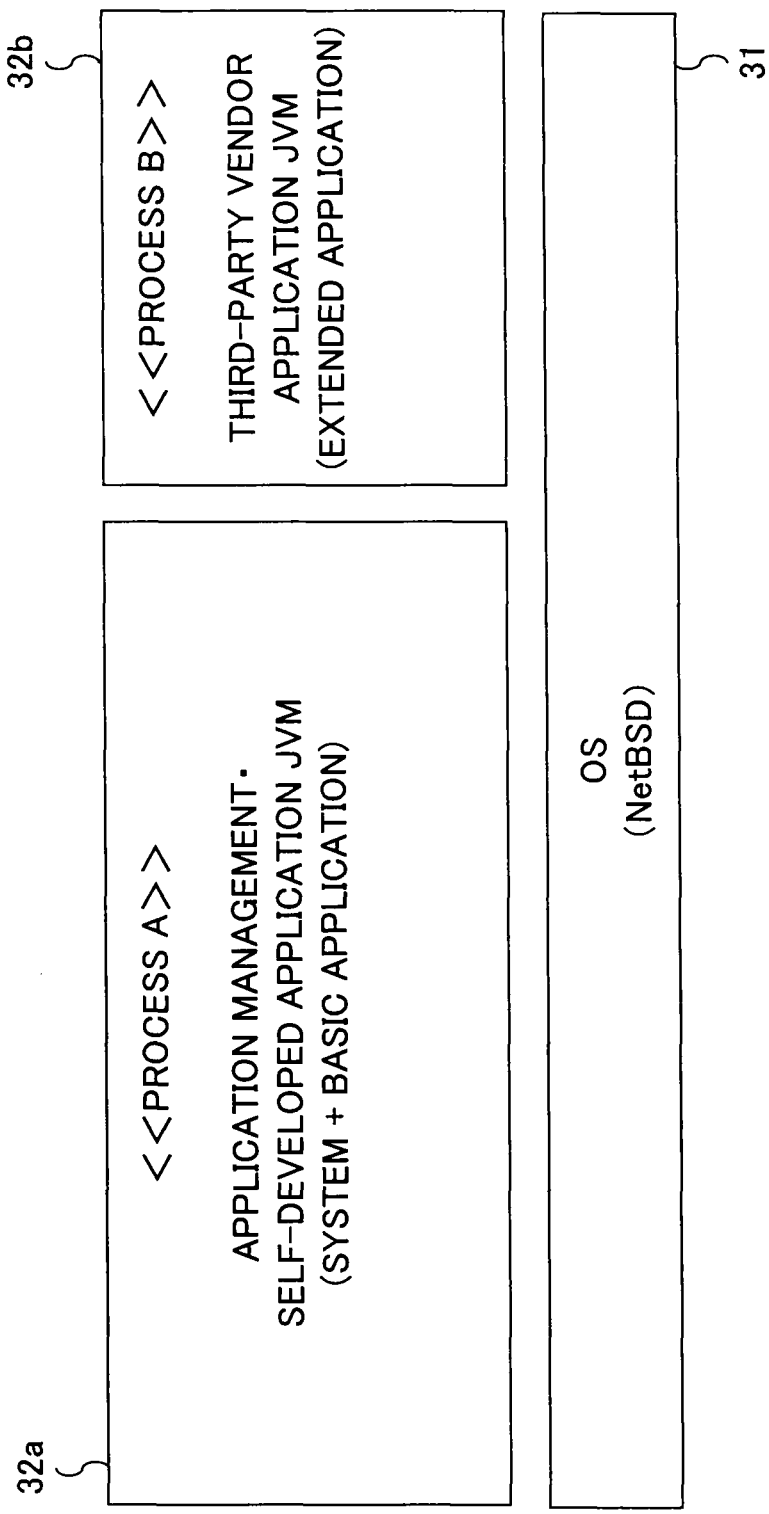
FIG. 27 is a diagram illustrating an exemplary process configuration according to a second embodiment of the present invention.

FIG. 27 is a diagram illustrating an exemplary process configuration according to the second embodiment of the present invention.

Referring to FIG. 27, in order to achieve multi-process architecture according to Principle 1 of the first embodiment, in the information processing device 200 of this embodiment, a process activated by an OS 31 is split into a process A 32a for executing a JVM for application management software and a self-developed application and a process B 32b for executing a third-party vendor application.

In the process A 32a, the application management software that manages activation and termination of an application AP and the basic application software 81 that provides basic functions of the information processing device 200 are executed. That is, in this embodiment, a system as self-developed infrastructure software and the basic application software 81 that provides basic functions are executed in the same memory space. In the process B 32b, the extended application software 82 that provides an extended function added to the information processing device 200 is executed.

Thus, the information processing device 200 of this embodiment prevents the basic functions (the basic application software 81) of the system from being affected due to a failure of an extended function (the installed extended application software 82) (e.g., prevents a system crash (an abnormal termination of the system)) and, even if the extended function (the installed extended application software 82) uses a large amount of memory, stably provides functions to users without affecting the application management software.

<<Arrangement of Layers in Processes>>

Figure 28:
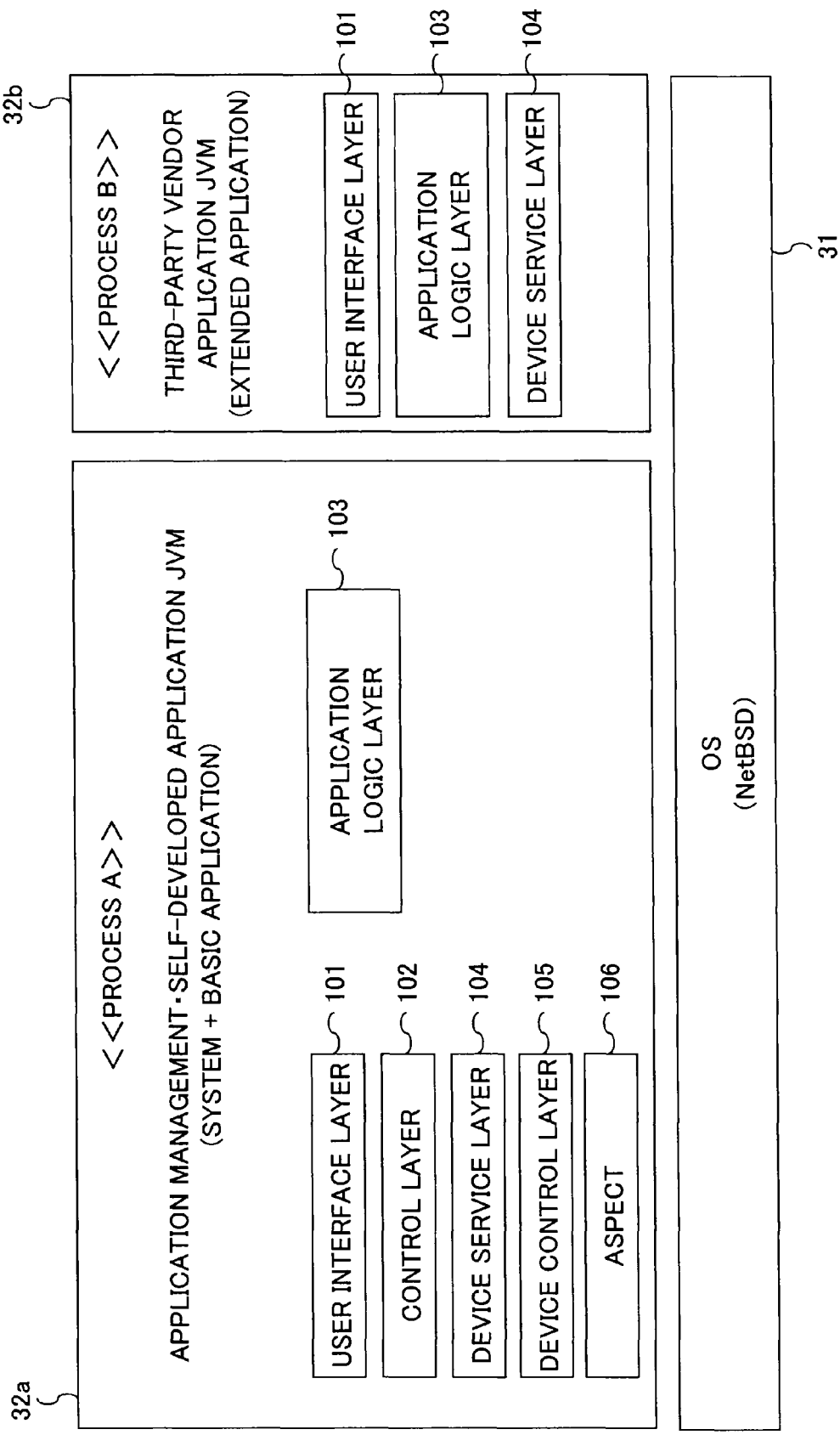
FIG. 28 is a diagram illustrating an exemplary arrangement of layers in processes according to the second embodiment of the present invention.

FIG. 28 is a diagram illustrating an exemplary arrangement of layers in processes according to the second embodiment of the present invention.

As shown in FIG. 28, the components of the layers are disposed in the two processes (two JVMs), which are split to have appropriate sizes as described with reference to FIG. 27, so as to be executed in the processes.

In the second embodiment, the components that are disposed in the process for the basic application software 81 in the first embodiment are disposed in different places. The component arrangement of the layers including such components is described below.

The UIs of the basic application software 81 in the user interface layer 101 and the components of the basic application software 81 in the application logic layer 103 are disposed in the process A 32a for the application management software and the basic application software 81.

In this manner, in the information processing device 200 of this embodiment, the components of the layers are disposed in appropriate processes in consideration of the characteristics of the layers. Further, according to Principle 2 of the first embodiment, the components of each of the input filters 103a, the process filters 103b, and the output filters 103c that are used for providing frequently-used functions of the application AP, such as a copier function, of the information processing device 200 are executed in the same process.

Thus the information processing device 200 of this embodiment can stably provide the frequently-used functions of the system to users. In the information processing device 200 of the first embodiment, since the application management software and the basic application software 81 are executed in different processes, data are exchanged among processes using inter-process communications. On the other hand, in the information processing device 200 of the second embodiment, since the application management software and the basic application software 81 are executed in the same process, there is no influence of inter-process communications on the system and the architecture.

<Functional Configuration of Information Processing Device>

The following discusses, with reference to FIG. 29, how to execute the basic functions and the extended function of the information processing device 200 of this embodiment having the process configuration and the layer arrangement that are described with reference to FIGS. 27 and 28, i.e. how to execute applications AP in the multiple-process environment.

Figure 29:
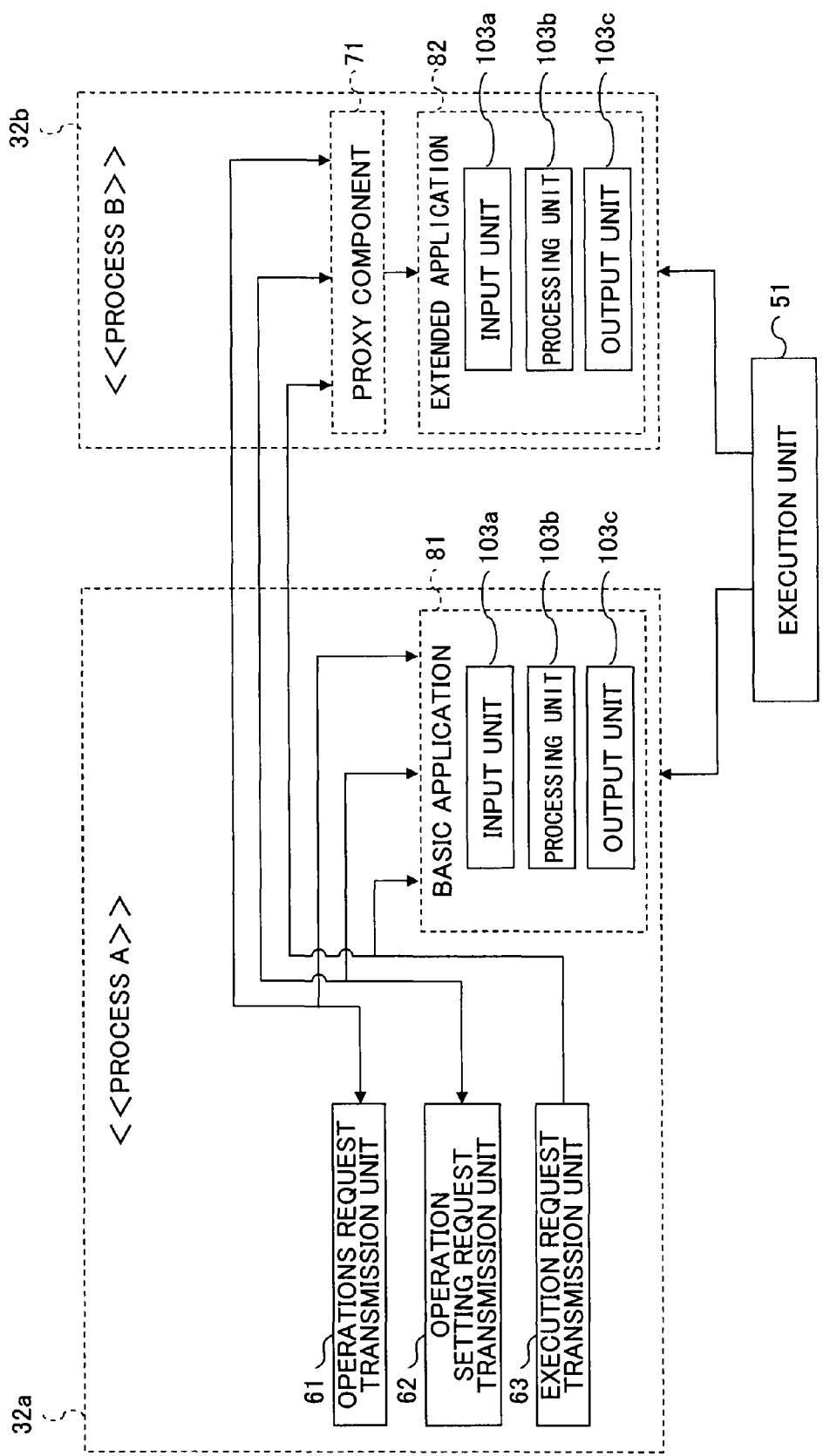
FIG. 29 is a diagram illustrating an exemplary functional configuration of an information processing device according to the second embodiment of the present invention.

FIG. 29 is a diagram illustrating an exemplary functional configuration of the information processing device 200 according to the second embodiment of the present invention.

The functional configuration of the second embodiment is different from that of the first embodiment in that an execution unit 51 for executing two processes is provided and in that proxy components 71 for exchanging data between the application management software and the basic application software 81 are not provided. The following describes these points.

The information processing device 200 of this embodiment includes an execution unit 51 for executing two processes shown in FIG. 27.

With reference to FIG. 29, the execution unit 51 executes the following two processes. The execution unit 51 may be the OS 31, for example.

Process A

The process A 32a executes application management software that manages activation and termination of an application; and components that are preinstalled in the information processing device 200 and that serve as an input filter 103a, a process filter 103b, and/or an output filter 103c, i.e., components that provide standard functions of the information processing device 200. The process A 32a stays resident after activation of the information processing device 200.

Process B

The process B 32b executes components that are added to the information processing device 200 for function extension and that serve as an input filter (input unit) 103a, a process filter 103b, and/or an output filter 103c.

The process B 32b is executed by the execution unit 51 when necessary such as when an operations request is received from a user.

In this manner, in the information processing device 200 of this embodiment, memory space is split into space for executing the system (self-developed infrastructure software) and basic application software 81 that provides basic functions, and space for executing extended application software 82 that provides an extended function, thereby achieving multi-process architecture in which processes do not affect each other.

In the two processes executed by the execution unit 51, although the component configuration that minimizes inter-process communications is employed according to Principle 3 of the first embodiment, inter-process communications for operations requests, operation settings, and execution requests need to be performed between the application management software and the extended application software 82.

In this embodiment, the information processing device 200 includes proxy components 71 for exchanging data between the application management software and the extended application software 82 by performing inter-process communications between the application management process A 32a for executing the application management software and the application process B 32b for executing the extended application software 82.

Since the basic application software 81 is executed in the same process A 32a as the application management software, there is no need to perform inter-process communications for operations requests, operation settings, and execution requests between the application software and the basic application software 81. Therefore, proxy components 71 for inter-process communications between the application software and the basic application software 81 are not provided.

The functional configuration of the second embodiment is the same as the functional configuration of the first embodiment except these points. Therefore, technical features of the components of the operations request transmission unit 61, the operation setting request transmission unit 62, and the execution request management unit 63 and procedures of execution of the application AP by the components are not further described here.

<Arrangement of Components of Layers in Processes>

Component arrangements of the activity-base type and the filter-based type in the process configuration of the information processing device 200 of this embodiment are described with reference to FIGS. 30 and 31, respectively.

<<Activity-Based Type>>

Figure 30:
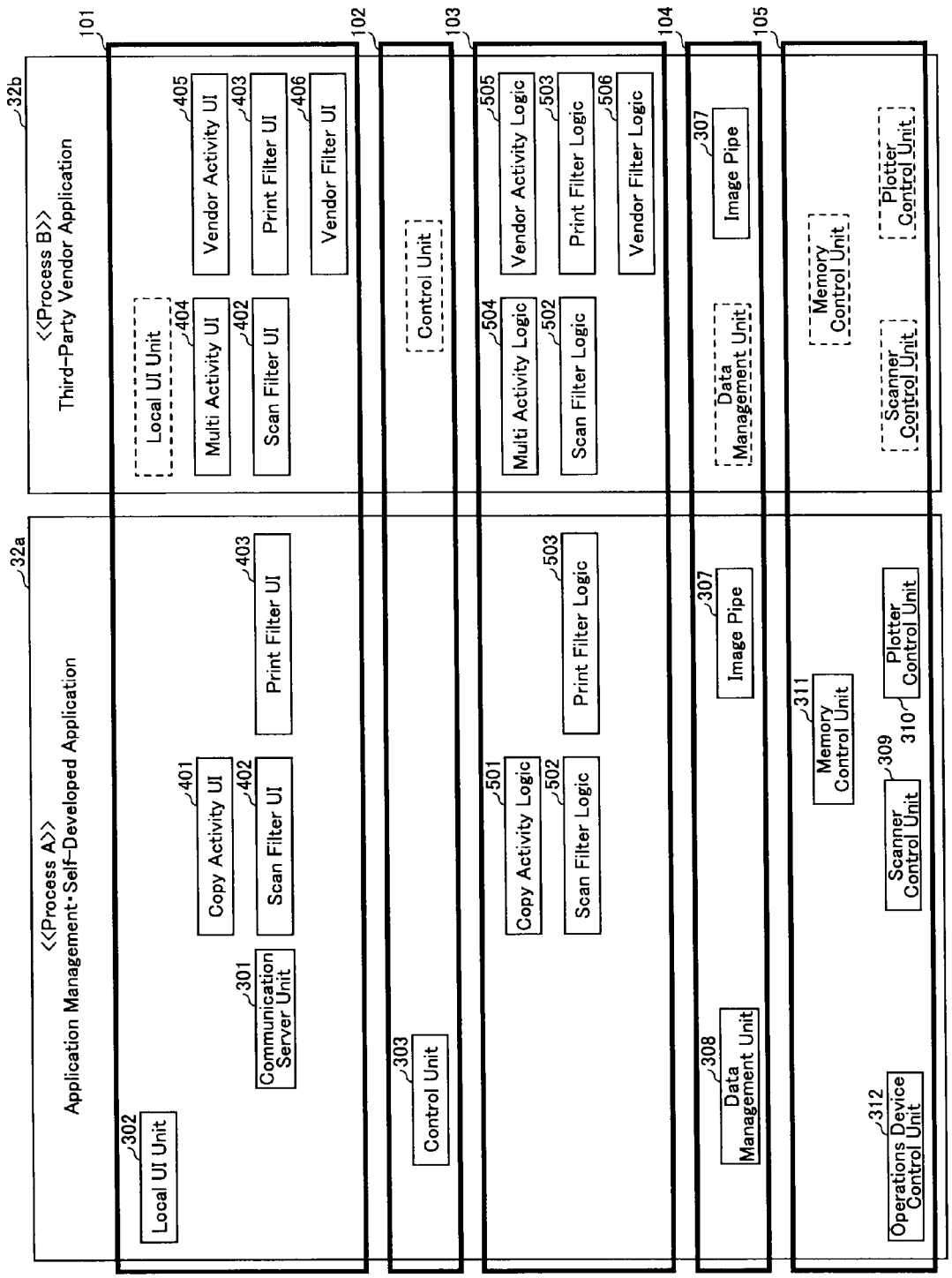
FIG. 30 is a diagram illustrating an exemplary arrangement of components of layers in processes (in the case of an activity-based type) according to the second embodiment of the present invention.

FIG. 30 is a diagram illustrating an exemplary arrangement of components of layers in processes (in the case of an activity-based type) according to the second embodiment of the present invention.

The component arrangement of the second embodiment is different from that of the first embodiment as mentioned in the description of the functional configuration. More specifically, in the first embodiment as shown in FIG. 12, since the application management software and the basic application software 81 are executed in different processes, the proxy components 71 of the local UI unit 302, the control unit 303, and the data management unit 308 are provided. On the other hand, in the second embodiment, since the application management software and the basic application software 81 are executed in the same process A 32a, these proxy components 71 are not provided.

The functional configuration of the second embodiment is the same as that of the first embodiment except this point, and therefore a description of the component arrangement of the second embodiment is omitted.

<<Filter-Based Type>>

Figure 31:
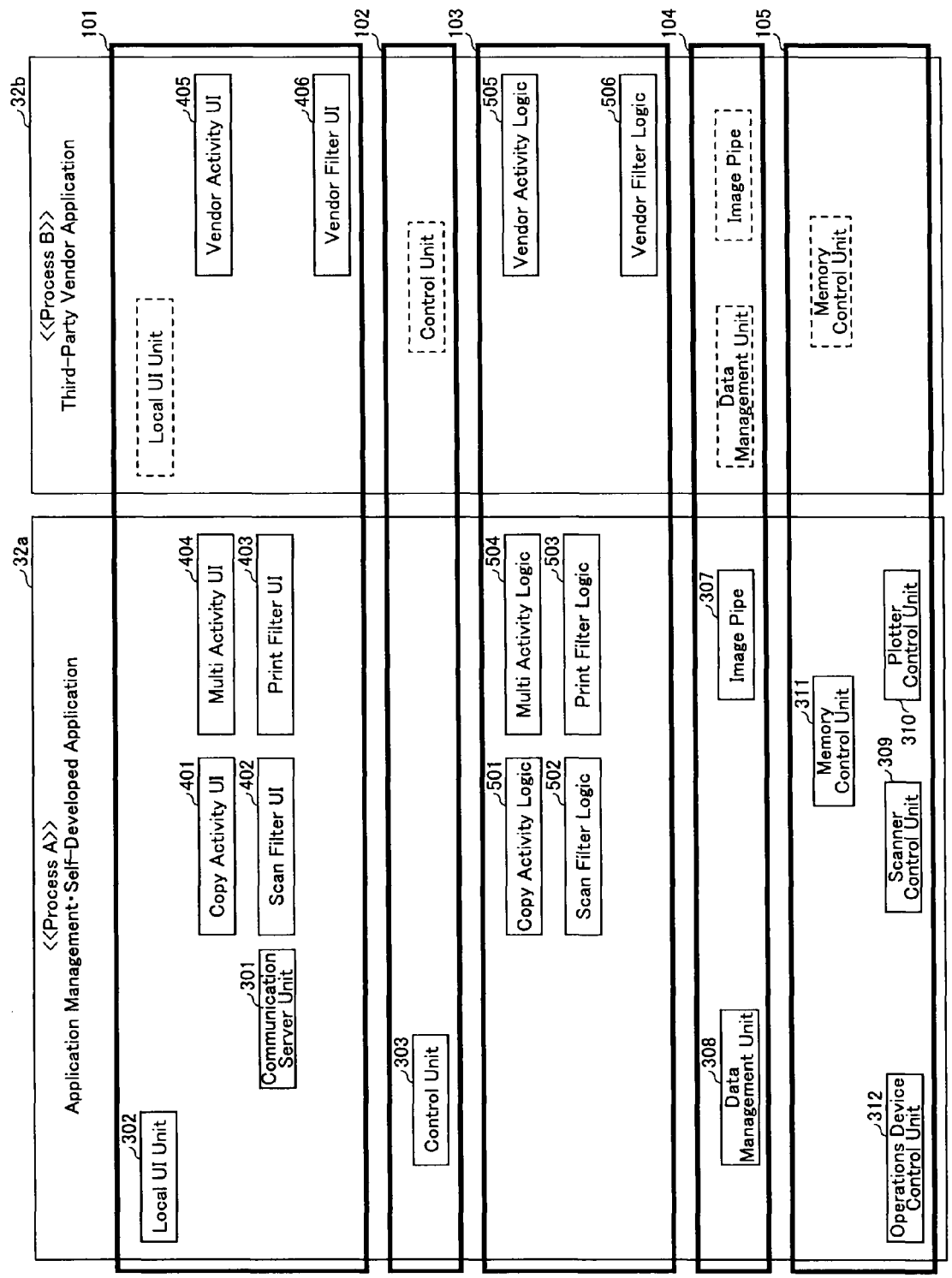
FIG. 31 is a diagram illustrating an exemplary arrangement of components of layers in processes (in the case of a filter-based type) according to the second embodiment of the present invention.

FIG. 31 is a diagram illustrating an exemplary arrangement of components of layers in processes in the case of a filter-based type according to the second embodiment of the present invention.

The component arrangement of the second embodiment is different from that of the first embodiment as mentioned in the description of the activity-based type. More specifically, in the first embodiment as shown in FIG. 23, since the application management software and the basic application software 81 are executed in different processes, the proxy components 71 of the local UI unit 302, the control unit 303, and the data management unit 308 are provided. On the other hand, in the second embodiment, since the application management software and the basic application software 81 are executed in the same process A 32a, these proxy components 71 are not provided.

The functional configuration of the second embodiment is the same as that of the first embodiment except this point, and therefore a description of the component arrangement of the second embodiment is omitted.

<Basic Procedure for Application Execution>

In the first embodiment, the basic procedure for application execution in the case of the activity-based type component arrangement is described with reference to FIGS. 17 through 22, and the basic procedure for application execution in the case on the filter-based type component arrangement is described with reference to FIGS. 24 through 26.

The basic procedure for application execution of the second embodiment is different from that of the first embodiment in that events and data are exchanged between application management software and the basic application software 81 without using the proxy components 71. In this embodiment, the local UI unit 302 and the control unit 303 of the application management software and the activity UI, activity logic, the filter UI, and the filter logic of the basic application software 81 directly exchange data.

The basic procedure for application execution of the second embodiment is the same as that of the first embodiment except this point and therefore is not further described here.

<Summary>

As described above, according to the second embodiment of the present invention, the information processing device 200 of this embodiment can execute the basic application software 81 that provides basic functions of the system and the extended application software 82 that provides an added extended function in different processes and can perform operations associated with the multi-process architecture such as inter-process communications using limited components corresponding to a framework FW (i.e., hide the influence of the multi-process architecture).

Accordingly, the information processing device 200 of this embodiment can achieve the same effect as the information processing device 200 of the first embodiment.

Third Embodiment

According to a third embodiment of the present invention, there is provided an information processing device 200 having a process configuration in which, in multi-process architecture in which a basic application that provides basic functions and an extended application that provides an added extended function are executed in different processes, if the process for executing the extended function is abnormally terminated, the abnormally terminated process is isolated from the system in order to allow the basic functions to remain operable. Thus, the information processing device 200 provides a highly robust system that allows easy customization and extension of an application without a need to consider the multi-process architecture and that prevents basic functions of the system from being affected due to a failure of the extended function.

The third embodiment is different from the first and second embodiments in that an abnormal termination of a process for executing an extended function is detected and the abnormal termination is reported to components of the application management software (i.e., a process abnormal termination detection/reporting function is provided).

Elements of the third embodiment corresponding to those of the first and second embodiments are denoted by the same reference numerals and are not further described here. The differences from the first and second embodiments are described below with reference to FIGS. 32 through 38.

<Functional Configuration of Information Processing Device>

Figure 32:
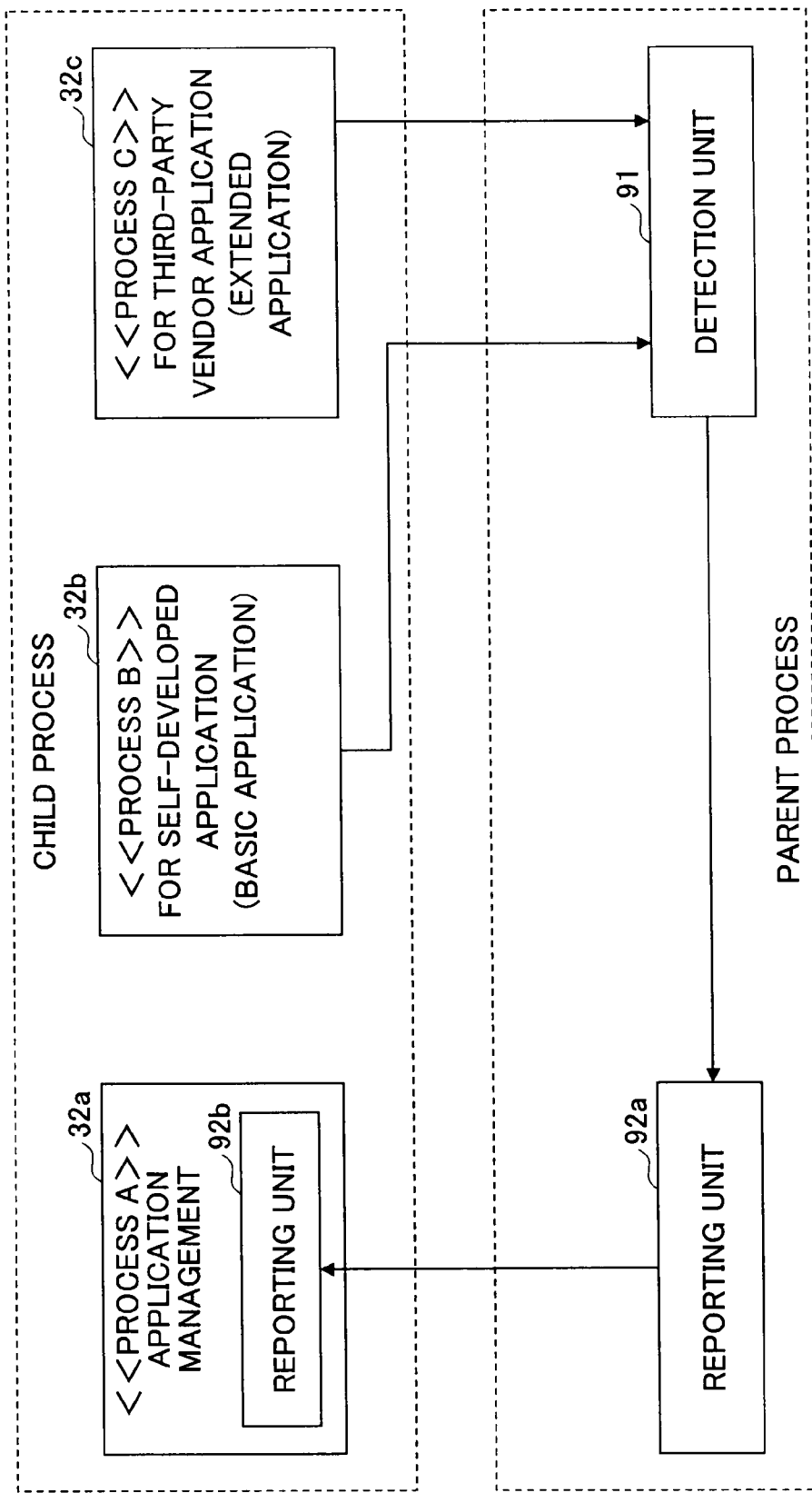
FIG. 32 is a diagram illustrating an example of a functional configuration of an information processing device according to a third embodiment of the present invention.

The following discusses how the information processing device 200 of this embodiment detects an abnormal termination and sends information indicating the abnormal termination to the application management software with reference to FIG. 32. In the following description, the configuration of the first embodiment in which application management functions, basic functions, and an extended function are executed in different processes is used as an example of a multi-process environment in which the process abnormal termination detection/reporting function is executed.

FIG. 32 is a diagram illustrating an exemplary functional configuration of the information processing device 200 according to the third embodiment of the present invention.

The functional configuration of the third embodiment is different from those of the first and second embodiments in that a detection unit 91 for detecting an abnormal termination of processes excluding a process for executing the application management software and reporting units 92 for reporting the detection result to the components of the application management software are provided.

All the processes in the multi-process architecture are created by duplicating a certain process. For example, in a UNIX environment as in this embodiment, a system call called "fork" is used to create a new process. A process created using fork is a child process of a parent process that called fork. The child process inherits the conditions of the parent process such as file handle, variables, and environmental variables of the parent process.

In the example shown in FIG. 32, a process A 32a, a process B 32b, and a process C 32c for executing application management functions, basic functions, and an extended function, respectively, are created as child processes of a parent process.

In general, if a child process that is created using fork is terminated abnormally, the child process sends a signal (SIGCHLD) indicating the abnormal termination to its parent process. Thus the parent process can determine whether its child process is alive (i.e., whether its child process is operating properly)

In this embodiment, the parent process includes the detection unit 91 for detecting abnormal terminations of the child processes and the reporting unit 92a for sending information indicating the abnormal termination to the process A 32a (i.e., the child process) for the application management software, thereby providing a process abnormal termination detection/reporting function.

Further, in this embodiment, the process A 32a as a child process includes a reporting unit 92b for sending, in response to information indicating detection of an abnormal termination from the parent process, information indicating detection of an abnormal termination to all the components of the application management software. In order to prevent an application AP that is not operating properly from affecting other applications AP that are operating properly, management information pieces related to the application AP that is executed in the abnormally terminated process are made mutually consistent (i.e., data related to the application AP that is executed in the abnormally terminated process are deleted) by the components. Since unnecessary information are deleted, the information processing device 200 of this embodiment can efficiently use memory resources and can prevent malfunction of an application that is not operable due to an abnormal termination.

<Basic Procedure for Detection/Reporting of Process Abnormal Termination>

A specific procedure for detection/reporting of a process abnormal termination in the information processing device 200 of this embodiment is described below with reference to FIG. 33 by taking as an example the case where the process C 32c for executing the extended application software is abnormally terminated.

Figure 33:
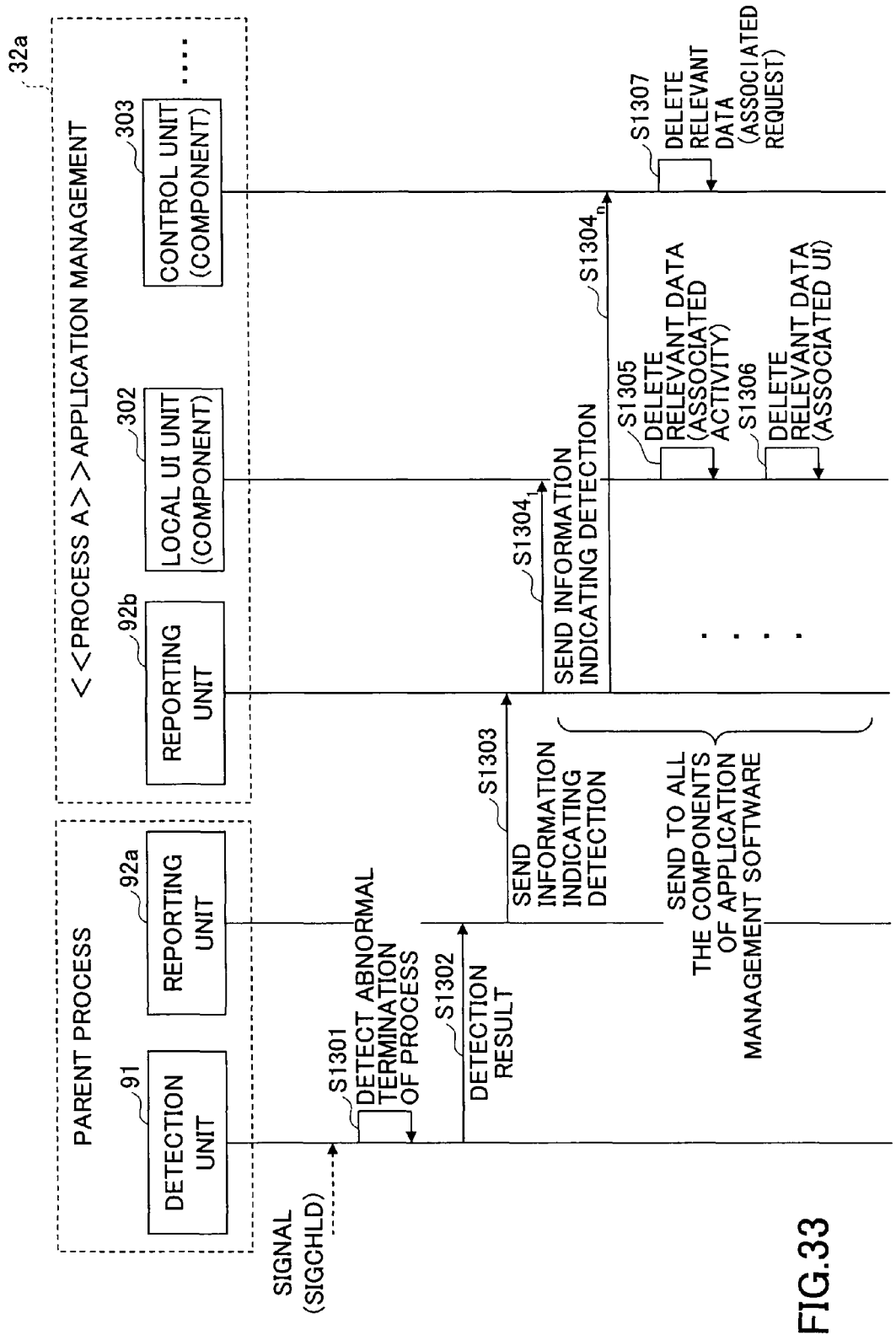
FIG. 33 is a sequence diagram illustrating an exemplary procedure performed for providing a function of detecting/reporting an abnormal termination of a process according to the third embodiment of the present invention.

FIG. 33 is a diagram illustrating an exemplary procedure performed for providing a function of detecting/reporting an abnormal termination of a process according to the third embodiment of the present invention.

In the information processing device 200 of this embodiment, the detection unit 91 of the parent process receives a signal (SIGHLD) and thus detects an abnormal termination of the process C 32c, which is a child process (S1301), and sends the detection result to the reporting unit 92a executed in the parent process (S1302).

Based on the received detection result, the reporting unit 92a sends information indicating detection of the abnormal termination to the process A 32a (i.e., the child process) for the application management software using inter-process communications such as sockets and message queues (S1303).

Having received the information, the application management software causes the reporting unit 92b to send information indicating detection of the abnormal termination to all the components (the number of components: n) of the application management software (S13041 through S1304n).

For example, having received the information indicating detection of the abnormal termination from the reporting unit 92b, the local UI unit 302 of the application management software refers to the correspondence relationship data 41 in which activities are associated with processes that execute the activities and deletes relevant data based on the process identification information piece (e.g., process ID) of the abnormally terminated process C 32c (S1305).

Then, the local UI unit 302 refers to the correspondence relationship data 42 in which UIs are associated with processes that generate the UIs and deletes relevant data (S1306).

Further, having received the information indicating detection of the abnormal termination from the reporting unit 92b, the control unit 303 of the application management software refers to the correspondence relationship data 43 in which requests are associated with processes that generate the requests and deletes relevant data based on the process identification information piece (e.g., process ID) of the abnormally terminated process C 32c (S1307).

FIGS. 34A through 34C are diagrams illustrating data pieces that are made mutually consistent in response to an abnormal termination of a process according to the third embodiment of the present invention.

Deletion of relevant data performed in Steps S1305 through S1307 is described with reference to FIGS. 34A through 34C. In the following, deletion of relevant data is described by taking as an example the case where the process C 32c for executing the extended application software is abnormally terminated.

In Step S1305, the local UI unit 302 refers to the correspondence relationship data 41 shown in FIG. 34A in which activities are associated with processes that execute the activities and deletes relevant data in the information item "activity name" enclosed by dotted lines based on the process ID "process C" of the abnormally terminated process C 32c.

Then, in Step S1306, the local UI unit 302 refers to the correspondence relationship data 42 shown in FIG. 34B in which UIs are associated with processes that generate the UIs and deletes relevant data in the information items "UI control component ID" and "screen element ID" enclosed by dotted lines based on the process ID "process C".

In these steps, the local UI unit 302 not only deletes relevant data from the correspondence relationship data 41 and the correspondence relationship data 42, but also deletes graphic parts (e.g., icons) constituting a menu as a selection screen of the application AP or changes the display attribute of the graphic parts to half brightness (grayed out).

Then, in Step S1305, the control unit 303 refers to the correspondence relationship data 43 shown in FIG. 34C in which requests are associated with processes that generate the requests and deletes relevant data in the information item "request ID" enclosed by dotted lines based on the process ID "process C" of the abnormally terminated process C 32c.

In this step, the control unit 303 reports the deleted request using various reporting methods such as displaying on the screen, printing out a status report, sending e-mail to an administrator, and sending e-mail to a user who requested a job. The control unit 303 may store information about the deleted request in the secondary storage unit 13 such as a hard disk as permanent information to allow re-execution of the request based on the permanent information upon the next successful activation.

In this manner, the information processing device 200 of this embodiment can isolate, if the process for executing the extended function is abnormally terminated, the abnormally terminated process from the system in order to allow the basic functions to remain operable. Thus, the information processing device 200 can continue to provide a function provision service to a user on a smaller scale. For example, the information processing device 200 can continue to provide only basic functions.

MODIFIED EXAMPLE

The process abnormal termination detection/reporting function described above has a configuration in which the detection unit 91 and the reporting unit 92a for providing the detection/reporting function are executed in the parent process. This configuration is advantageous in that an abnormal termination can immediately be detected through inter-process communications using signals. This configuration is, however, disadvantageous in that function implementation in the multi-process environment is complex.

An example that enables function implementation with a configuration simpler than the above-described functional configuration is described below with reference to FIG. 35.

Figure 35:
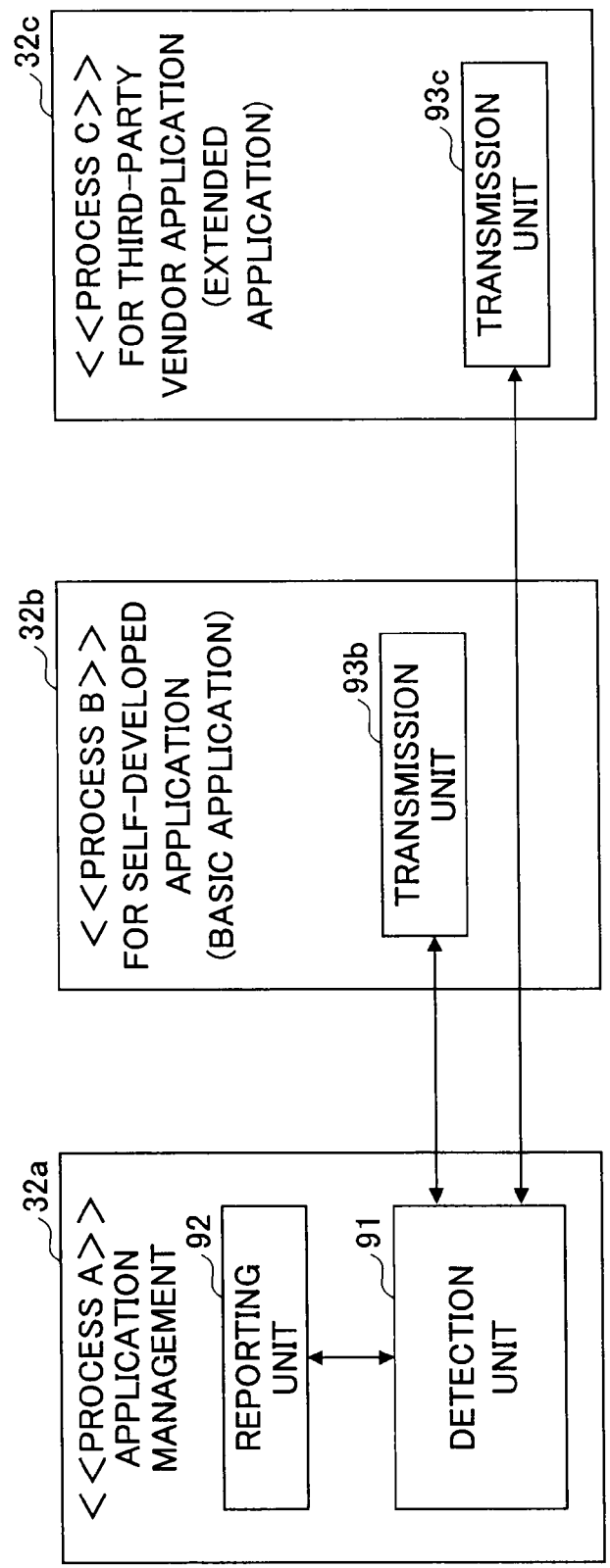
FIG. 35 is a diagram illustrating a modified example of a function of detecting/reporting an abnormal termination of a process according to the third embodiment of the present invention.

FIG. 35 is a diagram illustrating a modified example of a function of detecting/reporting an abnormal termination of a process according to the third embodiment of the present invention.

In the modified example of FIG. 35, the process A 32a for executing the application management software includes a detection unit 91 and a reporting unit 92, and each of the process B 32b and the process C 32c for executing applications AP, which are managed by the application management software, has a transmission unit 93 for sending a process status information piece.

In the case of this configuration, two detection/reporting methods are available.

The first is a method that causes the detection unit 91 of the process A 32a to regularly request the other processes for process status information pieces and causes the transmission units 93 of the other processes to respond to the request, thereby determining whether the other processes are alive. The second is a method that causes the transmission units 93 of the other processes to regularly send process status information pieces (heartbeat) to the process A 32a and causes the detection unit 91 of the process A 32a to receive the process status information pieces, thereby determining whether the other processes are alive.

In this modified example, the process abnormal termination detection/reporting function is provided using inter-process communications between the child processes in this manner.

<Basic Procedure for Detection/Reporting of Process Abnormal Termination>

A specific procedure for detection/reporting of a process abnormal termination in the information processing device 200 of the modified example is described below with reference to FIGS. 36 and 37 by taking as an example the case where the process C 32c for executing the extended application software is abnormally terminated.

Figure 36:
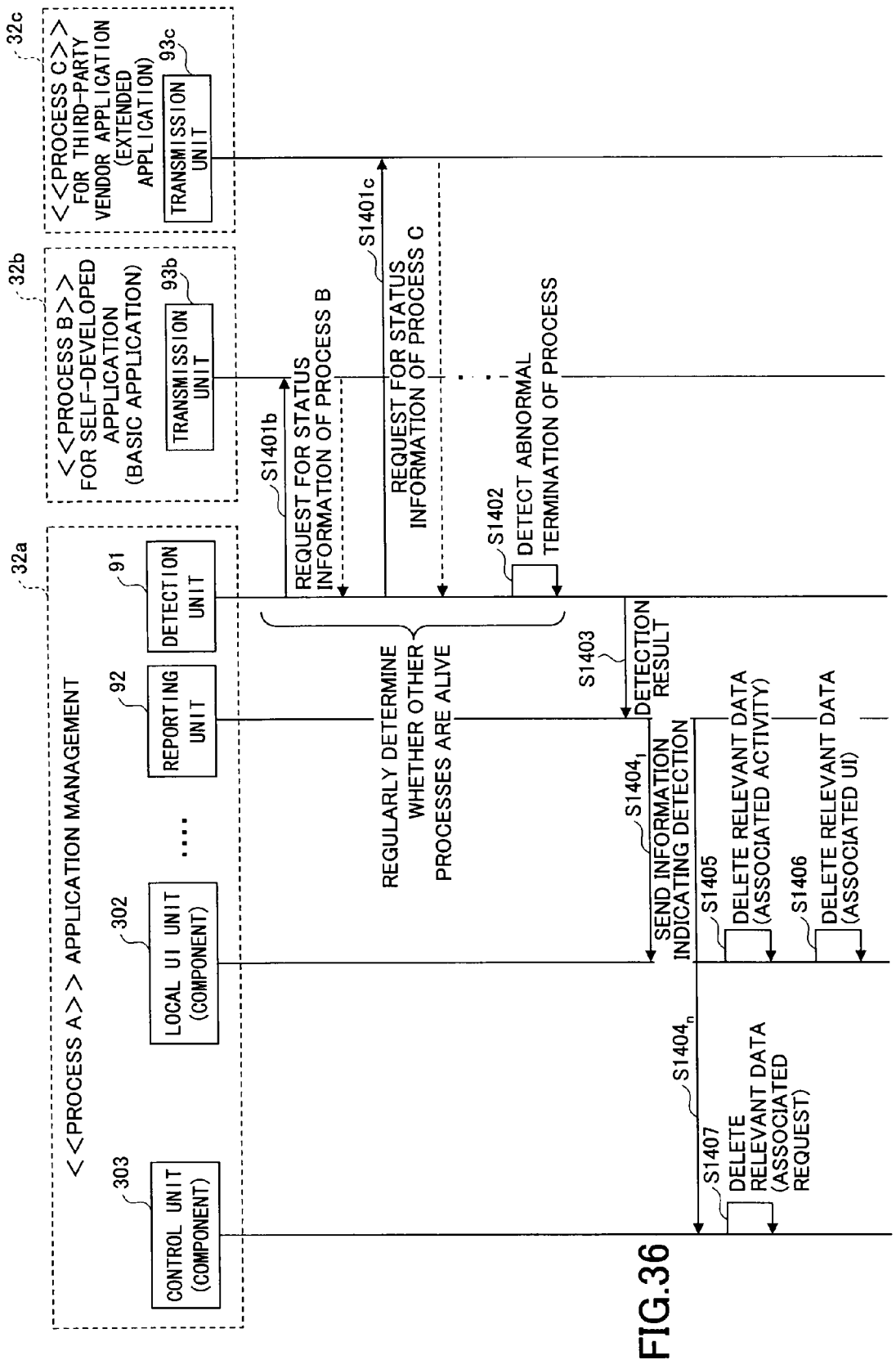
FIG. 36 is a sequence diagram illustrating an exemplary procedure performed for providing a function of detecting/reporting an abnormal termination of a process according to the third embodiment of the present invention.

FIG. 36 shows an exemplary procedure of the detection/reporting function configured such that the process A 32a requests the other processes for their status information pieces. FIG. 37 shows an exemplary procedure of the detection/reporting function configured such that the other processes send their status information pieces (heartbeat) to the process A 32a.

<<Detection/Reporting Function Configured Such That the Process A Requests the Other Processes for Status Information Pieces>>

FIG. 36 is a diagram illustrating an exemplary procedure performed for providing a function of detecting/reporting an abnormal termination of a process according to the third embodiment of the present invention.

In the information processing device 200 of this modified example, the detection unit 91 of the process A 32a regularly determines whether the other processes are alive. More specifically, the detection unit 91 requests the process B 32b for a status information piece of the process B 32b. In response to the request, the transmission unit 93b of the process B 32b sends a status information piece of the process B 32b (S1401b). The detection unit 91 then requests the process C 32c for a status information piece of the process C 32c. In response to the request, the transmission unit 93c of the process C 32c sends a status information piece of the process C 32c (S1401c).

Based on the response results from the process B 32b and the process C 32c, the detection unit 91 detects a process abnormal termination (S1402). For example, in the case where the process C 32c is abnormally terminated, the transmission unit 93c of the process C 32c cannot respond to the request for a status information piece. Then, the detection unit 91 determines that the process C 32c, from which no response is sent, is abnormally terminated and thus detects an abnormal termination of the process C 32c. A process abnormal termination may be determined based on an error in inter-process communications between the child processes.

In the subsequent procedure in Steps S1403 through S1406, which is similar to the procedure in Steps S1302 through S1307 of FIG. 33, the reporting unit 92 receives the detection results from the detection unit 91 and sends the information indicating detection of the abnormal termination to all the components of the application management software.

<<Detection/Reporting Function Configured Such That the Other Processes Send Status Information Pieces (Heartbeat) to the Process A>>

Figure 37:
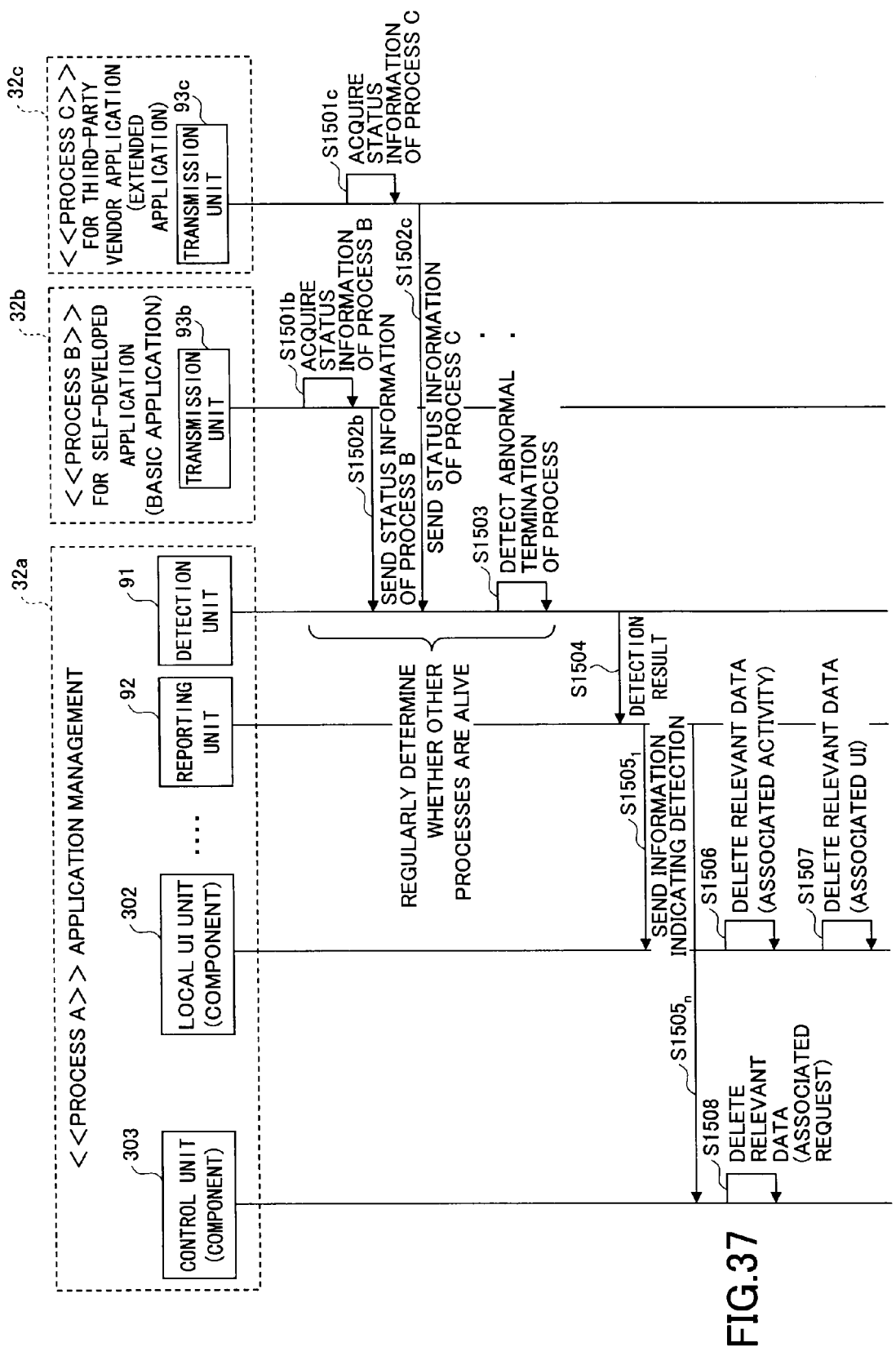
FIG. 37 is a sequence diagram illustrating an exemplary procedure performed for providing a function of detecting/reporting an abnormal termination of a process according to the third embodiment of the present invention.

FIG. 37 is a diagram illustrating an exemplary procedure performed for providing a function of detecting/reporting an abnormal termination of a process according to the third embodiment of the present invention.

In the information processing device 200 of this modified example, the transmission unit 93b and the transmission unit 93c of the process B 32b and the process C 32c regularly send status information pieces (heartbeat) of the process B 32b and the process C 32c to the process A 32a, respectively. More specifically, the transmission unit 93b and the transmission unit 93c regularly acquire status information pieces of the process B 32b and the process C 32c, respectively (S1501b and S1501c), and send the status information pieces to the process A 32a (S1502b and S1502c). Then, the detection unit 91 of the process A 32a receives the status information pieces.

Based on the reception results from the process B 32b and the process C 32c, the detection unit 91 detects a process abnormal termination (S1503). For example, in the case where the process C 32c is abnormally terminated, the process C 32c cannot regularly send a status information piece. Then, the detection unit 91 determines that the process C 32c, from which no status information piece is sent within a certain time period, is abnormally terminated and thus detects an abnormal termination of the process C 32c.

In the subsequent procedure in Steps S1504 through S1507, which is similar to the procedure in Steps S1302 through S1307 of FIG. 33, the reporting unit 92 receives the detection results from the detection unit 91 and sends the information indicating detection of the abnormal termination to all the components of the application management software.

<Operations Screen Displayed Upon Process Abnormal Termination>

Figure 38B:
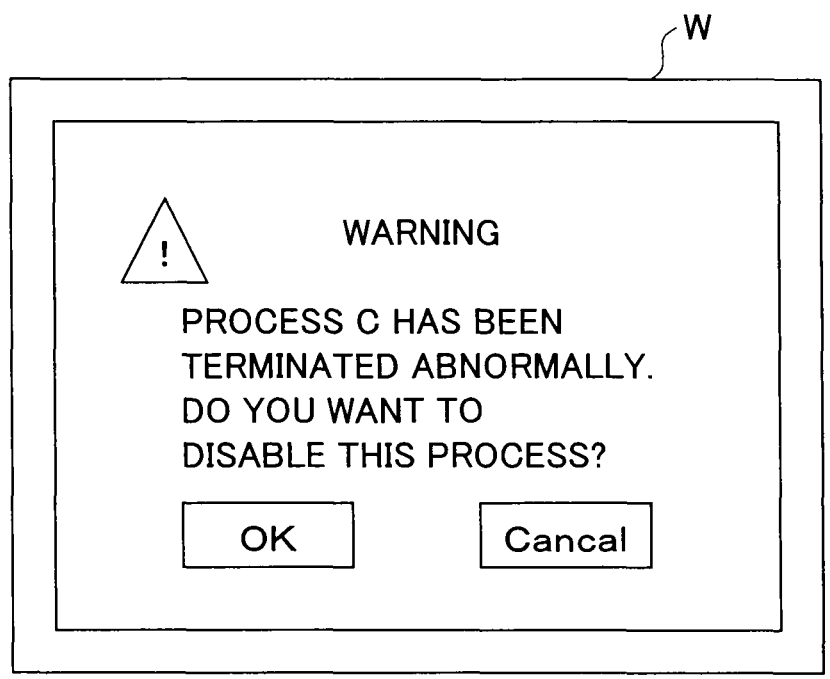

In the third embodiment including the above-described modified example, when the local UI unit 302 receives information indicating detection of an abnormal termination from the reporting unit 92, a screen W shown in FIG. 38A or 38B is displayed on a display device connected to the information processing device 200 via the output device I/F 17, for example.

FIGS. 38A and 38B are diagrams each illustrating an exemplary display screen W of an application management UI (not shown) according to the third embodiment of the present invention. The display screens W shown in FIGS. 38A and 38B are examples that are displayed in the case where the process C 32c is abnormally terminated.

The display screen W of FIG. 38A or FIG. 38B is displayed by the application management UI. Similar to the local UI unit 302, the application management UI is disposed in the user interface layer 101 of the process A 32a. Upon receiving information indicating detection of an abnormal termination, the local UI unit 302 requests the application management UI to generate a screen. In response to the request, the application management UI generates UI elements and returns the generated UI elements to the local UI unit 302. Then, a screen is displayed in the same manner as the UIs of the application AP in the first embodiment.

The display screen W of FIG. 38A includes a list of applications AP installed in the information processing device 200.

The list of applications AP includes various information items such application status (enabled: o/disabled: –), application name, version, date of update, and process for executing the application AP.

This list display area includes various types of action buttons such as buttons for specifying whether to enable/disable the applications AP, buttons for updating (re-installing) the applications AP, and buttons for deleting (uninstalling) the applications AP. Users can perform operations of specifying whether to enable the applications AP, updating the applications AP, and deleing the applications AP by selecting these buttons.

For example, if a user selects the "Enable" button of the application AP with the name "Print", the status of "Print" is changed from a disabled state to an enabled state.

The display screen W also includes an operations area for specifying whether to enable processes for executing the applications AP to allow users to specify whether to enable/disable the processes.

For example, if a user selects the "Enable" button of the process with the name "Process B", the status of "Process B" is changed from a disabled state to an enabled state.

The application AP corresponding to the request that is executed immediately before a process abnormal termination can be determined from the information item "Status" in the list of the applications AP.

In FIG. 38A, since the process C 32c is abnormally terminated, plural applications AP corresponding to the abnormally terminated process C 32c have "×" in "Status". In FIG. 38A, "×" indicates the application AP that has been executed in the abnormally terminated process, and "×××" indicates the application AP that is executed immediately before the abnormal termination.

It is highly likely that the request to the application AP that is executed immediately before the abnormal termination is the cause of the abnormal termination. Displaying the application AP that is executed in the abnormally terminated process immediately before the abnormal termination in a manner distinguishable from the other applications AP that are executed in the abnormally terminated process on the display screen W is useful in determination of the cause. The application AP that is determined to be the cause of the abnormal termination can be disabled or deleted (uninstalled) by selecting an appropriate action button.

In this way, it is possible to take a proper action on an abnormally terminated process easily on the display screen W, and thus to restore the multi-process environment to a stable state.

The display screen W of FIG. 38B is for indicating detection of an abnormal termination of a process and prompting a user to disable the process. The abnormally terminated process may be disabled using such a simple display screen W.

If the abnormally terminated process is disabled or the application AP that is the cause of the abnormal termination is uninstalled, the multi-process environment may automatically be rebooted.

<Summary>

As described above, the information processing device 200 of this embodiment, an abnormal termination of a process for an application AP managed by the application management software is detected. Then, the application management software sends information indicating detection of the abnormal termination to all the components of the application management software and, in order to prevent the application AP that is not operating properly from affecting operations of other applications AP, causes the components to make management information pieces related to the application AP, which is executed on the abnormally terminated process, consistent with each other. In this way, the application management software performs application management.

Accordingly, the information processing device 200 of this embodiment can achieve the same effect as the information processing devices 200 of the first and second embodiments and can isolate, if the process for executing an extended function is abnormally terminated, the abnormally terminated process from the system in order to allow the basic functions to remain operable.

In the third embodiment, the configuration in which three different processes are provided for executing application management functions, basic functions, and an extended function, respectively is used as an example of a multi-process environment on which the process abnormal termination detection/reporting function is executed. However, it is apparent that the process abnormal termination detection/reporting function may be executed in the configuration of the second embodiment in which two processes are provided.

The functions of the information processing devices 200 in the above-described embodiments are provided by causing a computer to execute an application execution program including the procedures of FIGS. 17 through 22 and FIGS. 24 through 26 encoded in programming language corresponding to the operating environment (i.e., platform). The application execution programs may be stored in a computer-readable storage medium.

The image processing apparatus 100 of the first embodiment includes the scanner unit 22 for scanning a document to obtain image data, the printing unit 21 for printing the image data onto paper, and one of the information processing devices 200 of the first and second embodiments and therefore can achieve the same effect as the information processing devices 200 of the first and second embodiments.

The number of the processes executed by the execution unit 51 in the above-described embodiments does not limit the scope of the present invention. More specifically, the present invention may include embodiments in which the process A 32a for application management and one or more processes for applications are provided.

The present invention is not limited to the above-described embodiments and variations and modifications may be made without departing from the scope of the invention.

The present invention may include the following embodiments.

(1) An information processing device, comprising:
an input unit configured to input data; a processing unit configured to process the data;
an output unit configured to output the data;
an execution unit configured to execute a first process, a second process, and a third process, wherein a function of an application is provided by operating the input unit, the processing unit, and the output unit in conjunction with each other; the first process executes application management software that manages activation and termination of the application; the second process executes basic application software that provides a basic function of the information processing device; and the third process executes extended application software that provides an extended function added to the information processing device;
a detection unit configured to detect abnormal terminations of the second and third processes; and
a reporting unit configured to send information indicating the abnormal terminations of the second and third processes detected by the detection unit to the first process configured to execute the application management software;
wherein the detection unit and the reporting unit are executed in the first process.

(2) An application execution method for use in an information processing device including an input unit configured to input data, a processing unit configured to process the data, and an output unit configured to output the data, wherein a function of an application is provided by operating the input unit, the processing unit, and the output unit in conjunction with each other, the application execution method comprising:
a step of executing application management software that manages activation and termination of the application, basic application software that provides a basic function of the information processing device, and extended application software that provides an extended function added to the information processing device in different processes.

(3) An application execution method for use in an information processing device including an input unit configured to input data, a processing unit configured to process the data, and an output unit configured to output the data, wherein a function of an application is provided by operating the input unit, the processing unit, and the output unit in conjunction with each other, the application execution method comprising:
a step of executing application management software that manages activation and termination of the application and basic application software that provides a basic function of the information processing device in a first process; and
a step of executing extended application software that provides an extended function added to the information processing device in a second process.

(4) An application execution method for use in an information processing device including an input unit configured to input data, a processing unit configured to process the data, and an output unit configured to output the data, wherein a function of an application is provided by operating the input unit, the processing unit, and the output unit in conjunction with each other, the application execution method comprising:
a step of executing a first process for executing application management software that manages activation and termination of the application;
a step of executing a second process for executing a component program that functions as an input unit, a processing unit, and/or an output unit and is preinstalled in the information processing device; and
a step of executing a third process for executing a component program that functions as an input unit, a processing unit, and/or an output unit and is added to the information processing device for function extension.

(5) An application execution method for use in an information processing device including an input unit configured to input data, a processing unit configured to process the data, and an output unit configured to output the data, wherein a function of an application is provided by operating the input unit, the processing unit, and the output unit in conjunction with each other, the application execution method comprising:
a step of executing a first process for executing application management software that manages activation and termination of the application and a component program that functions as an input unit, a processing unit, and/or an output unit and is preinstalled in the information processing device; and
a step of executing a second process for executing a component program that functions as an input unit, a processing unit, and/or an output unit and is added to the information processing device for function extension.

(6) A computer-readable recording medium storing an application execution program for use in an information processing device, the information processing device including an input unit configured to input data, a processing unit configured to process the data, and an output unit configured to output the data, wherein a function of an application is provided by operating the input unit, the processing unit, and the output unit in conjunction with each other, the application execution program including computer-executable instructions for executing a method comprising:

a step of executing application management software that manages activation and termination of the application, basic application software that provides a basic function of the information processing device, and extended application software that provides an extended function added to the information processing device in different processes.

(7) A computer-readable recording medium storing an application execution program for use in an information processing device, the information processing device including an input unit configured to input data, a processing unit configured to process the data, and an output unit configured to output the data, wherein a function of an application is provided by operating the input unit, the processing unit, and the output unit in conjunction with each other, the application execution program including computer-executable instructions for executing a method comprising:

a step of executing application management software that manages activation and termination of the application and basic application software that provides a basic function of the information processing device in a first process; and a step of executing extended application software that provides an extended function added to the information processing device in a second process.

(8) A computer-readable recording medium storing an application execution program for use in an information processing device, the information processing device including an input unit configured to input data, a processing unit configured to process the data, and an output unit configured to output the data, wherein a function of an application is provided by operating the input unit, the processing unit, and the output unit in conjunction with each other, the application execution program including computer-executable instructions for executing a method comprising:

a step of executing a first process for executing application management software that manages activation and termination of the application;

a step of executing a second process for executing a component program that functions as an input unit, a processing unit, and/or an output unit and is preinstalled in the information processing device; and a step of executing a third process for executing a component program that functions as an input unit, a processing unit, and/or an output unit and is added to the information processing device for function extension.

(9) A computer-readable recording medium storing an application execution program for use in an information processing device, the information processing device including an input unit configured to input data, a processing unit configured to process the data, and an output unit configured to output the data, wherein a function of an application is provided by operating the input unit, the processing unit, and the output unit in conjunction with each other, the application execution program including computer-executable instructions for executing a method comprising:

a step of executing a first process for executing application management software that manages activation and termination of the application and a component program that functions as an input unit, a processing unit, and/or an output unit and is preinstalled in the information processing device; and a step of executing a second process for executing a component program that functions as an input unit, a processing unit, and/or an output unit and is added to the information processing device for function extension.

The present application is based on Japanese Priority Application No. 2007-290214 filed on Nov. 7, 2007, and Japanese Priority Application No. 2008-222129 filed on Aug. 29, 2008, with the Japanese Patent Office, the entire contents of which are hereby incorporated herein by reference.

What is claimed is:

1. An information processing device, comprising:
a memory having a plurality of separate memory regions;
an input unit configured to input data;
a processing unit configured to process the data;
an output unit configured to output the data; and
an execution unit configured to execute a first process, a separate second process, and a separate third process within a single application layer; wherein
a function of an application is provided by operating the input unit, the processing unit, and the output unit in conjunction with each other;
the first process executes application management software that manages activation and termination of the application on a first of the plurality of separate memory regions;
the second process executes basic application software that provides a basic function of the information processing device on a second of the plurality of separate memory regions;
the third process executes extended application software that provides an extended function added to the information processing device on a third of the plurality of separate memory regions;
a plurality of software components executed in the second process are configured to exchange data between the application management software executed by the first process, and the basic application software executed in the second process;
a plurality of software components executed in the third process are configured to exchange data between the application management software executed by the first process, and the extended application software executed in the third process;
the plurality of software components of the second process and the third process are executed in the same process as the basic application software and the extended application software, respectively;
each of the plurality of software components executed in the second process and the third process corresponds to a software component of a plurality of software components executed in the first process;
each of the plurality of software components executed in the second process and the third process is configured to perform an inter-process communication with the respective software component executed in the first process; and
each of the plurality of software components executed in the first process is configured to exchange data with each of the plurality of software components executed in the second process and the third process via a local call, and each of the plurality of software components executed in the second process and the third process is configured to perform the inter-process communication with the respective software component executed in the first process via a local call.

2. The information processing device as claimed in claim 1, wherein the input unit, the processing unit, and the output unit that are operated to provide the function of the application are executed in the same process.

3. The information processing device as claimed in claim 1, wherein the input unit, the processing unit, and the output unit that are operated to provide the function of the application are executed in predetermined separate processes, correspondingly.

4. The information processing device as claimed in claim 1, further comprising:
an operations request transmission unit configured to transmit, when an instruction for selecting the application to be executed is received, an operations request to a process that executes the application, wherein the process is determined from an application identification information piece of the application based on information in which application identification information pieces of applications are associated with process identification information pieces of processes that execute the applications.

5. The information processing device as claimed in claim 1, further comprising:
an operation setting request transmission unit configured to transmit, when an operation setting request for specifying operation settings of the application is received, the received operation setting request to a process that executes the application, wherein the process is determined from a screen element identification information piece of a screen element that constitutes a user interface corresponding to the operation setting request based on information in which screen element identification information pieces of screen elements that constitute user interfaces corresponding to operation setting requests for specifying operation settings of applications are associated with process identification information pieces of processes that execute the applications.

6. The information processing device as claimed in claim 1, further comprising:
an execution request transmission unit configured to transmit, when an execution request for executing the application is received, the received execution request to a process that executes the application, wherein the process is determined from an execution request identification information piece of the execution request based on information in which execution request identification information pieces of execution requests for executing applications are associated with process identification information pieces of processes that execute the applications.

7. The information processing device as claimed in claim 1, further comprising:
a detection unit configured to detect abnormal terminations of the second and third processes; and
a reporting unit configured to send information indicating the abnormal terminations of the second and third processes detected by the detection unit to the first process that executes the application management software.

8. The information processing device as claimed in claim 7, wherein the detection unit and the reporting unit are executed in a parent process that generated the first, second, and third processes.

9. The information processing device as claimed in claim 8, wherein the detection unit detects the abnormal terminations of the second and third processes based on reception of signals indicating terminations of the second and third processes, correspondingly.

10. The information processing device as claimed in claim 9, wherein the detection unit requests the second and third processes for status information pieces of the second and third processes and detects the abnormal terminations of the second and third processes based on whether the second and third processes respond to the requests, correspondingly.

11. The information processing device as claimed in claim 9, wherein the detection unit detects the abnormal terminations of the second and third processes based on whether the status information pieces of the second and third processes are received, correspondingly.

12. The information processing device as claimed in claim 7, wherein, when the first process that executes the application management software receives the information indicating the abnormal termination of the second or third process from the reporting unit, a component of the application management software deletes an application identification information piece of the application executed in the abnormally terminated process from information in which application identification information pieces of applications are associated with process identification information pieces of processes that execute the applications.

13. The information processing device as claimed in claim 7, wherein, when the first process that executes the application management software receives the information indicating the abnormal termination of the second or third process from the reporting unit, a component of the application management software deletes a screen element identification information piece of a screen element generated by the abnormally terminated process from information in which screen element identification information pieces of screen elements that constitute user interfaces corresponding to operation setting requests for specifying operation settings of applications are associated with process identification information pieces of processes that execute the applications.

14. The information processing device as claimed in claim 7, wherein, when the first process that executes the application management software receives the information indicating the abnormal termination of the second or the third process from the reporting unit, a component of the application management software deletes an execution request identification information piece of an execution request generated by the abnormally terminated process from information in which execution request identification information pieces of execution requests for executing applications are associated with process identification information pieces of processes that execute the applications.

15. The information processing device as claimed in claim 7, wherein, when the first process that executes the application management software receives the information indicating the abnormal termination of the second or third process from the reporting unit, an application that is executed in the abnormally terminated process immediately before the abnormal termination of the process is displayed in a manner distinguishable from another one or more applications that are executed in the abnormally terminated process.

16. The information processing device as claimed in claim 7, wherein a screen for specifying whether to enable/disable the abnormally terminated process is displayed.

17. The information processing device as claimed in claim 7, wherein, when the first process that executes the application management software receives the information indicating the abnormal termination of the second or third process from the reporting unit, the abnormally terminated process is disabled.

18. An image processing apparatus comprising:
a document scanning unit configured to scan a document to obtain image data;
a printing unit configured to print the image data onto paper; and
the information processing device of claim 1.

19. An information processing device, comprising:
a memory having a plurality of separate memory regions;
an input unit configured to input data;
a processing unit configured to process the data;
an output unit configured to output the data; and
an execution unit configured to execute a first process and a separate second process within a single application layer; wherein
a function of an application is provided by operating the input unit, the processing unit, and the output unit in conjunction with each other;
the first process executes application management software that manages activation and termination of the application and basic application software that provides a basic function of the information processing device on a first of the plurality of separate memory regions;
the second process executes extended application software that provides an extended function added to the information processing device on a second of the plurality of separate memory regions;
a plurality of software components executed in the second process are configured to exchange data between the application management software executed by the first process and the extended application software executed in the second process;
the plurality of software components executed in the second process are executed in the same process as the extended application software;
each of the plurality of software components executed in the second process corresponds to a software component of a plurality of software components executed in the first process;
each of the plurality of software components executed in the second process is configured to perform an inter-process communication with the respective software component executed in the first process; and
each of the plurality of software components executed in the first process is configured to exchange data with each of the plurality of software components executed in the second process via a local call, and each of the plurality of software components executed in the second process is configured to perform the inter-process communication with the respective software component executed in the first process via a local call.

* * * * *